US012433900B2

(12) United States Patent
Garcia et al.

(10) Patent No.: US 12,433,900 B2
(45) Date of Patent: Oct. 7, 2025

(54) INTRAVITREAL CORTICOSTEROID EXTENDED RELEASE IMPLANT AND METHODS OF USE

(71) Applicant: Eyedea Bio, LLC, Chapel Hill, NC (US)

(72) Inventors: Andres Garcia, Chapel Hill, NC (US); Xunpei Liu, Chapel Hill, NC (US)

(73) Assignee: Eyedea Bio, LLC, Chapel Hill, NC (US)

( * ) Notice: Subject to any disclaimer, the term of this patent is extended or adjusted under 35 U.S.C. 154(b) by 0 days.

(21) Appl. No.: 18/711,575

(22) PCT Filed: Nov. 18, 2022

(86) PCT No.: PCT/US2022/080164
§ 371 (c)(1),
(2) Date: May 17, 2024

(87) PCT Pub. No.: WO2023/092087
PCT Pub. Date: May 25, 2023

(65) Prior Publication Data
US 2024/0415850 A1 Dec. 19, 2024

Related U.S. Application Data

(60) Provisional application No. 63/281,052, filed on Nov. 18, 2021.

(51) Int. Cl.
| | | |
|---|---|---|
| *A61K 31/573* | (2006.01) | |
| *A61K 9/00* | (2006.01) | |
| *A61K 9/10* | (2006.01) | |
| *A61K 47/12* | (2006.01) | |
| *A61K 47/14* | (2017.01) | |
| *A61K 47/22* | (2006.01) | |
| *A61K 47/34* | (2017.01) | |

(52) U.S. Cl.
CPC .......... *A61K 31/573* (2013.01); *A61K 9/0048* (2013.01); *A61K 9/10* (2013.01); *A61K 47/12* (2013.01); *A61K 47/14* (2013.01); *A61K 47/22* (2013.01); *A61K 47/34* (2013.01)

(58) Field of Classification Search
CPC ...... A61K 31/573; A61K 9/0048; A61K 9/10; A61K 47/12; A61K 47/14; A61K 47/22; A61K 47/34
See application file for complete search history.

(56) References Cited

U.S. PATENT DOCUMENTS

| | | | |
|---|---|---|---|
| 2,951,014 | A | 8/1960 | Garman et al. |
| 7,576,061 | B2 | 8/2009 | Szeto et al. |
| 7,718,620 | B2 | 5/2010 | Szeto et al. |
| 9,474,756 | B2 | 10/2016 | Horvath et al. |
| 9,895,410 | B2 | 2/2018 | Szeto et al. |
| 2004/0176305 | A1 | 9/2004 | Schiller et al. |
| 2005/0181050 | A1 | 8/2005 | Hirsh et al. |
| 2006/0084665 | A1 | 4/2006 | Koenen et al. |
| 2007/0298074 | A1 | 12/2007 | Robinson et al. |
| 2010/0047162 | A1 | 2/2010 | Piran |
| 2010/0168073 | A1 | 7/2010 | Ashton |
| 2010/0233232 | A1 | 9/2010 | Swanick et al. |
| 2013/0243830 | A1 | 9/2013 | Shaw et al. |
| 2014/0357607 | A1 | 12/2014 | Lathrop et al. |
| 2015/0010588 | A1 | 1/2015 | Szeto |
| 2016/0228455 | A1 | 8/2016 | Angi et al. |
| 2016/0375088 | A1 | 12/2016 | Szeto et al. |
| 2017/0007663 | A1 | 1/2017 | Szeto et al. |
| 2017/0035899 | A1 | 2/2017 | Szeto et al. |
| 2017/0224764 | A1 | 8/2017 | Delco et al. |
| 2017/0252301 | A1 | 9/2017 | Voight et al. |
| 2018/0236025 | A1 | 8/2018 | Szeto et al. |
| 2018/0311301 | A1 | 11/2018 | Szeto et al. |
| 2019/0151236 | A1 | 5/2019 | Metselaar et al. |
| 2019/0153032 | A1 | 5/2019 | Levin |
| 2019/0209641 | A1 | 7/2019 | Szeto |
| 2019/0233474 | A1 | 8/2019 | Duncan |

(Continued)

FOREIGN PATENT DOCUMENTS

| | | |
|---|---|---|
| AU | 2012202035 B2 | 5/2012 |
| JP | 5775285 B2 | 9/2015 |

(Continued)

OTHER PUBLICATIONS

Phippen et al., (Total seed oil and fatty acid methyl ester contents of Cuphea accessions), Industrial Crop Products 24 (2006) 52-59.*
Ach et al.; Lipofuscin redistribution and loss accompanied by cytoskeletal stress in retinal pigment epithelium of eyes with age-related macular degeneration; Investigative ophthalmology & visual science; 56(5); pp. 3242-3252; May 1, 2015.
Allingham et al.; Elamipretide, a mitochondrial-targeted drug, for the treatment of vision loss in dry AMD with high risk drusen: Results of the Phase 1 ReCLAIM study; Ethnicity; ARVO Poster; 2019 (the year of publication is sufficiently earlier than the effective U.S. filing date and any foreign priority date so that the particular month of publication is not in issue).
Allingham et al.; Retinal vein occlusion causes mitochondria dysfunction leading to loss of Müller cell lateral processes and visual dysfunction; Investigative Ophthalmology & Visual Science; 61(7); p. 1926; Jun. 10, 2020.

(Continued)

*Primary Examiner* — Zohreh A Fay
(74) *Attorney, Agent, or Firm* — Shay Glenn LLP

(57) ABSTRACT

Corticosteroid compositions including a corticosteroid drug substance (e.g., fluocinolone, fluocinolone acetonide, dexamethasone, dexamethasone phosphate, dexamethasone sodium phosphate, triamcinolone, and triamcinolone acetonide) or a or a salt or derivative thereof and one or more irregular-shaped particulate fatty acid or keto-enol tautomer complexation agents admixed in a dispersal medium, having a release profile with one or more phases of drug release. These compositions are extended release corticosteroid compositions may release a clinically useful level of corticosteroid for more than 1 to 12 months within the body. Also described herein are methods of forming and methods of using these compositions.

17 Claims, 17 Drawing Sheets

(56) References Cited

U.S. PATENT DOCUMENTS

| | | | |
|---|---|---|---|
| 2019/0248833 A1 | 8/2019 | Szeto et al. |
| 2019/0269749 A1 | 9/2019 | Neufer et al. |
| 2019/0328821 A1 | 10/2019 | Szeto |
| 2019/0330272 A1 | 10/2019 | Szeto et al. |
| 2019/0388492 A1 | 12/2019 | Szeto et al. |
| 2020/0038472 A1 | 2/2020 | Szeto et al. |
| 2020/0223887 A1 | 7/2020 | Wilson et al. |

FOREIGN PATENT DOCUMENTS

| | | | |
|---|---|---|---|
| WO | WO2004/004682 A2 | 1/2004 |
| WO | WO2007/122624 A2 | 11/2007 |
| WO | WO2009/158633 A1 | 12/2009 |
| WO | WO2015/048522 A1 | 4/2015 |
| WO | WO2016/001042 A1 | 1/2016 |
| WO | WO2017/216359 A1 | 12/2017 |
| WO | WO2018/034901 A1 | 2/2018 |
| WO | WO2019/113432 A1 | 6/2019 |
| WO | WO2019/195080 A1 | 10/2019 |
| WO | WO2019/246141 A1 | 12/2019 |
| WO | WO2020/006125 A1 | 1/2020 |
| WO | WO2020/255138 A1 | 12/2020 |

OTHER PUBLICATIONS

Birk et al.; Targeting mitochondrial cardiolipin and the cytochrome c/cardiolipin complex to promote electron transport and optimize mitochondrial ATP synthesis; British journal of pharmacology; 171(8); pp. 2017-2028; Apr. 2014.

Brown et al.; Mitochondria: potential targets for protection in age-related macular degeneration; Retinal degenerative diseases: mechanisms and experimental therapy; vol. 1074; pp. 11-18; May 3, 2018.

Butler et al.; Effects of elamipretide on left ventricular function in patients with heart failure with reduced ejection fraction: the PROGRESS-HF phase 2 trial; Journal of cardiac failur; 26(5); pp. 429-437; May 1, 2020.

Chang et al.; Influence of chain length on the in vitro hydrolysis of model ester prodrugs by ocular esterases; Current Eye Research; 2(10); pp. 651-656; Jan. 1, 1982.

Congdon et al.; Causes and prevalence of visual impairment among adults in the United States; Archives of Ophthalmology; 122(4); 477-485; Apr. 1, 2004.

Cousins et al.; Elamipretide, a mitochondria-targeted drug, for the treatment of vision loss in dry AMD with noncentral geographic atrophy: results of the Phase 1 ReCLAIM Study; Investigative Ophthalmology & Visual Science; 60(9); pp. 974; Jul. 22, 2019.

Cousins et al.; Mitochondrial dysfunction in experimental mouse models of SubRPE deposit formation and reversal by the Mito-Reparative drug MTP-131. Investigative Ophthalmology & Visual Science; 57(12); pp. 2126; Sep. 26, 2016.

Cousins et al.; The mitochondria-targeted peptide MTP-131 prevents hydroquinone-mediated persistent injury phenotype in cultured retinal pigment epithelium cells. Investigative Ophthalmology & Visual Science; 56(7); pp. 829; Jun. 11, 2015.

Dias et al.; Effect of mono?and di?acylation on the ocular disposition of ganciclovir: Physicochemical properties, ocular bioreversion, and antiviral activity of short chain ester prodrugs; Journal of pharmaceutical sciences; 91(3); pp. 660-668; Mar. 1, 2002.

Enguita et al.; Hydroquinone: environmental pollution, toxicity, and microbial answers; BioMed research international; vol. 2013; Article ID 542168; 14 pages; Oct. 2013.

Espinosa-Heidmann et al.; Cigarette smoke Rrelated oxidants and the development of sub-RPE deposits in an experimental animal model of dry AMD; Investigative ophthalmology & visual science; 47(2); pp. 729-737; Feb. 1, 2006.

Espinosa-Heidmann et al.; Basal laminar deposit formation in Apo B100 transgenic mice: complex interactions between dietary fat, blue light, and vitamin E; Investigative ophthalmology & visual science; 45(1); pp. 260-266; Jan. 1, 2004.

Ferrington et al.; Increased retinal mtDNA damage in the CFH variant associated with age-related macular degeneration; Experimental eye research; vol. 145; pp. 269-277; Apr. 1, 2016.

Friedman et al.; Prevalence of age-related macular degeneration in the United States; Arch Ophthalmol; 122(4); pp. 564-572; Apr. 1, 2004.

Gorman et al.; Mitochondrial diseases; Nature reviews Disease primers; 2(1); pp. 1-22; Oct. 20, 2016.

Guidry et al.; Phenotypic variation of retinal pigment epithelium in age-related macular degeneration; Investigative ophthalmology & visual science; 43(1); pp. 267-273; Jan. 1, 2002.

Hammid et al.; Characterization and tissue localization of ocular carboxylesterases in multiple species; Acta Ophthalmologica; Doi: 10.1111/j. 1755-3768.2019.5346; 97(S263); Dec. 2019.

Heikkinen et al.; Esterase activity in porcine and albino rabbit ocular tissues; European Journal of Pharmaceutical Sciences; vol. 123; pp. 106-110; Oct. 18, 2018.

Hellberg et al.; The hydrolysis of the prostaglandin analog prodrug bimatoprost to 17-phenyl-trinor PGF2 ? by human and rabbit ocular tissue; Journal of ocular pharmacology and therapeutics; 19(2); pp. 97-103; Apr. 1, 2003.

Hess et al.; Repetitive periocular injection of hydroquinone promotes mitochondrial dysfunction in retinal pigment epithelium of mouse eyes; Investigative Ophthalmology & Visual Science; 56(7); pp. 1277; Jun. 11, 2015.

Holekamp et al.; Natural history of geographic atrophy secondary to age-related macular degeneration: results from the prospective Proxima A and B clinical trials; Ophthalmology; 127(6); pp. 769-783; Jun. 1, 2020.

Hsu et al.; Longitudinal study of visual function in dry age-related macular degeneration at 12 months; Ophthalmology Retina; 3(8); pp. 637-648; Aug. 1, 2019.

Kaarniranta et al.; Mechanisms of mitochondrial dysfunction and their impact on age-related macular degeneration. Progress in retinal and eye research; vol. 79; 100858; pp. 1-19; Nov. 1, 2020.

Karaa et al.; Randomized dose-escalation trial of elamipretide in adults with primary mitochondrial myopathy; Neurology; 90(14); pp. e1212-e1221; Apr. 3, 2018.

Klein et al.; The prevalence of age-related eye diseases and visual impairment in aging: current estimates; Investigative ophthalmology & visual science; 54(14); pp. ORSF5-13; Dec. 1, 2013.

Malek et al.; Apolipoprotein E allele-dependent pathogenesis: a model for age-related retinal degeneration; Proceedings of the National Academy of Sciences; 102(33); pp. 11900-11905; Aug. 16, 2005.

Marin-Castano et al.; Nonlethal oxidant injury to human retinal pigment epithelium cells causes cell membrane blebbing but decreased MMP-2 activity. Investigative ophthalmology & visual science; 46(9); pp. 3331-3340; Sep. 1, 2005.

Mettu et al.; Retinal pigment epithelium response to oxidant injury in the pathogenesis of early age-related macular degeneration. Molecular aspects of medicine; 33(4); 376-398; Aug. 1, 2012.

Nickel et al.; Mitochondrial reactive oxygen species production and elimination; Journal of molecular and cellular cardiology; vol. 73; pp. 26-33; Aug. 1, 2014.

Owsley et al.; Cone-and rod-mediated dark adaptation impairment in age-related maculopathy; Ophthalmology; 114(9); pp. 1728-1735; Sep. 1, 2007.

Owsley et al.; Development of a questionnaire to assess vision problems under low luminance in age-related maculopathy; Investigative ophthalmology & visual science; 47(2); pp. 528-535; Feb. 1, 2006.

Pennington et al.; Epidemiology of age-related macular degeneration (AMD): associations with cardiovascular disease phenotypes and lipid factors; Eye and vision; 3(34); pp. 1-20; Dec. 2016.

Pons et al.; Cigarette smoke-related hydroquinone induces filamentous actin reorganization and heat shock protein 27 phosphorylation through p38 and extracellular signal-regulated kinase 1/2 in retinal pigment epithelium: implications for age-related macular degeneration; The American journal of pathology; 177(3); pp. 1198-1213; Sep. 1, 2010.

(56) References Cited

OTHER PUBLICATIONS

Riazi-Esfahani et al.The role of mitochondria in AMD: current knowledge and future applications. Journal of ophthalmic & vision research; 12(4); pp. 424-428; Oct. 2017.

Sullivan et al.; Determining ethyl esters in fish oil with solid phase microextraction and GCRMS; Journal of the American Oil Chemists' Society; 86(8); pp. 743-748; Aug. 2009.

Sunness et al.; Visual function abnormalities and prognosis in eyes with age-related geographic atrophy of the macula and good visual acuity; Ophthalmology; 104(10); pp. 1677-1691; Oct. 1, 1997.

Sunness et al.; Low luminance visual dysfunction as a predictor of subsequent visual acuity loss from geographic atrophy in age-related macular degeneration; Ophthalmology; 115(9); pp. 1480-1488; Sep. 1, 2008.

Szeto; First?in?class cardiolipin?protective compound as a therapeutic agent to restore mitochondrial bioenergetics; British journal of pharmacology; 171(8); pp. 2029-2050; Apr. 2014.

Szeto et al.; Novel therapies targeting inner mitochondrial membrane from discovery to clinical development; Pharmaceutical research; vol. 28; pp. 2669-2679; Nov. 2011.

Szeto et al.; Serendipity and the discovery of novel compounds that restore mitochondrial plasticity; Clinical Pharmacology & Therapeutics; 96(6); pp. 672-683; Dec. 2014.

Terluk et al.; Investigating mitochondria as a target for treating age-related macular degeneration. Journal of Neuroscience; 35(18); pp. 7304-7311; May 6, 2015.

Varela-Fernandez et al.; Drug delivery to the posterior segment of the eye: biopharmaceutic and pharmacokinetic considerations; Pharmaceutics: 12(3): 269; 39 pages; Mar. 16, 2020.

Walther et al.; Prodrugs in medicinal chemistry and enzyme prodrug therapies; Advanced drug delivery reviews; vol. 118; pp. 65-77; Sep. 1, 2017.

Zhao et al.; Cell-permeable peptide antioxidants targeted to inner mitochondrial membrane inhibit mitochondrial swelling, oxidative cell death, and reperfusion injury; Journal of Biological Chemistry: 279(33); pp. 34682-34690; Aug. 13, 2004.

Zhao et al.; Mitochondria-targeted peptide prevents mitochondrial depolarization and apoptosis induced by tert-butyl hydroperoxide in neuronal cell lines; Biochemical pharmacology; 70(12); pp. 1796-1806; Dec. 5, 2005.

Garcia et al.; U.S. Appl. No. 18/566,627 entitled "Intravitreal mitochondrial-targeted peptide prodrugs and methods of use," filed Dec. 1, 2023.

Garcia et al.; U.S. Appl. No. 18/566,629 entitled "Extended release drug delivery system for ocular drugs and methods of use," filed Dec. 1, 2023.

Krowczyriski; Extended-Release Dosage Forms; Chapter 3; Theoretical Principles Applied in Various Extended-Release Dosage Formulations, IV. Dissolution Through the Membrane; pp. 19-21; Mar. 25, 2020.

MacKichan et al.; Part 1: Basic Concepts, Pharmacokinetic Considerations for Drug Delivery; Gibaldi's Drug Delivery Systems in Pharmaceutical Care; American Society of Health-System Pharmacists; pp. 17; Jan. 1, 2007.

Ramirez-Rigo et al.; Controlled Drug Delivery via the Lung; Fundamentals of Drug Delivery; pp. 449-469; Oct. 26, 2021.

Ristroph et al.; Hydrophobic ion pairing: encapsulating small molecules, peptides, and proteins into nanocarriers. Nanoscale Advances; 1(11); pp. 4207-4237; Jan. 1, 2019.

* cited by examiner

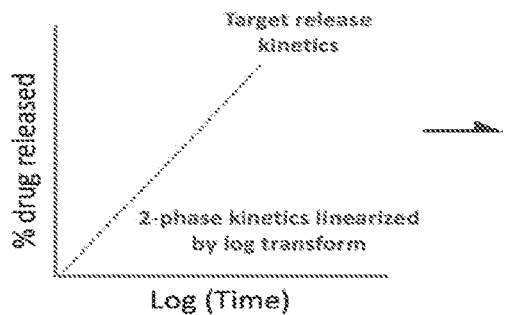
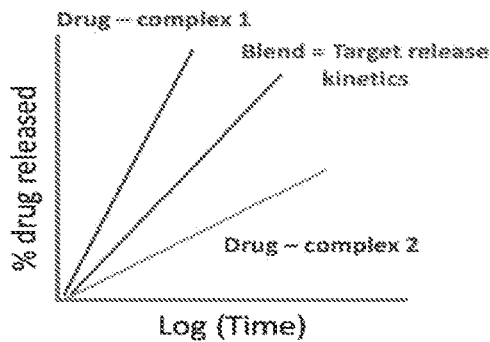
FIG. 1A
FIG. 1C
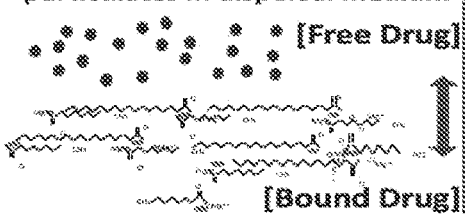
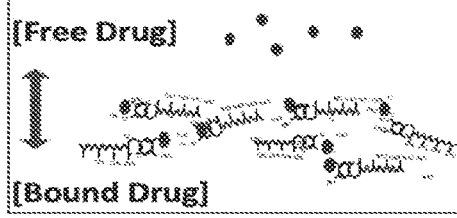
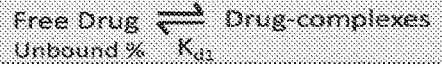
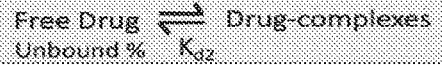
FIG. 1B

INTRAVITREAL CORTICOSTEROID EXTENDED RELEASE IMPLANT AND METHODS OF USE

CROSS REFERENCE TO RELATED APPLICATIONS

This patent application is a national phase application under 35 U.S.C. 371 of International Patent Application No. PCT/US2022/080164, filed Nov. 18, 2022, titled "INTRAVITREAL CORTICOSTEROID EXTENDED RELEASE IMPLANT AND METHODS OF USE," now International Publication No. WO 2023/092087, which claims priority to U.S. provisional patent application No. 63/281,052, titled "INTRAVITREAL CORTICOSTEROID EXTENDED RELEASE IMPLANT AND METHODS OF USE," and filed on Nov. 18, 2021, each of which are herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

Diabetic Retinopathy (DR) is the leading cause of vision loss in adults aged 20-74 years. From 1990-2010, DR ranked as the fifth most common cause of preventable blindness and fifth most common cause of moderate to severe visual impairment. In 2010, of an estimated 285 million people worldwide with diabetes, over one-third have signs of DR, and a third of these are afflicted with vision-threatening diabetic retinopathy, defined as severe non-proliferative DR or proliferative DR or the presence of DME.

Diabetic eye disease typically begins as nonproliferative diabetic retinopathy (NPDR) and can progress from mild to moderate to severe NPDR before becoming proliferative diabetic retinopathy (PDR). At any stage of DR, patients can be afflicted with diabetic macular edema (DME) in which leakage of macular blood vessels leads to swelling of the macula and/or fovea. Patients with PDR in which retinal ischemia causes neovascularization experience visually disabling vitreous hemorrhage and/or blinding traction retinal detachments. Patients with DME experience central vision loss which can become permanent if not treated.

Pathogenesis of DR and DME is multifactorial, including both hypoxia/ischemia and inflammatory biology. Extensive research from many laboratories as well as randomized clinical trials in humans have implicated inflammation as a major pathogenic factor in DR/DME and shown that corticosteroid drugs are effective in the treatment of both DR and DME.

Patients affected by diabetes are frequently of working age and experience many complications of their disease which leads to an extremely high burden of medical care which is particularly burdensome for working age patients and which frequently results in poor patient adherence to medical therapies.

Intravitreal vascular endothelial growth factor (VEGF) inhibitors and corticosteroid therapies are approved globally for the treatment of DME. Although anti-VEGF therapy is generally effective for center-involved DME, a substantial proportion of anti-VEGF treated eyes with DME do not achieve vision of 20/20 or complete resolution of retinal thickening. Further, anti-VEGF therapy requires frequent injections in order to realize treatment benefits. Thus, there exists a medical unmet need both for alternatives to anti-VEGF and for extended release medications which may alleviate patient treatment burden associated with DR and DME. Corticosteroid therapy targets the broader inflammatory component of DME that is not targeted by anti-VEGF therapy and may prove to be particularly useful among patients not responsive to anti-VEGF therapy.

In addition to DR and DME, several other ocular conditions can be ameliorated by administration of sustained release corticosteroid drugs. Similar to DME, retinal vein occlusion (RVO) which includes both central retinal vein occlusion (CRVO) and branch retinal vein occlusion (BRVO) are frequently treated with intravitreally injected medications. Intravitreal vascular endothelial growth factor (VEGF) inhibitors and corticosteroid therapies are approved globally for the treatment RVO. While anti-VEGF is first line, a substantial portion of patients with RVO are also responsive to corticosteroid drugs and in some cases, RVO which is poorly responsive to anti-VEGF therapy can be effectively treated with corticosteroid drugs.

Inflammatory conditions affecting the eye, and particularly those affecting the posterior segment are frequently treated with intravitreal or periocular corticosteroids. Such conditions include post-operative inflammation and cystoid macular edema (CME), uveitis with CME, and other forms of posterior uveitis. Corticosteroid drugs are globally approved for treatment of post-operative CME and noninfectious uveitis with CME. In these cases, corticosteroid drugs offer rapid onset of action and are effective in controlling intraocular inflammation and concurrent CME.

SUMMARY OF THE DISCLOSURE

Described herein are compositions, including extended-release compositions of a corticosteroid, methods of forming the extended-release corticosteroid compositions and method of using the extended-release corticosteroid compositions. These extended-release corticosteroid compositions may be multi-phase extended release corticosteroid compositions having a multi-phase release profile that may release a clinically useful level of corticosteroid for more than 1 to 12 months within the body.

In general, these extended-release corticosteroid compositions include a complex of the corticosteroid and a fatty acid in a dispersal medium as well as a complex of the corticosteroid and a keto-enol tautomer, also within the dispersal medium. This composition may result in particularly desirable release kinetics for the corticosteroid when implanted into the body, such as in the vitreous of the eye. Examples of fatty acids that may be used as part of a corticosteroid and fatty acid complex include a C4-C30 fatty acid. These fatty acids may be saturated or unsaturated (e.g., mono-unsaturated or poly-unsaturated). These fatty acids may also be neutral or prepared as a salt (e.g., magnesium stearate, calcium stearate, etc.). For example, the fatty acid may be a fatty acid having a lipid number (e.g., number of carbons) of between C14 and C20, or C14 and C18 (e.g., one or more of, Tetradecanoic acid, pentadecanoic acid, (9Z)-hexadecenoic acid, Hexadecanoic acid, Heptadecanoic acid, Octadecanoic acid, (9Z,12Z)-octadeca-9,12-dienoic acid, (9Z,12Z,15Z)-octadeca-9,12,15-trienoic acid, (6Z,9Z,12Z)-octadeca-6,9,12-trienoic acid, (5E,9E,12E)-octadeca-5,9,12-trienoic acid, (6Z,9Z,12Z,15Z)-octadeca-6,9,12,15-tetraenoic acid, (Z)-octadec-9-enoic acid, (11E)-octadec-11- enoic acid, (E)-octadec-9-enoic acid, nonadecanoic acid, eicosanoic acid etc.). In some examples, the fatty acid may be an unbranched fatty acid between C14 and C20. In some examples the fatty acid may be a saturated fatty acid (such as, but not limited to, myristic acid (tetradecanoic acid), palmitic acid (hexadecanoic acid), stearic acid (octadecanoic acid), arachidic acid (eicosanoic acid). Examples of keto-enol tautomer that may be used include a tocopherol compound or tocopherol derivative (e.g., alpha-tocopherol, alpha-tocopherol acetate, DL-alpha-tocopherol acetate, alpha-tocopherol succinate, 13-hydroxy-alpha-tocopherol, alpha-tocopherol phosphate, alpha-tocopherol methyl ether, beta-tocopherol, delta-tocopherol, gamma-tocopherol, dehydro-gamma-tocopherol, 13-hydroxy-gamma-tocopherol, tocopherol calcium succinate, etc.), monosaccharides (e.g., D-glucose, aldose, etc.), microcrystalline cellulose, a phenol compound, a quinone compound, a ribonucleic acid compound. Examples of a hydrophobic oil dispersal medium include saturated fatty acid methyl esters such as: methyl acetate, methyl propionate, methyl butyrate, methyl pentanoate, methyl hexanoate, methyl heptanoate, methyl octanoate, methyl nonanoate, methyl decanoate, methyl undecanoate, methyl dodecanoate (methyl laurate), methyl tridecanoate, methyl tetradecanoate, methyl 9(Z)-tetradecenoate, methyl pentadecanoate, methyl hexadecanoate, methyl heptadecanoate, methyl octadecenoate, methyl nonadecanoate, methyl eicosanoate, methyl heneicosanoate, methyl docosanoate, methyl tricosanoate, and others. The fatty acids that may be used as part of a corticosteroid and fatty acid complex may also include saturated fatty acid ethyl esters such as: ethyl acetate, ethyl propionate, ethyl butyrate, ethyl pentanoate, ethyl hexanoate, ethyl heptanoate, ethyl octanoate, ethyl nonanoate, ethyl decanoate, ethyl undecanoate, ethyl dodecanoate (ethyl laurate), ethyl tridecanoate, ethyl tetradecanoate, ethyl 9(Z)-tetradecenoate, ethyl pentadecanoate, ethyl hexadecanoate, ethyl heptadecanoate, ethyl octadecenoate, ethyl nonadecanoate, ethyl eicosanoate, ethyl heneicosanoate, ethyl docosanoate, ethyl tricosanoate, and others. The fatty acids that may be used as part of a corticosteroid and fatty acid complex may also include unsaturated fatty acid esters, including methyl 10-undecenoate, methyl 11-dodecenoate, methyl 12-tridecenoate, methyl 9(E)-tetradecenoate, methyl 10(Z)-pentadecenoate, methyl 10(E)-pentadecenoate, methyl 14-pentadecenoate, methyl 9(Z)-hexadecenoate, methyl 9(E)-hexadecenoate, methyl 6(Z)-hexadecenoate, methyl 7(Z))-hexadecenoate, methyl 11(Z)-hexadecenoate, as well as unsaturated methyl and ethyl esters, including but not limited to methyl tricosenoate molecule entities.

For example, described here are extended-release corticosteroid formulations, methods of manufacturing these extended-release corticosteroid formulations and method of using these extended-release corticosteroid formulations to treat a patient in need thereof, in which the extended release corticosteroid is a hydrocortisone derivative, including (but not limited to) a synthetic hydrocortisone derivative such as fluocinolone acetonide.

For example, described herein are extended release formulations of several clinically useful corticosteroid drugs (e.g., fluocinolone, fluocinolone acetonide, dexamethasone, dexamethasone free base, dexamethasone phosphate, dexamethasone sodium phosphate, triamcinolone, and triamcinolone acetonide) complexed with magnesium stearate, and additionally complexed with alpha-tocopherol, with these complexed corticosteroid drugs combined within a methyl laurate dispersal medium. In some examples this extended-release formulation may be mixed and loaded into a bio-erodible tube implant composed, e.g., of PLGA copolymer for injection, e.g., into the eye, such as into the vitreous of the eye. The extended release formulation may be used to treat one or more of: diabetic retinopathy, diabetic macular edema, retinal vein occlusion, ocular inflammation/uveitis, and age-related macular degeneration. As described herein, these compositions may release fluocinolone acetonide for approximately 1-12 months or longer.

Thus, described herein are compositions of matter, formulations and methods of making and using them for treating conditions that are ameliorated by sustained administration of therapeutically effective concentrations of corticosteroid drugs. Corticosteroid drugs are known to act by reducing inflammation and by enhancing endothelial barrier function, effects which are beneficial in numerous ocular conditions which include vascular leakage or retinal or macular edema. Inflammation leading to vascular leakage and other deleterious effects is known to be a major contributor to diabetic eye diseases such as diabetic macular edema (DME) and diabetic retinopathy (DR) as well as many other conditions of the posterior segment of the eye. The corticosteroid therapies described herein may be used to treat diabetic eye disease.

In addition to DR and DME, the corticosteroid therapies described herein may be used to treat several other ocular conditions including RVO, post-operative CME, uveitis and uveitic CME.

The compositions, formulations and methods described herein include corticosteroid drugs that are specifically formulated for intravitreal (IVT) or periocular administration. Such formulations are specifically designed and manufactured to enable extended release of multiple corticosteroid drugs. These formulations may further be manipulated to enable various drug release profiles which may be desirable to meet various therapeutic goals.

Further, these corticosteroids (which may be generally referred to herein as "drugs" or "drug agents") may be formulated in combination with a novel extended release drug delivery system ("XRDDS") as described herein, which is based on the chemistry of complexation systems. In this XRDDS, one or more complexation agent(s) forms a noncovalent complex with the corticosteroid; specific combinations of complexation agent may be selected and configured to achieve targeted release kinetics, since the relative avidity of drug-complexation agent can be measured by $K_d$, defined as the ratio of unbound to bound drug agent (e.g., corticosteroid) in a specified release assay. The noncovalent complexation of the drug agent with complexation agent forms "drug-complex" particulates; one or more sets of "drug-complex" can then be combined and dispersed within a selected dispersal medium. The combination of the drug agent and the extended release drug delivery system (including the one or more complexation agents) may be referred to herein as an extended release composition or formulation, also referred to herein as "CS XR," or extended release corticosteroids, that may be applied for intravitreal or periocular routes of administration to treat diabetic macular edema (DME), diabetic retinopathy (DR), and/or retinal vein occlusion (RVO), uveitis, age-related macular degeneration (AMD), and other retinal, optic nerve, and "back of the eye" diseases.

The corticosteroid drug agents ("drugs") and formulations of "CS XR" have been characterized by in vitro studies for release and by in vivo studies for toxicology, pharmacokinetics (PK), and efficacy. The corticosteroid drugs, when incorporated into the XRDDS to produce a formulation of CS XR, may provide a vitreous and retina concentration of corticosteroid drug that meets or exceeds the tissue levels known to be efficacious in the treatment of diabetic eye disease and other conditions for 1 month or more, but typically approximately 6 months or more, with a single intravitreal or periocular injection.

For example, described herein are compositions of matter, formulations, methods of use, for treating conditions ameliorated by corticosteroid therapy including for treating ocular conditions (e.g., DME, RVO, CME).

A variety of corticosteroid drugs including but not limited to fluocinolone acetonide, dexamethasone phosphate, dexamethasone free base, and triamcinolone acetonide, may be incorporated within the described extended release drug delivery system (also referred herein as an extended release drug delivery matrix, or an extended release drug delivery composition) that includes one or more complexation agents that form noncovalent interactions (or complex) with the corticosteroid drug. When implanted into the body, the corticosteroid drug incorporated into the XRDDS, this combination, also referred to as CS XR (extended-release corticosteroid compositions), is specifically designed and formulated to limit and control the release of the corticosteroid drug from the implant into the tissue. Release of the active drug (corticosteroid) from the extended release drug delivery system may be dependent in part on the diffusion of the corticosteroid to the surface of the extended release drug delivery system implant. The composition of the extended release drug delivery system, specifically the choice of one or more complexation agents as they pertain to the physicochemical properties of the particular corticosteroid drug, are purposefully designed and selected to achieve desired drug release kinetic profiles including one-phase, two-phase and three-phase release.

A one-phase release profile is created by a single, constant rate of drug release for the life of the implant. A two-phase release profile is created by an initial "burst" in which there is a relatively high rate of drug release followed by a prolonged, steady-state release at a slower rate. Finally, a three-phase release is similar to a two-phase but has an additional "burst" of drug release at the end of implant life.

As the overall composition of the corticosteroid incorporated into the XRDDS (CS XR) is comprised of one or more sets of "drug-complex" particulates, each with specific release rates based on $K_d$ of the specific particulate, the composite drug release kinetic profile can be specifically designed, customized, and determined by mathematical formula that integrates the individual release rates of the drug-complex particulates that are incorporated and dispersed within the selected dispersal medium of the XRDDS.

The resulting extended release drug delivery system, also known as CS XR, in which the complexation agent(s) in the drug delivery system are complexed with the corticosteroid and incorporated and dispersed within a selected dispersal medium, may then be inserted into the body, e.g., for intravitreal or periocular routes of administration, e.g., for treatment of disease.

For example, described herein are multiphasic colloidal suspension compositions comprising: a corticosteroid drug substance or a or a salt or derivative thereof and one or more complexation agents, admixed in a dispersal medium so that the corticosteroid drug substance has a release profile having one or more phases of drug release, wherein the one or more complexation agents is formulated as an irregular-shaped particulate that forms corticosteroid drug substance-complex particulates by noncovalent, reversible binding to the corticosteroid drug substance or a salt or derivative thereof, and wherein the one or more complexation agents is one of: a fatty acid or an organic compound that can form a keto-enol tautomer; wherein the corticosteroid drug substance is a corticosteroid or salt or derivative thereof from any one of: fluocinolone, fluocinolone acetonide, dexamethasone, dexamethasone phosphate, dexamethasone sodium phosphate, triamcinolone, and triamcinolone acetonide; further wherein the dispersal medium is a hydrophobic liquid oil comprising at least one of: saturated fatty acid methyl esters, unsaturated fatty acid methyl esters, saturated fatty acid ethyl esters, unsaturated fatty acid ethyl esters.

In some examples, the multiphasic colloidal suspension composition comprises: a corticosteroid drug substance or a or a salt or derivative thereof and one or more complexation agents, admixed in a dispersal medium, wherein the one or more complexation agents is formulated as an irregular-shaped particulate that forms corticosteroid drug substance-complex particulates by noncovalent, reversible binding to the corticosteroid drug substance or a salt or derivative thereof, and wherein the one or more complexation agents is one of: a fatty acid or an organic compound that forms a keto-enol tautomer; wherein the corticosteroid drug substance is a corticosteroid or salt or derivative thereof from any one of: fluocinolone, fluocinolone acetonide, dexamethasone, dexamethasone phosphate, dexamethasone sodium phosphate, triamcinolone, and triamcinolone acetonide; further wherein the dispersal medium is a hydrophobic liquid oil comprising at least one of: saturated fatty acid methyl esters, unsaturated fatty acid methyl esters, saturated fatty acid ethyl esters, unsaturated fatty acid ethyl esters.

For example, the one or more complexation agents may include a fatty acid comprising: stearic acid or a salt thereof (e.g., magnesium stearate). In some examples, the one or more complexation agents includes a tocopherol compound. The one or more complexation agents may include both stearic acid or a salt thereof and a tocopherol compound. In some examples the one or more complexation agents comprises stearic acid (octadecanoic acid) or a salt thereof and alpha-tocopherol. For example, the one or more complexation agents may comprise stearic acid (octadecanoic acid) or a salt thereof and alpha-tocopherol, and wherein the dispersal medium is methyl dodecanoate (methyl laurate).

The dispersal medium may include methyl dodecanoate (methyl laurate).

In some examples the multiphasic colloidal suspension composition is formulated as a flowable paste or bolus implant configured for direct injection in and around an eye. The multiphasic colloidal suspension composition may be formulated within a tube implant of 2 millimeters or longer, for injection in and around an eye via an injector needle of between 18 gauge and 32 gauge. In some examples, the multiphasic colloidal suspension composition is formulated and administered within a hollow tube and the hollow tube comprises one or more open ends that restricts surface erosion of the multiphasic colloidal suspension composition to an exposed surface area at the open ends of the hollow tube. The hollow tube may be erodible and is comprised of biodegradable or bioresorbable polymers: polylactide (PLA), poly-L-lactide (PLLA), poly-D-lactide (PDLA), poly-DL lactide (PDLLA), polyglycolide (PGA), poly (lactic co-glycolic acid) (PLGA), other copolymers of PLA and PGA, or a combination thereof. For example, the biodegradable hollow tube may be comprised of PLGA polymers with molecular weight of between 150,000 and 300,000 Daltons and is formed of approximately 70-95% L (lactic acid/lactide) and 5-30% G (glycolic acid/glycolide).

The multiphasic colloidal suspension composition may comprise the corticosteroid drug substance between about 10% and 60% by weight, wherein the one or more complexation agents comprises magnesium stearate between about 1% and 50% by weight and alpha-tocopherol between about 1% and 50% by weight, and wherein the dispersal medium comprises methyl dodecanoate between 1% and 90% by weight.

In general, the corticosteroid drug substance may be fluocinolone, dexamethasone, triamcinolone or a salt or derivative thereof.

For example, a multiphasic colloidal suspension composition may include: a corticosteroid drug substance or a salt or derivative thereof and one or more complexation agents, admixed in a dispersal medium so that the corticosteroid drug substance has a release profile having one or more phases of drug release, wherein the one or more complexation agents is formulated as an irregular-shaped particulate that forms corticosteroid drug substance-complex particulates by noncovalent, reversible binding to the corticosteroid drug substance or a salt or derivative thereof, and wherein the one or more complexation agents comprises at least one of: magnesium stearate and tocopherol; wherein the corticosteroid drug substance is a corticosteroid or salt or derivative thereof from any one of: fluocinolone, fluocinolone acetonide, dexamethasone, dexamethasone phosphate, dexamethasone sodium phosphate, triamcinolone, and triamcinolone acetonide; further wherein the dispersal medium is a methyl laurate.

For example, a multiphasic colloidal suspension composition may include: a corticosteroid drug substance or a salt or derivative thereof and one or more complexation agents, admixed in a dispersal medium, wherein the one or more complexation agents is formulated as an irregular-shaped particulate that forms corticosteroid drug substance-complex particulates by noncovalent, reversible binding to the corticosteroid drug substance or a salt or derivative thereof, and wherein the one or more complexation agents comprises: magnesium stearate and tocopherol; wherein the corticosteroid drug substance is a corticosteroid or salt or derivative thereof from any one of: fluocinolone, fluocinolone acetonide, dexamethasone, dexamethasone phosphate, dexamethasone sodium phosphate, triamcinolone, and triamcinolone acetonide; further wherein the dispersal medium is methyl laurate.

In some examples a multiphasic colloidal suspension composition includes: a corticosteroid drug substance and one or more complexation agents, admixed in a dispersal medium so that the corticosteroid drug substance has a release profile having one or more phases of drug release, wherein the corticosteroid drug substance is fluocinolone, dexamethasone, triamcinolone or a salt or derivative thereof, between about 10% and 60% by weight, wherein the one or more complexation agents is formulated as an irregular-shaped particulate between about 1% and 50% by weight that forms drug corticosteroid drug substance-complex particulates by noncovalent, reversible binding to the corticosteroid drug substance or a salt or derivative thereof, and wherein the one or more complexation agents is at least one of: stearic acid (octadecanoic acid) or a salt thereof and alpha-tocopherol, further wherein the dispersal medium is a hydrophobic liquid oil comprising methyl dodecanoate (methyl laurate) between 1% and 90% by weight.

As mentioned, the multiphasic colloidal suspension composition may be formulated as a flowable paste or bolus implant configured for direct injection in and around an eye. The multiphasic colloidal suspension composition may be formulated as a tube implant of 2 millimeters or longer, for injection in and around an eye via an injector needle of between 18 gauge and 32 gauge. The multiphasic colloidal suspension composition may be formulated and administered within a hollow tube and the hollow tube comprises one or more open ends that restricts surface erosion of the multiphasic colloidal suspension composition to an exposed surface area at the open ends of the hollow tube. The hollow tube may be erodible and may be comprised of biodegradable or bioresorbable polymers: polylactide (PLA), poly-L-lactide (PLLA), poly-D-lactide (PDLA), poly-DL lactide (PDLLA), polyglycolide (PGA), poly (lactic co-glycolic acid) (PLGA), other copolymers of PLA and PGA, or a combination thereof. In some examples the biodegradable hollow tube is comprised of PLGA polymers with molecular weight of between 150,000 and 300,000 Daltons and is formed of approximately 70-95% L (lactic acid/lactide) and 5-30% G (glycolic acid/glycolide).

For example, a multiphasic colloidal suspension composition may include: a corticosteroid drug substance and one or more complexation agents, admixed in a dispersal medium, wherein the corticosteroid drug substance is fluocinolone, dexamethasone, triamcinolone or a salt or derivative thereof, between about 10% and 60% by weight, wherein the one or more complexation agents is formulated as an irregular-shaped particulate between about 1% and 50% by weight that forms drug corticosteroid drug substance-complex particulates by noncovalent, reversible binding to the corticosteroid drug substance or a salt or derivative thereof, and wherein the one or more complexation agents comprises: stearic acid (octadecanoic acid) or a salt thereof and alpha-tocopherol, further wherein the dispersal medium is a hydrophobic liquid oil comprising methyl dodecanoate (methyl laurate) between 1% and 90% by weight.

Also described herein are methods of formulating any of these compositions and/or therapeutic methods of using any of these compositions to treat one or more indications. For example, a method of treating a disorder or disease of an eye, the method comprising: administering a multiphasic colloidal suspension containing a corticosteroid drug substance to the eye, into one or more of: a vitreous humor, an aqueous humor, a suprachoroidal space, under a retina, under a conjunctiva, beneath Tenon's capsule, or into an orbital tissue, to produce sustained release of therapeutic levels of corticosteroid drug substance, ranging between 1 nanogram to 999 microgram per gram of tissue, within ocular tissues for one or more months.

The multiphasic colloidal suspension may include: a corticosteroid drug substance and one or more complexation agents, admixed in a dispersal medium so that the corticosteroid drug substance has a release profile having one or more phases of drug release, wherein the one or more complexation agents is formulated as an irregular-shaped particulate that forms drug corticosteroid drug substance-complex particulates by noncovalent, reversible binding to the corticosteroid drug substance or a salt or derivative thereof, and wherein one or more complexation agents is one of: stearic acid (octadecanoic acid) or a salt thereof and alpha-tocopherol; wherein the corticosteroid drug substance is a corticosteroid or salt or derivative thereof from any of: fluocinolone, fluocinolone acetonide, dexamethasone, dexamethasone phosphate, dexamethasone sodium phosphate, triamcinolone, triamcinolone acetonide; further wherein the dispersal medium is a hydrophobic liquid oil comprising methyl dodecanoate (methyl laurate).

A method of treating a disorder or disease of an eye may include: administering a therapeutically effective amount of a corticosteroid drug substance from a multiphasic colloidal suspension, wherein the corticosteroid drug substance is one or more of: fluocinolone, fluocinolone acetonide, dexamethasone, dexamethasone phosphate, dexamethasone sodium phosphate, triamcinolone, triamcinolone acetonide; wherein administering comprises injecting, into the eye, the multiphasic colloidal suspension comprising a first complex of the corticosteroid drug substance noncovalently bound to a first complexation agent, and a second complex of corticosteroid drug substance noncovalently bound to a second complexation agent, wherein particulates of each drug substance-complex are admixed within a hydrophobic dispersal medium to form the multiphasic colloidal suspension, thereby limiting diffusion of the corticosteroid drug substance out of the multiphasic colloidal suspension, such that the therapeutically effective amount of corticosteroid is released into tissues of the eye for one or more months.

Also described are methods of treatment of vision loss in a subject, by intravitreal or periocular injection of a formulation of an extended release drug delivery system to produce sustained retina and retinal pigment epithelium (RPE) tissue levels of active drug, the method comprising: delivering a multiphasic colloidal suspension containing a corticosteroid drug substance into the subject's eye at a treatment start, wherein the corticosteroid drug substance comprises one or more of: fluocinolone, fluocinolone acetonide, dexamethasone, dexamethasone phosphate, dexamethasone sodium phosphate, triamcinolone, triamcinolone acetonide; and wherein the corticosteroid drug substance is released in two or more phases, including an initial burst phase and a subsequent phase of drug release at a steady state release rate, wherein the initial burst phase rate is greater than the steady state release rate, further wherein the initial burst phase extends from the treatment start for about 2-6 weeks and the subsequent phase extend from an end of the initial burst phase for one or more months.

In some examples the method may include a method of treating diabetic retinopathy and diabetic macular edema. As described herein, the burst phase rate may be greater than the steady state release rate, further wherein the initial burst phase extends from the treatment start for about 2-6 weeks and the subsequent phase extends from an end of the initial burst phase for one or more months.

In some examples, these method may be methods of treating cystoid macular edema. The method may include a method of treating intraocular inflammation and uveitis. The method may include a method of treating retinal and optic nerve diseases including age-related macular degeneration (AMD), retinitis pigmentosa (RP), glaucoma, optic neuropathy, or for neuroprotection of a retina/or optic nerve.

Also described herein are methods of treating a disorder or disease the method comprising: administering a multiphasic colloidal suspension containing a corticosteroid drug substance to a patient to produce sustained release of therapeutic levels of corticosteroid drug substance, ranging between 1 nanogram to 999 microgram per gram of tissue, within patient tissues for one or more months, wherein the multiphasic colloidal suspension is delivered by one or more of: intra-articular injection, subcutaneous injection, intramuscular injection and intraocular injection.

The multiphasic colloidal suspension may include: a corticosteroid drug substance and one or more complexation agents, admixed in a dispersal medium so that the corticosteroid drug substance has a release profile having one or more phases of drug release, wherein the one or more complexation agents is formulated as an irregular-shaped particulate that forms drug corticosteroid drug substance-complex particulates by noncovalent, reversible binding to the corticosteroid drug substance or a salt or derivative thereof, and wherein one or more complexation agents is one of: stearic acid (octadecanoic acid) or a salt thereof and alpha-tocopherol; wherein the corticosteroid drug substance is a corticosteroid or salt or derivative thereof from any of: fluocinolone, fluocinolone acetonide, dexamethasone, dexamethasone phosphate, dexamethasone sodium phosphate, triamcinolone, triamcinolone acetonide; further wherein the dispersal medium is a hydrophobic liquid oil comprising methyl dodecanoate (methyl laurate).

A method of treating a disorder or disease may include: delivering a multiphasic colloidal suspension comprising a first complex of a corticosteroid drug substance noncovalently bound to a first complexation agent, and a second complex of corticosteroid drug substance noncovalently bound to a second complexation agent, by one or more of intra-articular injection, subcutaneous injection, intramuscular injection and intraocular injection, wherein particulates of each drug substance-complex are admixed within a hydrophobic dispersal medium to form the multiphasic colloidal suspension, thereby limiting diffusion of the corticosteroid drug substance out of the multiphasic colloidal suspension; and releasing a therapeutically effective amount of the corticosteroid drug substance from the multiphasic colloidal suspension into a tissue, wherein the corticosteroid drug substance is one or more of: fluocinolone, fluocinolone acetonide, dexamethasone, dexamethasone phosphate, dexamethasone sodium phosphate, triamcinolone, triamcinolone acetonide; such that the therapeutically effective amount of corticosteroid is released into the tissue for one or more months.

All of the methods and apparatuses described herein, in any combination, are herein contemplated and can be used to achieve the benefits as described herein.

BRIEF DESCRIPTION OF THE DRAWINGS

A better understanding of the features and advantages of the methods and apparatuses described herein will be obtained by reference to the following detailed description that sets forth illustrative embodiments, and the accompanying drawings of which:

FIGS. 1A-1C illustrates an approach of custom design of a formulation for specific pharmacokinetics release profile using the complexation-based extended-release drug delivery system, including in this specific example, one method of configuring a two-phase release profile of an extended-release drug delivery system for release of fluocinolone acetonide as described herein. FIG. 1A illustrates an example of desired 2-phase kinetics, linearized by log transformation, for release of fluocinolone acetonide. FIG. 1B illustrates two complexation components to be used with fluocinolone acetonide ("drug"), including a first complex of fluocinolone acetonide and a fatty acid (e.g., magnesium stearate) in a dispersal medium (e.g., methyl laurate), and a second complex of fluocinolone acetonide and a keto-enol tautomer (e.g., alpha-tocopherol), also in a methyl laurate dispersal medium. FIG. 1C illustrates the experimentally-determined release relate for the formulation including both the first drug complex and the second drug complex.

In FIG. 2B, formulation 1 containing only fluocinolone acetonide complexed with a fatty acid is compared with formulations of varying ratios of fluocinolone acetonide complexed with the fatty acid and fluocinolone acetonide complexed with a keto-enol tautomer: formulation 2-75%/25%; formulation 3-66%/33%; formulation 4-50%/50%.

FIG. 3A shows the percent release of the API (fluocinolone acetonide in this example) over the first 21 days, which simulates standard condition in vitro release over the course of 180 days or longer.

FIG. 3B shows the percent release of the API (triamcinolone acetonide in this example) over the first 21 days, which simulates standard condition in vitro release over the course of 180 days or longer.

FIG. 3C shows the percent release of the API (dexamethasone free base in this example) over the first 21 days, which simulates standard condition in vitro release over the course of 180 days or longer.

FIG. 3D shows the percent release of the API (dexamethasone phosphate in this example) over the first 21 days, which simulates standard condition in vitro release over the course of 180 days or longer.

In FIG. 5A, the formulations contain 10% total corticosteroid API, complexed with 50.4% magnesium stearate and 21.6% alpha-tocopherol and formulated into methyl laurate dispersal medium.

In FIG. 6A, the formulations contain 20% total corticosteroid drug, complexed with 44.8% magnesium stearate and 19.2% alpha-tocopherol and formulated into methyl laurate dispersal medium. FIG. 6B shows release profiles of identical implants as displayed in FIG. 6A assayed under accelerated dissolution conditions with data displayed as % API released. The accelerated release assay data correlates with and replicates the long-term release data.

FIG. 7A shows an example of a bolus injection in which the extended-release corticosteroid formulation is formulated as an injectable semi-solid paste. FIG. 7B is an example in which the extended-release corticosteroid formulation is formulated as a tube implant with a biodegradable sleeve filled with material containing corticosteroid drug and complexation agents. FIG. 7C is an example in which the extended-release corticosteroid formulation is molded into a particular shape with solid state (e.g., solid-form implant). FIG. 7D is an example in which the extended-release corticosteroid formulation material is milled into particles, which may then be resuspended in a compatible vehicle for injection or administration.

(FIG. 11B).

FIG. 12A illustrates the dimensions of an end of a tube (depot). FIG. 12B is a graph showing the release rate over time (days) for two examples of a given extended-release corticosteroid formulation, each released from tubes of different inner diameter/radius (r). As predicted, the formulation within PE10 tube with lower r value has lower release rate as compared to the formulation within PE50 with the higher r value.

In FIG. 13A the bioerodible tube is a tube of PLGA composition 82L/18G tube, showing the tube is intact after all of the drug has been released. FIG. 13B is a graph showing the resulting 2-phase kinetics profile for the tube of FIG. 13A, filled with an extended-release corticosteroid formulation. FIG. 13C shows a bioerodible tube has PLGA composition 80L/20G tube that degrades before all of the drug has been released, resulting in a 3-phase release profile, when releasing an extended-release corticosteroid formulation as shown in FIG. 13D.

FIG. 14A shows the release rate over time of one example of an extended-release corticosteroid formulation (fluocinolone acetonide) that has not been irradiated ("non-irradiated") compared to the same formulation that has been irradiated ("irradiated 40 kGy"). FIG. 14B shows a release rate over time of yet another example of an extended-release corticosteroid formulation (fluocinolone acetonide) that has not been irradiated ("non-irradiated") compared to the same formulation that has been irradiated ("irradiated 40 kGy"). In both cases (FIGS. 14A and 14B), irradiated implants show a higher release rate during initial burst in the first month as well as a higher release rate in the first month of the maintenance phase, as compared to nonirradiated implants.

FIG. 15A illustrates exemplary dimensions of a bioerodable tube. FIG. 15B is a graph comparing the duration of release in vivo of an extended-release corticosteroid formulation over time (days) for a 6 mm long implant vs. a 4 mm long implant. As predicted, the 6 mm long implant provides longer duration of drug release compared to the 4 mm tube implant.

DETAILED DESCRIPTION

Figure 2A:
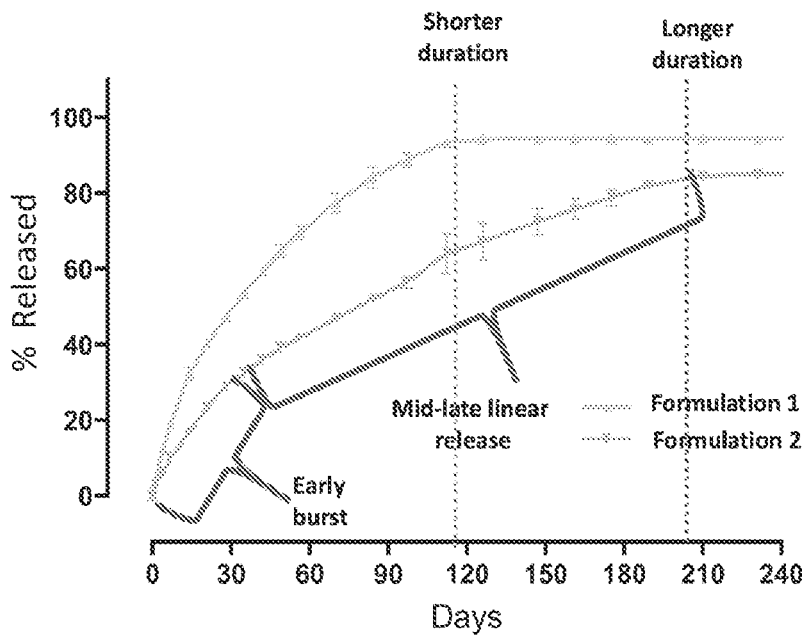
FIG. 2A illustrates how different formulations of drug and complexation agent(s) produce specific and different release kinetics in vitro, wherein the drug release kinetics of each formulation are designed and tuned in a predictable fashion by varying the ratios of, in this example, two different complexation agents. Formulation 1 depicts a shorter duration release profile (i.e., 120 days), while formulation 2 depicts a two-phase release profile with longer duration (i.e., 210 days).

Described herein are compositions of matter, formulations, and methods of forming extended-release corticosteroid formulations. These compositions may be particularly useful for treating conditions which are ameliorated by sustained administration of therapeutically effective concentrations of corticosteroid drugs. These compositions may also be useful in the prevention of disease or complications of certain diseases. Thus, also described herein are methods of using any of these extended-release corticosteroid formulations to treat these conditions. Such conditions include, but are not limited to, diabetic eye diseases, including diabetic macular edema (DME) and diabetic retinopathy (DR). Such conditions further include other retinal vascular diseases such as retinal vein occlusion (RVO) or retinal artery occlusion (RAO). Such conditions further include inflammatory eye diseases such as post-operative inflammation, cystoid macular edema, and uveitis. Such conditions further include macular diseases such as age-related macular degeneration.

Thus, described herein are intravitreal extended release corticosteroid drug delivery systems, also referred to herein as "IVT CS XR." These extended-release corticosteroid formulations provide novel intravitreal therapies to treat DME and DR and may be used to treat other retinal vascular, inflammatory, or degenerative diseases affecting the optic nerve, retina, or posterior segment (i.e., "back of the eye"). The active pharmaceutical ingredient (API) of any of these extended-release corticosteroid formulations, including IVT CS XR may be selected from among the class of corticosteroid drugs, including those described in table 1, below. The corticosteroid may be a hydrocortisone or a hydrocortisone derivative. For example, the drug agent (API) may be fluocinolone acetonide.

Although extended release corticosteroids, including sustained-release fluocinolone acetonide, have been developed for intravitreal administration, these compositions have limitations that are addressed by compositions detailed in the present disclosure. For example, Retisert® is a corticosteroid indicated for the treatment of chronic non-infectious uveitis affecting the posterior segment of the eye. Retisert® is not approved for the treatment of DME. Iluvien® (fluocinolone acetonide intravitreal implant) 0.19 mg is indicated for the treatment of DME in patients who have been previously treated with a course of corticosteroids without developing a clinically significant rise in intraocular pressure. Both products are not biodegradable and release fluocinolone acetonide over the course of 30-36 months. Yutiq®, an implant substantially similar to Iluvien, containing 0.18 mg of fluocinolone acetonide, has been developed and approved for the treatment of noninfectious uveitis. Notably, each of Retisert, Iluvien, and Yutiq provide sustained drug release by use of an impermeable reservoir containing a semipermeable membrane which separates pure API from the external tissue environment. This membrane limits access of water to the API thus mediating extended release of API from the implant over time. Other examples of sustained-release compositions of corticosteroids include Ozurdex®, which contains 700 micrograms of dexamethasone in a poly(lactic-co-glycolic acid) (PLGA) based bioerodible drug delivery system and which is approved for treatment of DME and RVO. In the case of Ozurdex®, the API is trapped within the PLGA polymer matrix and hydrolysis of PLGA in the aqueous environment results in gradual drug release. Ozurdex provides approximately 1-2 months of drug release within the vitreous based on animal (rabbit and nonhuman primate) PK studies.

However, it would be highly desirable to provide sustained-delivery for longer than 2-3 months (e.g. for 5 months or more, 6 months or more, etc.). In particular, it would be highly desirable to have sustained-release corticosteroids having multiple-phase release kinetics that release in a first phase of an initial high tissue drug level, followed by a second (or third, etc.) phase of a lower maintenance tissue drug level, for longer term release. A 6- to 9-month sustained-delivery biodegradable corticosteroid intravitreal therapy would require far fewer intravitreal injections than with current anti-VEGF therapy or corticosteroid injections when dosed on-label and could result in better outcomes among patients unresponsive to anti-VEGF therapy or patients for whom frequent office visits are not possible. Additionally, such a drug product could provide a potential alternative treatment option for those patients requiring a corticosteroid product with a shorter duration of corticosteroid release compared with other sustained-release corticosteroids such as Retisert® and Iluvien®, which release for up to 36 months, and may also have a potentially longer and more consistent release profile than that seen with other products such as Ozurdex®. The compositions and methods described herein may provide much more controllable and reliable extended release corticosteroid compositions.

The extended release formulations of corticosteroid drugs described herein can be manufactured, wherein the corticosteroid drug is incorporated into a novel extended release drug delivery system (XRDDS) for ocular delivery (e.g., intravitreal delivery) that is based on the chemistry of complexation systems and that incorporates one or more complexation agents.

In contrast to a reservoir system with semipermeable membrane, the complexation-based XRDDS described herein can be tuned to provide a wide variety of drug release profiles and durations suitable to diverse intended uses. These compositions can be used without a membrane or complex release assembly.

In general, the sustained-release corticosteroid drugs described herein may form noncovalent complexation interactions with one or more complexation agent(s) of the XRDDS; the interaction of drug and complexation agent(s) may hinder diffusion and regulate release of the drug out of the drug delivery system implant. Specific complexation agents can be chosen to optimize avid noncovalent interactions for a given corticosteroid drug based on the physicochemical properties of the given drug, wherein the drug and complexation agent are admixed to form "drug-complex" particulates, and drug release rate from a given drug-complex pair can be measured by in vitro assay of drug release into "in sink" conditions. The relative avidity of drug-complexation agent noncovalent interactions can be measured by "$K_d$", defined as the ratio of unbound to bound drug agent (e.g., corticosteroid) in a specified release assay. One or more sets of "drug-complex" particulates are incorporated and dispersed within a specific dispersal medium to form the extended release drug delivery system.

Two or more sets of "drug-complex" particulates with distinct $K_d$ values can be combined by mixing and then formulated in different ratios and amounts to specifically design, customize, and "tune" a target drug kinetic release profile (i.e., daily drug release rate) using a mathematical formula that takes into account the individual $K_d$ values and integrates the drug release rates of the individual sets of drug-complex particulates when combined in dispersal medium. The target release profile can be designed with one or more phases of release kinetics, for a given drug payload and a desired duration of drug release.

For example, FIGS. 1A-1C illustrates a theoretical basis for design and construction of an extended release drug delivery system (XRDDS) implant producing a desired drug release kinetic profile for a corticosteroid drug. Initially, a theoretical pharmacokinetic release curve (i.e., target release profile), as depicted in FIG. 1A as linearized by log transformation, is designed representing the desired initial burst phase and subsequent steady-state maintenance release phase, to give desired daily release rate, total duration of delivery, and drug payload in the final extended release drug delivery system implant. An iterative process may be performed to identify specific member compounds from 2 or 3 difference classes of complexation agents, expected to form noncovalent interactions with the particular corticosteroid drug based on the physicochemical properties of the drug. Each drug-complexation agent is first combined at initial amount and ratio and drug-complex particulates are then admixed and incorporated within a proposed dispersal medium. As shown in FIG. 1B, the drug-complex-medium system may be put into "sink" conditions and two properties of the drug-complex pair are measured: the $K_d$ (unbound-bound ratio) at day 1, 3, 7, 14, and 21 (a good indicator of burst and general binding avidity); and the release kinetics (% of initial payload of drug released over time), where $K_{d1}$ corresponds to drug-complex 1 and $K_{d2}$ corresponds to drug-complex 2.

Curve fitting is then applied to the release curve of each drug-complex, and the linearized curves are then solved to determine the right combination (of 2 or 3 specific drug-complex pairs) that give release kinetics that meet the pre-determined desired composite target product profile. In FIG. 1C, the designer may then experimentally determine the $K_d$ (e.g., release rate) of the first and second drug complexes (drug complex 1, drug complex 2), and the combined ("blend") extended release corticosteroid composition.

As shown in FIG. 2, "theoretically-designed" formulations (e.g., Formulation 1 and Formulation 2) containing the combination of one or more drug-complex pairs may then be formulated and tested for actual release kinetics. If necessary, the ratios of the 2-3 selected drug-complex pairs can be re-adjusted iteratively until the final release kinetics meet the predetermined target product release profile.

The composite extended release drug delivery system may be designed and customized for the physicochemical properties of the API (e.g., a corticosteroid drug) to regulate its release into the tissue, e.g., from a drug depot. In the case of an extended release corticosteroid composition (e.g., CS XR) as described herein, the release of the API (corticosteroid) may occur primarily along an external drug delivery system implant-tissue interface, as complexed API is released from complexation interactions allowing diffusion of the free API to the XRDDS implant interface, where the drug becomes bioavailable for release into the tissue.

The XRDDS depends on selection of complexation agents with appropriate affinity and avidity for the API in consideration, as well as selection of a dispersal medium in which the dissolved API is sparingly soluble. The interactions between API and complexation agent and/or dispersal medium can be predicted based on the Octanol Solubility Index (OSI) and Topological Polar Surface Area (TPSA) of the API. TPSA is a calculated measure of a molecule's polarity based on the number of polar atoms contained in the molecule. OSI is a measure of compound lipophilicity and can be calculated using the log P and maximal aqueous solubility of the compound by the formula:

$$OSI = \log P + \log(\text{aqueous solubility})$$

APIs with similar OSI and TPSA will function similarly within a given formulation of the XRDDS due to the fact that their interactions with the selected complexation agents and dispersal medium will be substantially similar. This is demonstrated by the fact that four corticosteroid APIs with similar OSI and TPSA such as fluocinolone acetonide (OSI 3.48, TPSA 93.1 Å), dexamethasone free base (OSI 3.85, TPSA 94.8 Å), dexamethasone phosphate (OSI 3.71, TPSA 141 Å) and triamcinolone acetonide (OSI 3.82, TPSA 93.1 Å) can all be formulated for extended release in our XRDDS in which magnesium stearate and alpha-tocopherol act as complexation agents and in which methyl laurate is the dispersal medium.

The extended release drug delivery systems described herein includes components, i.e., complexation agents, that form noncovalent interactions with corticosteroid drugs described herein for delivery into the vitreous or periocular tissues, so that the drug is released into the vitreous or ocular tissues with target tissue drug levels over the desired duration for a given drug payload.

Complexation-based extended release drug delivery systems as described herein use complexation of a drug to one or more complexation agent(s) to regulate the kinetics of the ocular drug release. In some examples, the extended release drug delivery system is formulated with one or more complexation agents, complexed with the drug, so that the drug complexes with the complexation agent(s), and may be held in a bio-erodible or non-erodible implant. In general, the extended release drug delivery system is formulated so that it will administer the specific active pharmaceutical ingredient(s) (e.g., corticosteroid drugs) with drug release kinetics that are optimized for the specific therapeutic goal for a particular route of administration.

The extended release drug delivery systems described herein are based on the noncovalent complexation of the corticosteroid drug onto one or more complexation agents to form particulates dispersed in a specific dispersal medium. A specific drug-complexation agent particulate ("drug-complex") demonstrates unique release kinetics determined by the "$K_d$" (unbound-bound ratio) which can be measured in a drug release assay.

Although the majority of the extended release corticosteroid compositions described herein typically include one corticosteroid (e.g., a Hydrocortisone derivative) API, multiple corticosteroids (or other APIs) may be incorporated and formulated into the same composition using the same principles described herein, including estimating the release kinetics and selection of one or more (e.g., two or more) complexation agents to form particulates of noncovalently bound drug-complexation agents with different $K_d$s.

A wide range of substances can serve as complexation agents for purposes of drug delivery, forming particulates of noncovalently bound drug-complexation agent with different $K_d$(bound-unbound coefficient) and therefore different unbound fractions. In the extended release drug delivery systems described herein, rather than use complexation to improve bioavailability, these formulations instead use complexation to limit drug bioavailability by incorporation into specific dispersal medium and restriction of drug-complexes within the extended release drug delivery system. Complexation agents can be divided into categories (mechanism of complexation), class (specific subtype in a category) and/or by different members within one class. There may be benefits to using multiple complexation agents, including using different complexation agents of different classes within the same formulation in order to achieve the multi-phasic release profiles within a desired or target dose range.

Complexes of corticosteroid drugs and selected complexation agents can be generated by various methods of mixing known to those skilled in the art. Desired ratios of corticosteroid drug complexes can then be dispersed within the dispersal medium and subsequently formulated in numerous configurations or modalities as shown in FIG. 7 and delivered into the eye or around the eye (i.e., periocular) by various routes and in various forms, as shown in FIG. 8

Examples of different classes of complexation agents that form drug complexes by adsorption include neutral fatty acids and organic compounds that can form keto-enol tautomer.

In addition, a number of different substances can serve as dispersal medium for purposes of drug delivery, serving to disperse drug-complex particulates within the extended release drug delivery system and creating a matrix of selected drug-complex particulates. The overall effect is to limit diffusion of drug and restrict access of water from surrounding tissue to the particulates and free drug within the extended release drug delivery system. As free (i.e., unbound) drug reaches the implant-tissue interface, it is released by diffusion. Secondarily, as the dispersal medium and particulates biodegrade over time, free drug is released into tissue.

Examples of dispersal medium include classes of oils, liquid lipids, and semi-solid lipids, including but not limited to saturated fatty acid (methyl) esters, saturated fatty acid (ethyl) esters, unsaturated fatty acid (methyl) esters, unsaturated fatty acid (ethyl) esters, and other types of fatty acid esters.

Figure 7A:
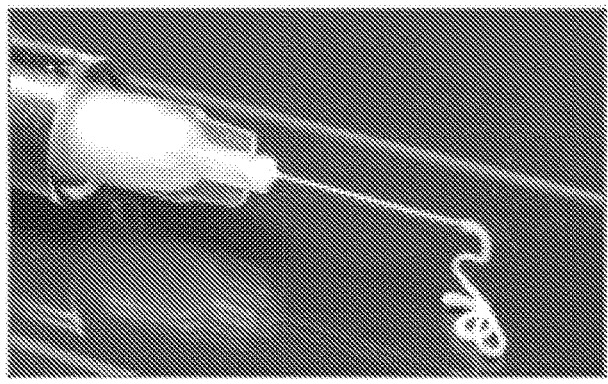
FIGS. 7A-7D illustrate examples of delivery forms or modalities for delivering any of the extended-release drug delivery systems, which may be comprised of one or more complexation agents noncovalently complexed with a corticosteroid drug.
Figure 7B:
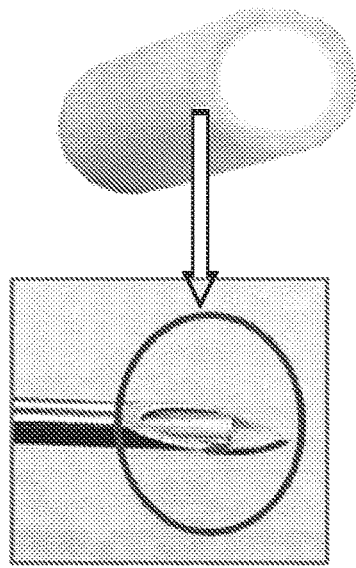
Figure 7C:
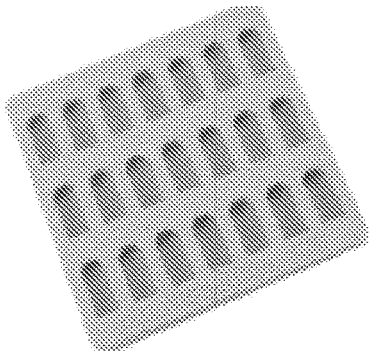
Figure 7D:
Figure 8:
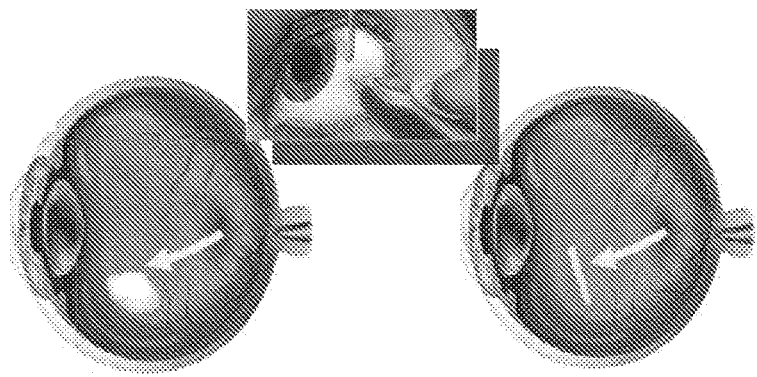
FIG. 8 illustrates two methods of injecting the extended-release corticosteroid formulation into the eyes, either as a bolus injection or a tube implant.

As illustrated in FIGS. 7A-7D and 8, the extended release drug delivery system may be formulated into a variety of different implant modalities, including but not limited to a flowable paste (as shown in FIG. 7A) that forms a bolus, a tube (as shown in FIG. 7B) comprised of a biodegradable sleeve containing extended release drug delivery system material, solid molds of specific size and shape (as shown in FIG. 7C), milled particles of extended release drug delivery system material suspended in a compatible vehicle (as shown in FIG. 7D), milled powder formulated in a compatible vehicle, etc., which may be delivered or inserted via injector, syringe and needle, microneedle, etc., into the body (e.g., into the eye), and which are all suitable for intravitreal route of administration (as shown in FIG. 8), or alternatively, for periocular route of administration.

Certain implant modalities of the extended release drug delivery system, including the bolus form (FIGS. 7A and 8) and the filled tube form (FIGS. 7B and 8) must be formulated as a flowable paste with specific physical properties. One property is formulation viscosity which can be defined by the Einstein viscosity coefficient $\mu_f$:

$$\mu_f = (1 + \alpha_f \varphi)\mu_d$$

Where $\alpha_f$ is a coefficient of lubricated friction of the dispersal medium, $\varphi$ is the particle fraction of solid API and complexation agents to dispersal medium, and $\mu_d$ is the viscosity of the dispersal medium. Thus, the desired payload of API, the required volume of complexation agent, and the physical properties of the dispersal medium define the suitability of a given formulation for preparation in the bolus or tube form of the XRDDS. The acceptable range of API, complexation agent and dispersal medium as a proportion of the formulation can be predicted based on previously defined acceptable pfvalues for a given implant.

Using the approach described herein, the actual release kinetics of the extended release drug delivery system may be designed and confirmed to achieve in vivo vitreous concentrations that meet a known, effective threshold for an extended release duration (e.g., from 1 to 12 months or longer).

Extended release drug delivery systems are devices, formulations, or other systems used in the design, manufacture, and administration of specific drugs, in a manner that regulates release kinetics optimized for specific therapeutic goal for a particular route of administration.

Prior art of extended release drug delivery systems can be in the form of retention vehicles, such as suspensions, oils, or emulsions. Retention vehicle-based formulations are those that utilize unmodified drug admixed or imbedded within a retention vehicle. Retention vehicles may maximize free drug and improve drug release kinetics by optimizing drug solubility through hydrophobic or hydrophilic interactions in a chemically modified vehicle. Examples include excipient-modified aqueous vehicles, oils, oil-in-water emulsions and water-in-oil emulsions, each taking advantage of the properties of the retention vehicle to slow the release of drug. In such retention-vehicle based formulations, the retention vehicle may be the target of chemical or physical modification in order to optimize its properties; the drug itself is not targeted but enhanced solubility of the drug provided by the retention vehicle facilitates its dissolution and release into the surrounding tissue.

Other drug delivery systems can be in the form of a carrier system or reservoir, including liposomes, polymers, rods, and the like. Reservoirs and drug eluting systems may be non-erodible drug delivery devices that are designed to allow diffusion of drug from a device that does not dissolve or erode; these devices can be in one of several forms or modalities, including self-contained sutured inserts, non-erodible injectable plastic tubes, drug coated screws, surgically implanted reloadable ports, etc. Carrier-based systems represent a passive-release, bio-erodible formulation strategy. Carrier-based systems may be designed to physically trap the drug in a specific carrier, but the carrier system then degrades via interactions with the tissue, rather than from a mechanism intrinsic within the extended release drug delivery systems, to release free drug. In some embodiments, carrier formulations include a single device that compartmentalizes drug from the tissue. These may include: polymer-based rods or other shapes, in which drug is trapped in a chemical carrier substance that is extruded into rods or molded into different shapes; and hydrogel rods or other shapes, in which drug is trapped in the hydrogel carrier. Drug-trapped-in-carrier systems also include polymer-based microparticles, which require chemical covalent crosslinking of small block polymers to trap drug; liposomes, which represent phospholipid-in-water emulsion, sonicated to trap drug; solid lipid particles, in which drug is trapped within solid lipid microspheroids coated with emulsifier; and others. The common feature of all carrier-based systems is that the drug is trapped within the carrier material; as the carrier degrades, dissolves, or otherwise breaks down, free drug is released into the tissue. This may require a chemical or enzymatic reaction provided by the tissue microenvironment.

The extended release drug delivery systems described herein are novel and differentiated from previously conceived and designed systems because they instead utilize the chemistry of complexation systems specifically for extended release drug delivery, e.g., to the eye; a method and approach for which there is no existing prior art for ocular drug delivery. The present system uses complexation of a drug onto one or more complexation agent(s) as a method to restrict diffusion of the drug and to regulate the kinetics of drug release into ocular tissue in a bioerodible modality, device, or formulation.

Noncovalent complexation of a drug onto a complexation agent forms "drug-complex" particulates, wherein the drug substance has specific avidity for the complexation agent as measured by "$K_d$," the unbound to bound ratio, a value that can be measured in a drug release assay, as illustrated in FIG. 1B.

A wide range of substances can serve as complexation agents for the purposes of drug delivery. Complexation agents can be subdivided by category (mechanism of complexation), by class (specific subtype in a category), and by different members within one class. Examples of different classes of complexation agents that can form "drug-complexes" particulates include but are not limited to: neutral fatty acids and organic compounds that can form keto-enol tautomers.

Multiple sets of "drug-complex" particulates can be combined and incorporated within a specific dispersal medium to form the composite drug delivery system, with the overall drug kinetic release profile determined by mathematical formula integrating the drug release curve of each distinct "drug-complex" particulate, based on its $K_d$ value. This approach allows the purposeful design and customization of release kinetics of the active pharmaceutical ingredient (API) over the desired time duration of release. For example, a combination of two distinct "drug-complexes" can be selected to facilitate a two-phase release profile, wherein a high-release amount of active pharmaceutical ingredient occurs for the first 2-6 weeks (e.g., 3-6 weeks, 3-5 weeks, 4 weeks, etc.) of a first phase of release (i.e., initial "burst" release) followed by a low-release amount of active pharmaceutical ingredient (API) occurs for subsequent 1-11 months of a second phase of release (i.e., prolonged "steady-state" release).

Such two-phase release profiles may be particularly desirable for the treatment and reversal of active disease (i.e., with initial burst phase) followed by sustained maintenance of disease inactivity (i.e., with subsequent maintenance phase). One example is treatment of DME in which macular edema must be reversed and subsequently prevented from recurring.

Alternatively, a single-phase release may be desirable for the prevention of disease progression or onset, such as is seen when treating background diabetic retinopathy.

A three-phase release profile may be desirable when a drug exhibits prolonged pharmacodynamic effects relative to its pharmacokinetics (i.e. a PK-PD disconnect) such as can be seen for corticosteroid drugs. In this case the third phase in which a burst of drug is released may provide added durability of treatment effect beyond what can be achieved by two-phase release implants.

The present extended release drug delivery system is comprised of multiple components specifically chosen based on the physiochemical properties of drug substance. Rather than improving bioavailability, the noncovalent complexation interaction of the "drug-complex" particulate limits the diffusion of the drug substance out of the drug delivery system into the tissue, when implanted into the body.

In the extended release drug delivery systems described herein, the drug substance is a corticosteroid drug. The specific complexation agent(s) form noncovalent interactions with the selected drug to form particulates dispersed within a specific dispersal medium. The identity of specific complexation agents, their incorporation into a specific dispersal medium, and their specific ratios in combination can be purposefully selected and designed to achieve a specific target drug release profile, optimizing drug release kinetics and duration of release for the treatment of various eye disorders. Release of the corticosteroid drug from the composite extended release drug delivery system is dependent on the diffusion of the drug to the surface of the extended release drug delivery system implant and on release of the drug by dissolution of XRDDS components.

In this manner, the extended release drug delivery systems described herein utilize complexation systems for regulation of drug release; specific noncovalent interaction of selected complexation agent(s) with corticosteroid to form one or more "drug-complex" particulates, each with distinct avidity and release profile; and customization of specific ratios and amounts of drug-complex particulates in combination for purposeful design of a specific target drug release profile, is novel and is easily differentiated from prior art of extended release drug delivery systems of retention vehicle, and carrier-based passive-release systems for ocular drug delivery.

Adsorption is the noncovalent binding of a chemical substance to the surface of a particle, cell, scaffold, membrane, or other large molecule. Simple nonpharmaceutical adsorption systems are well established and have been studied extensively in disciplines outside of drug delivery. Adsorption is mediated by particle surface irregularity which is qualitatively defined by an irregular, carved, complex, and/or porous surface at the microscopic level resulting in high surface area relative to particle volume. Particle surface irregularity is defined quantitatively by the Brunauer-Emmett-Teller (BET) method of surface area measurement utilizing measured gas adsorption of the microparticulate substance. In general, microparticulate substances with calculated BET surface area greater than about 2.0 $m^2 g^{-1}$ are suitable for use as complexation agents, and are referred to herein as "an irregular-shaped particulate."

The adsorption-desorption equilibrium coefficient $K_d$ has been well defined. Different shapes of curves, adsorption isotherms, have been identified, confirming linear, logarithmic, and "S" shaped curves of chemical substance release patterns based the nature and avidity of noncovalent interactions. Adsorption is particularly important in soil sciences, where the adsorption-desorption properties are particularly important for nutrients, fertilizers, defoliants, insecticides, and in the oil industry.

Of the complexation strategies, adsorption complexation is best known in the pharmaceutical sciences in the form of drug binding to plasma proteins in the blood, drug coatings on solid scaffolds for in situ drug release (e.g., drug-eluting stents), and affixation of excipients to insoluble drugs in order to improve oral bioavailability and absorption. However, until now, there is no extended release drug delivery system for ocular drug delivery that is based on complexation systems, or that utilize drug-adsorption noncovalent interactions with complexation agents, to regulate release of drug from the drug delivery system implant into ocular tissue.

Extended Release Corticosteroid Compositions

As detailed above, the key components of the extended release corticosteroid compositions described herein include the corticosteroid, a first complexation agent that noncovalently complexes with the corticosteroid, optionally a different second (or more) complexation agent that noncovalently complexes with the corticosteroid, and a hydrophobic dispersal medium. The complex of the corticosteroid with the first complexation agent and the complex of the corticosteroid with the second (or more) complexation agent(s) may form complexes that are suspended within the hydrophobic dispersal medium. As detailed above, the complex of the corticosteroid with the first complexation agent may have a first release rate for the corticosteroid and the complex of the corticosteroid with the second (or more) complexation agent(s) may have a second (or more) release rate for the corticosteroid; the blended release kinetics may result in a release profile for the corticosteroid that has two or more phases, including an early burst phase that last from between 2-6 weeks, followed by a mid to late phase extending 1 to 11 months or longer, and optionally a third phase of release kinetics. The percentage of corticosteroid released during the mid to late phase may be relatively constant at between 0.2 percent per day (e.g., +/−0.1, e.g., +/−0.05, +/−0.06, +/−0.07, +/−0.08, +/−0.09, +/−0.1, +/−0.11, +/−0.12, +/−0.13, +/−0.14, +/−0.15). The percent released per day during the burst phase may be 1.5-2-fold or higher (e.g., 1.5 times, 2.5 times, 3 times, 3.5 times, 4 times, etc.) than the percent released per day during the second, mid to late release phase.

In general, the corticosteroid may be any corticosteroid, including progesterone and progesterone-derived ("progesterone type") corticosteroids, hydrocortisone and/or hydrocortisone-derived ("hydrocortisone type") corticosteroids, methasone and/or methasone derived ("Methasone-type (16-methylated)type") corticosteroids, or acetonides ("acetonide type") corticosteroids. Table 1 lists examples of corticosteroids that may be used.

TABLE 1 list of corticosteroids that may be used in
the compositions and methods described herein Cortisol (hydrocortisone)
11-Dehydrocorticosterone (11-oxocorticosterone, 17-deoxycortisone)
21-hydroxypregn-4-ene-3,11,20-trione
11-Deoxycorticosterone (deoxycortone, desoxycortone; 21-hydroxyprogesterone)
21-hydroxypregn-4-ene-3,20-dione
11-Deoxycortisol (cortodoxone, cortexolone)
17α,21-dihydroxypregn-4-ene-3,20-dione
11-Ketoprogesterone (11-oxoprogesterone; Ketogestin)
pregn-4-ene-3,11,20-trione
11β-Hydroxypregnenolone
3β,11β-dihydroxypregn-5-en-20-one
11β-Hydroxyprogesterone (21-deoxycorticosterone)
11β-hydroxypregn-4-ene-3,20-dione
11β,17α,21-Trihydroxypregnenolone
3β,11β,17α,21-tetrahydroxypregn-5-en-20-one
17α,21-Dihydroxypregnenolone
3β,17α,21-trihydroxypregn-5-en-20-one
17α-Hydroxypregnenolone
3β,17α-dihydroxypregn-5-en-20-one
17α-Hydroxyprogesterone
17α-hydroxypregn-4-ene-3,11,20-trione
18-Hydroxy-11-deoxycorticosterone
18,21-dihydroxypregn-4-ene-3,20-dione [4]
18-Hydroxycorticosterone
11β,18,21-trihydroxypregn-4-ene-3,20-dione
18-Hydroxyprogesterone
18-hydroxypregn-4-ene-3,20-dione [5]
21-Deoxycortisol
11β,17α-dihydroxypregn-4-ene-3,20-dione,
21-Deoxycortisone
17α-hydroxypregn-4-ene-3,11,20-trione
21-Hydroxypregnenolone (prebediolone)
3β,21-dihydroxypregn-5-en-20-one
Aldosterone
11β,21-dihydroxypregn-4-ene-3,18,20-trione
Corticosterone (17-deoxycortisol)
11β,21-dihydroxypregn-4-ene-3,20-dione
Cortisol (hydrocortisone)
11β,17α,21-trihydroxypregn-4-ene-3,20-dione
Cortisone
17α,21-dihydroxypregn-4-ene-3,11,20-trione
Pregnenolone
pregn-5-en-3β-ol-20-one
Progesterone
pregn-4-ene-3,20-dione
Flugestone (flurogestone)
9α-fluoro-11β,17α-dihydroxypregn-4-ene-3,20-dione
Fluorometholone
6α-methyl-9α-fluoro-11β,17α-dihydroxypregna-1,4-diene-3,20-dione
Medrysone (hydroxymethylprogesterone)
6α-methyl-11β-hydroxypregn-4-ene-3,20-dione
Prebediolone acetate (21-acetoxypregnenolone)
3β,21-dihydroxypregn-5-en-20-one 21-acetate
Chloroprednisone
6α-chloro-17α,21-dihydroxypregna-1,4-diene-3,11,20-trione
Cloprednol
6-chloro-11β,17α,21-trihydroxypregna-1,4,6-triene-3,20-dione
Difluprednate
6α,9α-difluoro-11β,17α,21-trihydroxypregna-1,4-diene-3,20-dione 17α-butyrate 21-acetate
Fludrocortisone
9α-fluoro-11β,17α,21-trihydroxypregn-4-ene-3,20-dione
Fluocinolone
6α,9α-difluoro-11β,16α,17α,21-tetrahydroxypregna-1,4-diene-3,20-dione
Fluperolone TABLE 1-continued list of corticosteroids that may be used in
the compositions and methods described herein 9α-fluoro-11β,17α,21-trihydroxy-21-methylpregna-1,4-diene-3,20-dione
Fluprednisolone
6α-fluoro-11β,17α,21-trihydroxypregna-1,4-diene-3,20-dione
Loteprednol
11β,17α,dihydroxy-21-oxa-21-chloromethylpregna-1,4-diene-3,20-dione
Methylprednisolone
6α-methyl-11β,17α,21-trihydroxypregna-1,4-diene-3,20-dione
Prednicarbate
11β,17α,21-trihydroxypregna-1,4-diene-3,20-dione 17α-ethylcarbonate 21-propionate
Prednisolone
11β,17α,21-trihydroxypregna-1,4-diene-3,20-dione
Prednisone
17α,21-dihydroxypregna-1,4-diene-3,11,20-trione
Tixocortol
11β,17α-dihydroxy-21-sulfanylpregn-4-ene-3,20-dione
Triamcinolone
9α-fluoro-11β,16α,17α,21-tetrahydroxypregna-1,4-diene-3,20-dione
Dexamethasone
Methasone
Alclometasone
7α-chloro-11β,17α,21-trihydroxy-16α-methylpregna-1,4-diene-3,20-dione
Beclometasone
9α-chloro-11β,17α,21-trihydroxy-16β-methylpregna-1,4-diene-3,20-dione
Betamethasone
9α-fluoro-11β,17α,21-trihydroxy-16β-methylpregna-1,4-diene-3,20-dione
Clobetasol
9α-fluoro-11β,17α-dihydroxy-16β-methyl-21-chloropregna-1,4-diene-3,20-dione
Clobetasone
9α-fluoro-16β-methyl-17α-hydroxy-21-chloropregna-1,4-diene-3,11,20-trione
Clocortolone
6α-fluoro-9α-chloro-11β,21-dihydroxy-16α-methylpregna-1,4-diene-3,20-dione
Desoximetasone
9α-fluoro-11β,21-dihydroxy-16α-methylpregna-1,4-diene-3,20-dione
Dexamethasone
9α-fluoro-11β,17α,21-trihydroxy-16α-methylpregna-1,4-diene-3,20-dione
Diflorasone
6α,9α-difluoro-11β,17α,21-trihydroxy-16β-methylpregna-1,4-diene-3,20-dione
Difluocortolone
6α,9α-difluoro-11β,21-dihydroxy-16α-methylpregna-1,4-diene-3,20-dione
Fluclorolone
6α-fluoro-9α,11β-dichloro-16α,17α,21-trihydroxypregna-1,4-dien-3,20-dione
Flumetasone
6α,9α-difluoro-11β,17α,21-trihydroxy-16a-methylpregna-1,4-diene-3,20-dione
Fluocortin
6α-fluoro-11β,21-dihydroxy-16α-methylpregna-1,4-diene-3,20,21-trione
Fluocortolone
6α-fluoro-11β,21-dihydroxy-16α-methylpregna-1,4-diene-3,20-dione
Fluprednidene
9α-fluoro-11β,17α,21-trihydroxy-16-methylenepregna-1,4-diene-3,20-dione
Fluticasone
6α,9α-difluoro-11β,17α-dihydroxy-16α-methyl-21-thia-21-fluoromethylpregna-1,4-dien-3,20-dione
Fluticasone furoate
6α,9α-difluoro-11β,17α-dihydroxy-16α-methyl-21-thia-21-fluoromethylpregna-1,4-dien-3,20-dione 17α-(2-furoate)
Halometasone
2-chloro-6α,9α-difluoro-11β,17α,21-trihydroxy-16α-methylpregna-1,4-diene-3,20-dione
Meprednisone
16β-methyl-17α,21-dihydroxypregna-1,4-diene-3,11,20-trione
Mometasone
9α,21-dichloro-11β,17α-dihydroxy-16α-methylpregna-1,4-diene-3,20-dione
Mometasone furoate
9α,21-dichloro-11β,17α-dihydroxy-16α-methylpregna-1,4-diene-3,20-dione 17α-(2-furoate)
Paramethasone
6α-fluoro-11β,17α,21-trihydroxy-16α-methylpregna-1,4-diene-3,20-dione
Prednylidene
11β,17α,21-trihydroxy-16-methylenepregna-1,4-diene-3,20-dione
Rimexolone
11β-hydroxy-16α,17α,21-trimethylpregna-1,4-dien-3,20-dione
Ulobetasol (halobetasol)
6α,9α-difluoro-11β,17α-dihydroxy-16β-methyl-21-chloropregna-1,4-diene-3,20-dione TABLE 1-continued list of corticosteroids that may be used in
the compositions and methods described herein Amcinonide
9α-fluoro-11β,16α,17α,21-tetrahydroxypregna-1,4-diene-3,20-dione cyclic
16α,17α-acetal with cyclopentanone,21-acetate
Budesonide
11β,16α,17α,21-tetrahydroxypregna-1,4-diene-3,20-dione cyclic 16α,17α-acetal
with butyraldehyde
Ciclesonide
11β,16α,17α,21-tetrahydroxypregna-1,4-diene-3,20-dione cyclic 16α,17α-acetal
with (R)-cyclohexanecarboxaldehyde,21-isobutyrate
Deflazacort
11β,21-dihydroxy-2'-methyl-5'H-pregna-1,4-dieno[17,16-d]oxazole-3,20-dione
21-acetate
Desonide
11β,16α,17α,21-tetrahydroxypregna-1,4-diene-3,20-dione cyclic 16α,17α-acetal
with acetone
Formocortal (fluoroformylone)
3-(2-chloroethoxy)-9α-fluoro-11β,16α,17α,21-tetrahydroxy-20-oxopregna-3,5-
diene-6-carboxaldehyde cyclic 16α,17α-acetal with acetone,21-acetate
Fluclorolone acetonide (flucloronide)
6α-fluoro-9α,11β-dichloro-16α,17α,21-trihydroxypregna-1,4-dien-3,20-dione
cyclic 16α,17α-acetal with acetone
Fludroxycortide (flurandrenolone, flurandrenolide)
6α-fluoro-11β,16α,17α,21-tetrahydroxypregn-4-ene-3,20-dione cyclic 16α,17α-
acetal with acetone
Flunisolide
6α-fluoro-11β,16α,17α,21-tetrahydroxypregna-1,4-diene-3,20-dione cyclic
16α,17α-acetal with acetone
Fluocinolone acetonide
6α,9α-difluoro-11β,16α,17α,21-tetrahydroxypregna-1,4-diene-3,20-dione cyclic
16α,17α-acetal with acetone
Fluocinonide
6α,9α-difluoro-11β,16α,17α,21-tetrahydroxypregna-1,4-diene-3,20-dione cyclic
16α,17α-acetal with acetone,21-acetate
Halcinonide
9α-fluoro-11β,16α,17α-trihydroxy-21-chloropregn-4-ene-3,20-dione cyclic
16α,17α-acetal with acetone
Triamcinolone acetonide
9α-fluoro-11β,16α,17α,21-tetrahydroxypregna-1,4-diene-3,20-dione cyclic
16α,17α-acetal with acetone
Cortivazol
6,16α-dimethyl-11β,17α,21-trihydroxy-2'-phenyl[3,2-c]pyrazolopregna-4,6-dien-
20-one 21-acetate
RU-28362
6-methyl-11β,17β-dihydroxy-17α-(1-propynyl)androsta-1,4,6-trien-3-one In some examples the corticosteroid is a hydrocortisone type (e.g., hydrocortisone or a hydrocortisone derivative), such as a synthetic hydrocortisone including one or more of: 5 Chloroprednisone (6α-chloro-17α,21-dihydroxypregna-1, 4-diene-3,11,20-tri one), Cloprednol (6-chloro-11β,17α,21-trihydroxypregna-1,4,6-tri ene-3,20-dione), Difluprednate (6α,9α-difluoro-11β,17α,21-tri hydroxypregna-1,4-diene-3, 20-dione 17α-butyrate 21-acetate, Fludrocortisone (9α-fluoro-11β,17α,21-trihydroxypregn-4-ene-3,20-dione), Fluocinolone (6α,9α-difluoro-11β,16α,17α,21-tetrahydroxypregna-1,4-diene-3,20-dione), Fluperolone (9α-fluoro-11β,17α,21-trihydroxy-21-methylpregna-1,4-diene-3,20-dione), Fluprednisolone (6α-fluoro-11β,17α,21-trihydroxypregna-1,4-diene-3,20-dione), Loteprednol (11β, 17α,dihydroxy-21-oxa-21-chloromethylpregna-1,4-diene-3, 20-dione), Methylprednisolone (6α-methyl-11β,17α,21-trihydroxypregna-1,4-diene-3,20-dione), Prednicarbate (11β,17α,21-trihydroxypregna-1,4-diene-3,20-dione 17α-ethylcarbonate 21-propionate), Prednisolone (11β,17α,21-trihydroxypregna-1,4-diene-3,20-dione), Prednisone (17α, 21-dihydroxypregna-1,4-diene-3,11,20-trione), Tixocortol (11β,17α-dihydroxy-21-sulfanylpregn-4-ene-3,20-dione), and Triamcinolone (9α-fluoro-11β,16α,17α,21-tetrahydroxypregna-1,4-diene-3,20-dione). In some examples the corticosteroid is a synthetic hydrocortisone derivative such as Fluocinolone acetonide.

In some examples the corticosteroid is a Methasone-type (e.g., 16-methylated), including one or more of: Alclometasone (7α-chloro-11,17α,21-trihydroxy-16α-methylpregna-1,4-diene-3,20-dione), Beclometasone (9α-chloro-11β,17α, 21-trihydroxy-16β-methylpregna-1,4-diene-3,20-dione), Betamethasone (9α-fluoro-11β,17α,21-trihydroxy-16β-methylpregna-1,4-diene-3,20-dione), Clobetasol (9α-fluoro-11β,17α-dihydroxy-16-methyl-21-chloropregna-1,4-diene-3,20-dione), Clobetasone (9α-fluoro-16β-methyl-17α-hydroxy-21-chloropregna-1,4-diene-3,11,20-trione), Clocortolone (6α-fluoro-9α-chloro-11β,21-dihydroxy-16α-methylpregna-1,4-diene-3,20-dione), Desoximetasone (9α-fluoro-11β,21-dihydroxy-16α-methylpregna-1,4-diene-3, 20-dione), Dexamethasone (9α-fluoro-11β,17α,21-trihydroxy-16α-methylpregna-1,4-diene-3,20-dione), Diflorasone (6α,9α-difluoro-11,17α,21-trihydroxy-16-methylpregna-1,4-diene-3,20-dione), Difluocortolone (6α, 9α-difluoro-11β,21-dihydroxy-16α-methylpregna-1,4-diene-3,20-dione), Fluclorolone (6α-fluoro-9α,11β-dichloro-16α,17α,21-trihydroxypregna-1,4-dien-3,20-dione), Flumetasone (6α,9α-difluoro-11β,17α,21-trihydroxy-16α-methylpregna-1,4-diene-3,20-dione), Fluocortin (6α-fluoro-11β,21-dihydroxy-16α-methylpregna-1,4-diene-3,20,21-trione), Fluocortolone (6α-fluoro-11β,21-dihydroxy-16α-methylpregna-1,4-diene-3,20-dione), Fluprednidene (9α- fluoro-11β,17α,21-trihydroxy-16-methylenepregna-1,4-diene-3,20-dione), Fluticasone (6α,9α-difluoro-11β,17α-dihydroxy-16α-methyl-21-thia-21-fluoromethylpregna-1,4-dien-3,20-dione), Fluticasone furoate (6α,9α-difluoro-11β, 17α-dihydroxy-16α-methyl-21-thia-21-fluoromethylp-regna-1,4-dien-3,20-dione 17α-(2-furoate)), Halometasone (2-chloro-6α,9α-difluoro-11β,17α,21-trihydroxy-16α-methylpregna-1,4-diene-3,20-dione), Meprednisone (16β-methyl-17α,21-dihydroxypregna-1,4-diene-3,11,20-trione), Mometasone (9α,21-dichloro-11β,17α-dihydroxy-16α-methylpregna-1,4-diene-3,20-dione), Mometasone furoate (9α,21-dichloro-11β,17α-dihydroxy-16α-methylpregna-1, 4-diene-3,20-dione 17α-(2-furoate)), Paramethasone (6α-fluoro-11β,17α,21-trihydroxy-16α-methylpregna-1,4-di-ene-3,20-dione), Prednylidene (11β,17α,21-trihydroxy-16-methylenepregna-1,4-diene-3,20-dione), Rimexolone (11β-hydroxy-16α,17α,21-trimethylpregna-1,4-dien-3,20-dione), and Ulobetasol (halobetasol) (6α,9α-difluoro-11β, 17α-dihydroxy-160-methyl-21-chloropregna-1,4-diene-3, 20-dione).

In some examples the corticosteroid is an acetonide or related corticosteroid, such as one or more of: Amcinonide (9α-fluoro-11β,16α,17α,21-tetrahydroxypregna-1,4-diene-3,20-dione cyclic 16α,17α-acetal with cyclopentanone, 21-acetate), Budesonide (11β,16α,17α,21-tetrahydroxy-pregna-1,4-diene-3,20-dione cyclic 16α,17α-acetal with butyraldehyde), Ciclesonide (11β,16α,17α,21-tetrahy-droxypregna-1,4-diene-3,20-dione cyclic 16α,17α-acetal with (R)-cyclohexanecarboxaldehyde, 21-isobutyrate), Deflazacort (11β,21-dihydroxy-2'-methyl-5'H-pregna-1,4-dieno[17,16-d]oxazole-3,20-dione 21-acetate), Desonide (11β,16α,17α,21-tetrahydroxypregna-1,4-diene-3,20-dione cyclic 16α,17α-acetal with acetone), Formocortal (fluoro-formylone) (3-(2-chloroethoxy)-9α-fluoro-11β,16α,17α, 21-tetrahydroxy-20-oxopregna-3,5-diene-6-carboxaldehyde cyclic 16α,17α-acetal with acetone, 21-acetate), Fluclo-rolone acetonide (flucloronide) (6α-fluoro-9α,11-dichloro-16α,17α,21-trihydroxypregna-1,4-dien-3,20-dione cyclic 16α,17α-acetal with acetone), Fludroxycortide (flurandre-nolone, flurandrenolide) (6α-fluoro-11β,16α,17α,21-tetra-hydroxypregn-4-ene-3,20-dione cyclic 16α,17α-acetal with acetone), Flunisolide (6α-fluoro-11β,16α,17α,21-tetrahy-droxypregna-1,4-diene-3,20-dione cyclic 16α,17α-acetal with acetone), Fluocinolone acetonide (6α,9α-difluoro-11β, 16α,17α,21-tetrahydroxypregna-1,4-diene-3,20-dione cyclic 16α,17α-acetal with acetone), Fluocinonide (6α,9α-difluoro-11β,16α,17α,21-tetrahydroxypregna-1,4-diene-3, 20-dione cyclic 16α,17α-acetal with acetone, 21-acetate), Halcinonide (9α-fluoro-11β,16α,17α-trihydroxy-21-chlo-ropregn-4-ene-3,20-dione cyclic 16α,17α-acetal with acetone), and Triamcinolone acetonide (9α-fluoro-11β,16α, 17α,21-tetrahydroxypregna-1,4-diene-3,20-dione cyclic 16α,17α-acetal with acetone).

The first, second or other additional complexation agent may be a neutral fatty acid, an organic compound that can form keto-enol tautomers, a charged phospholipid, an organic compound containing one or more aromatic rings, a large protein, a nucleic acid, or an activated charcoal. As disclosed, the particular complexation agent(s) of the extended release drug delivery system may be selected according to the specific physicochemical properties of the corticosteroid drug. The complexation agents may be selected such that they form noncovalent complexation (adsorption) interactions with the corticosteroid drug. In the case of corticosteroid drugs such as fluocinolone acetonide, dexamethasone free base, dexamethasone phosphate and triamcinolone acetonide, the preferred complexation agents come from the classes of fatty acids (e.g., magnesium stearate) and keto-enol tautomers (e.g., alpha-tocopherol).

For example, when a hydrophobic corticosteroid drug such as fluocinolone acetonide is formulated, fatty acid complexation agents that form moderately avid noncovalent interaction with both the corticosteroid drug and with other fatty acids due to key physicochemical properties, especially hydrophobic interactions and stacking, may be used. Thus, a fatty acid complexation agent (or adjuvant) of an extended release drug delivery system may interact with itself (e.g., other molecules of the same fatty acid), with other additional fatty acids added as a complexation substrate. In some examples, the complexation agent will be one or more C4-C30 fatty acid. These fatty acids may be saturated or unsaturated (e.g., mono-unsaturated or poly-unsaturated). These fatty acids may also be neutral or prepared as a salt (e.g., magnesium stearate, calcium stearate, etc.). For example, the fatty acid may be a fatty acid having a lipid number (e.g., number of carbons) of between C14 and C20, or C14 and C18 (e.g., one or more of, Tetradecanoic acid, pentadecanoic acid, (9Z)-hexadecenoic acid, Hexadecanoic acid, Heptadecanoic acid, Octadecanoic acid, (9Z,12Z)-octadeca-9,12-dienoic acid, (9Z,12Z,15Z)-octadeca-9,12, 15-trienoic acid, (6Z,9Z,12Z)-octadeca-6,9,12-trienoic acid, (5E,9E,12E)-octadeca-5,9,12-trienoic acid, (6Z,9Z,12Z, 15Z)-octadeca-6,9,12,15-tetraenoic acid, (Z)-octadec-9-enoic acid, (11E)-octadec-11-enoic acid, (E)-octadec-9-enoic acid, nonadecanoic acid, eicosanoic acid etc.). In some examples, the fatty acid may be an unbranched fatty acid between C14 and C20. In some examples the fatty acid may be a saturated fatty acid (such as, but not limited to, myristic acid (tetradecanoic acid), palmitic acid (hexadecanoic acid), stearic acid (octadecanoic acid), arachidic acid (eicosanoic acid). Although the examples of fatty acid complexation agents described herein include primarily magnesium stear-ate, preliminary data suggests that any of the above-refer-enced fatty acids (or salts thereof) work equivalently to magnesium stearate and may be used instead of, or in addition to, magnesium stearate.

For example, the complexation agent may be a C18 fatty acid (e.g., stearic acid, or octadecanoic acid) which com-plexes with multiple corticosteroid drugs including fluoci-nolone acetonide, dexamethasone free base, dexamethasone phosphate and triamcinolone acetonide; (see, e.g., FIG. 3, FIGS. 5A-5C and FIGS. 6A-6C, described in greater detail below).

Another class of complexation agents that may be used includes keto-enol tautomers (KET). Some KET undergo redox reactions between charged to neutral state and thus can form high avidity interactions with any neutral or charged API, including certain corticosteroid drugs described herein. Examples of KET which could be used to formulate a corticosteroid drug include but are not limited to: a tocopherol compound or tocopherol derivative (e.g., alpha-tocopherol, alpha-tocopherol acetate, DL-alpha-to-copherol acetate, alpha-tocopherol succinate, 13-hydroxy-alpha-tocopherol, alpha-tocopherol phosphate, alpha-to-copherol methyl ether, beta-tocopherol, delta-tocopherol, gamma-tocopherol, dehydro-gamma-tocopherol, 13-hy-droxy-gamma-tocopherol, tocopherol calcium succinate, etc.), monosaccharides (e.g., D-glucose, aldose, etc.), micro-crystalline cellulose, a phenol compound, a quinone com-pound, a ribonucleic acid compound. Although the examples of KET complexation agents described herein include pri-marily alpha-tocopherol, preliminary data suggests that any of the above-referenced KET work equivalently to alpha-tocopherol and may be used instead of, or in addition to, alpha-tocopherol.

In some examples, a combination of distinct complexation agents from both fatty acid and KET groups may be used with corticosteroid drugs to achieve a drug release profile distinct from that of either complexation agent alone.

In many cases, the optimal complexation agent is determined based on the physicochemical properties of the API to be formulated. FIGS. 5A-5C and FIGS. 6A-6C illustrate in vitro release pharmacokinetic data comparing release kinetics of four different formulations each containing a different corticosteroid API.

APIs with similar OSI and TPSA will function similarly within a given formulation of the XRDDS due to the fact that their interactions with the selected complexation agents and dispersal medium will be substantially similar. This is demonstrated by the fact that four corticosteroid APIs with similar OSI and TPSA such as fluocinolone acetonide (OSI 3.48, TPSA 93.1 Å), dexamethasone free base (OSI 3.85, TPSA 94.8 Å), dexamethasone phosphate (OSI 3.71, TPSA 141 Å) and triamcinolone acetonide (OSI 3.82, TPSA 93.1 Å) can all be formulated for extended release in our XRDDS in which magnesium stearate and alpha-tocopherol act as complexation agents and in which methyl laurate is the dispersal medium (FIGS. 5A-5C and FIGS. 6A-6C).

Figure 6A:
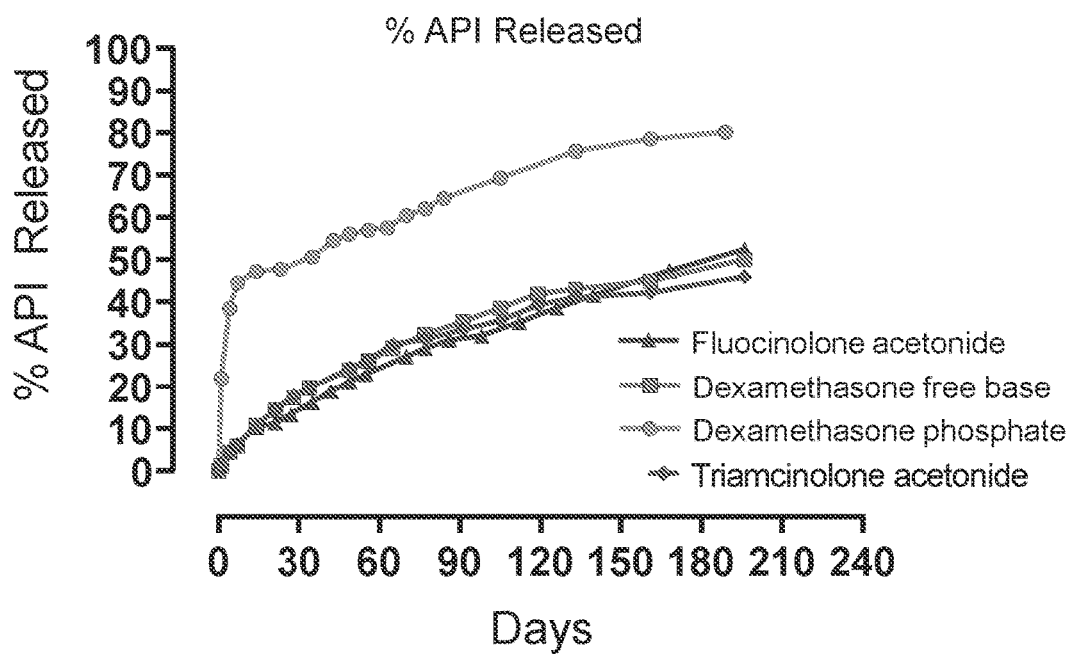
FIGS. 6A and 6B illustrates an example of release profiles for examples of different extended-release corticosteroid formulations as % API released and release rate (ug/day), respectively.

FIG. 6A shows the percent of formulated corticosteroid drug released over time for each formulation. FIG. B shows the same formulations as seen in FIG. 6A assayed under accelerated dissolution conditions. Accelerated dissolution assays were performed herein by incubating implants in phosphate buffered saline under sink conditions at increased temperature, in this case 60 degrees Celsius, and can be used to predict implant drug release in vitro under standard conditions and in vivo. FIG. 6C shows the release rate over time for the same formulations as in FIG. 6A under standard conditions. For these formulations, the composition was 20% corticosteroid API, 44.8% magnesium stearate, 19.2% alpha-tocopherol and 16% methyl laurate. These data demonstrate that many corticosteroid drugs including fluocinolone acetonide, triamcinolone acetonide, dexamethasone free base and dexamethasone phosphate can be formulated for extended release using a multiphasic colloidal suspension-based drug delivery system utilizing magnesium stearate and/or alpha-tocopherol as complexation agents and methyl laurate as a dispersal medium.

FIG. 6A illustrates an example of release profiles obtained under standard conditions for examples of different extended-release corticosteroid formulations as % API released. In FIG. 6A, the extended-release corticosteroid formulations are configured as implants providing a biphasic release curve with an initial burst release phase (with between 10% and 50% of payload released by day 30) followed by a second, maintenance phase. These formulations contain 20% total corticosteroid drug, complexed with 44.8% magnesium stearate and 19.2% alpha-tocopherol and formulated into methyl laurate dispersal medium. FIG. 6A also illustrates the principle that excipient blends are customized for individual APIs; a given blend that produces a desired pharmacokinetic release profile for one API may produce a different pharmacokinetic release profile when used for a second distinct API of equal payload.

Figure 6B:
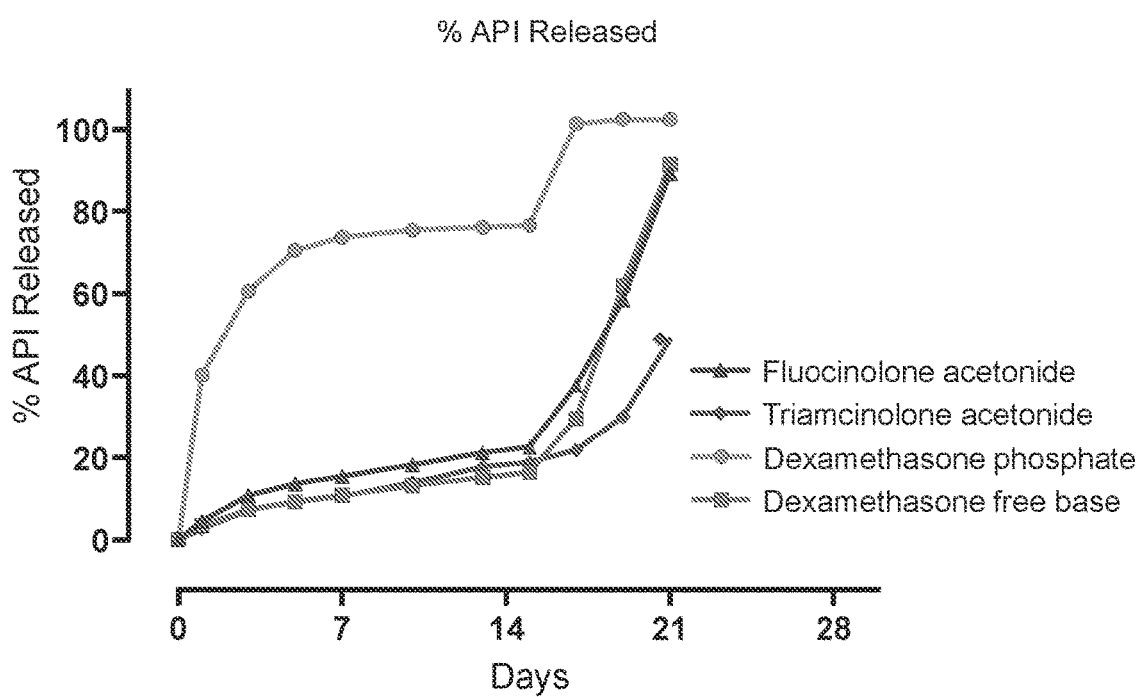
Figure 6C:
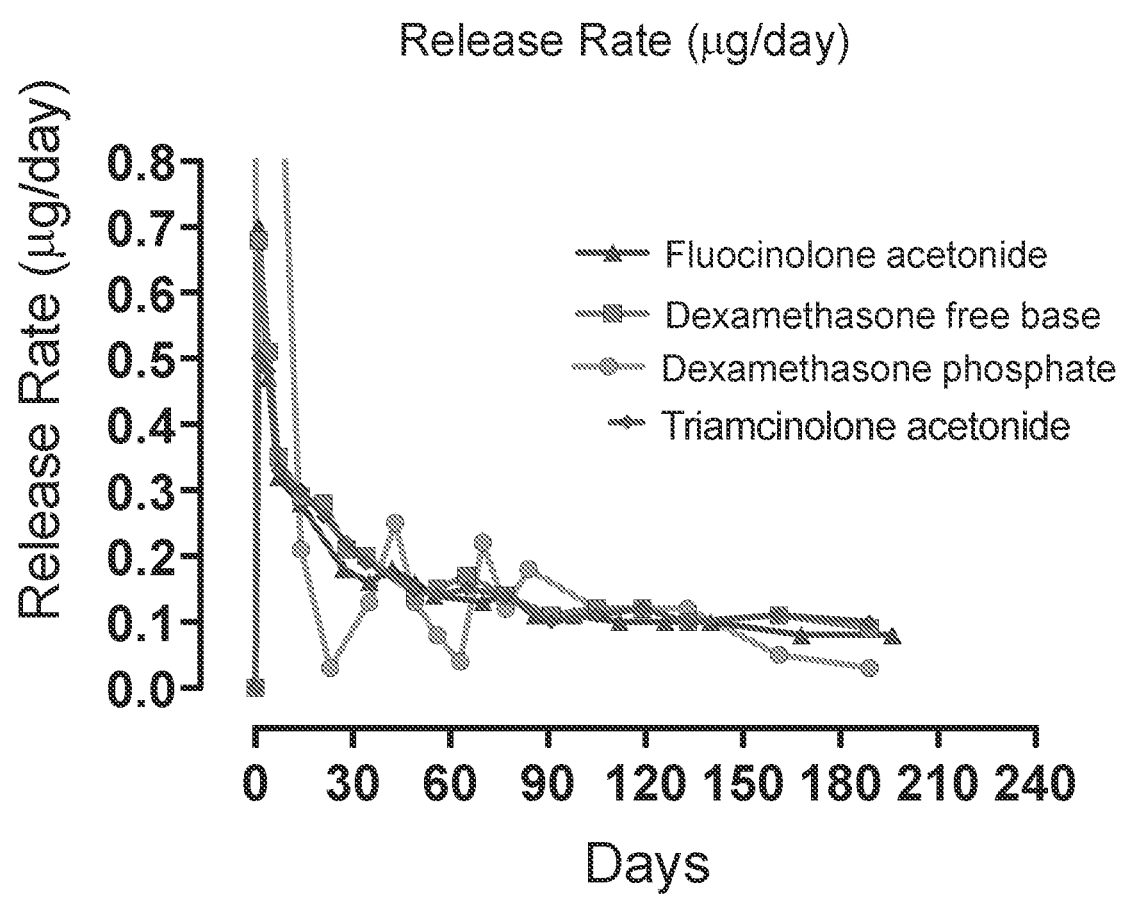
FIG. 6C illustrates release rate data for examples of extended-release corticosteroid formulations, configured as implants providing a biphasic release curve with an initial burst release phase (with between 10% and 50% of payload released by day 30) followed by a second, maintenance phase. These formulations contain 20% total corticosteroid drug, complexed with 44.8% magnesium stearate and 19.2% alpha-tocopherol and formulated into methyl laurate dispersal medium.

FIG. 6B illustrates an example of release profiles obtained under accelerated dissolution conditions for examples of different extended-release corticosteroid formulations as % API released. In FIG. 6B, the extended-release corticosteroid formulations are configured as implants providing a biphasic release curve with an initial burst release phase followed by a second, maintenance phase. Of note, the profile and relative release profiles of formulations containing various corticosteroid APIs are similar in the accelerated dissolution assay as compared to release assays obtained under standard conditions. This illustrates that accelerated dissolution assays can be utilized to characterize release properties of corticosteroid API formulated in the XRDDS. As in FIG. 6A, these formulations contain 20% total corticosteroid drug, complexed with 44.8% magnesium stearate and 19.2% alpha-tocopherol and formulated into methyl laurate dispersal medium. This example further illustrates the principle that excipient blends are customized for individual APIs; a given blend that produces a desired pharmacokinetic release profile for one API may produce a different pharmacokinetic release profile when used for a second distinct API of equal payload.

FIG. 6C illustrates release rate data for examples of extended-release corticosteroid formulations, configured as implants providing a biphasic release curve with an initial burst release phase (with between 10% and 50% of payload released by day 30) followed by a second, maintenance phase. These formulations contain 20% total corticosteroid drug, complexed with 44.8% magnesium stearate and 19.2% alpha-tocopherol and formulated into methyl laurate dispersal medium. This example illustrates the principle that excipient blends are customized for individual APIs; a given blend that produces a desired pharmacokinetic release profile for one API may produce a different pharmacokinetic release profile when used for a second distinct API of equal payload.

A wide range of substances can serve as dispersal medium for purposes of drug delivery, serving to disperse drug-complex particulates within the extended release drug delivery system and creating a matrix of selected drug-complex particulates. The overall effect is to limit diffusion of drug and restrict access of water from surrounding tissue to the particulates and free drug within the extended release drug delivery system. Thus free drug is released at the aqueous-XRDDS interface via diffusion and as the dispersal medium and particulate components biodegrade over time.

Examples of dispersal medium include classes of oils, liquid lipids, and semi-solid lipids. These include saturated fatty acid methyl esters such as: methyl acetate, methyl propionate, methyl butyrate, methyl pentanoate, methyl hexanoate, methyl heptanoate, methyl octanoate, methyl nonanoate, methyl decanoate, methyl undecanoate, methyl dodecanoate (methyl laurate), methyl tridecanoate, methyl tetradecanoate, methyl 9(Z)-tetradecenoate, methyl pentadecanoate, methyl hexadecanoate, methyl heptadecanoate, methyl octadecenoate, methyl nonadecanoate, methyl eicosanoate, methyl heneicosanoate, methyl docosanoate, methyl tricosanoate, and others. These include saturated fatty acid ethyl esters such as: ethyl acetate, ethyl propionate, ethyl butyrate, ethyl pentanoate, ethyl hexanoate, ethyl heptanoate, ethyl octanoate, ethyl nonanoate, ethyl decanoate, ethyl undecanoate, ethyl dodecanoate (ethyl laurate), ethyl tridecanoate, ethyl tetradecanoate, ethyl 9(Z)-tetradecenoate, ethyl pentadecanoate, ethyl hexadecanoate, ethyl heptadecanoate, ethyl octadecenoate, ethyl nonadecanoate, ethyl eicosanoate, ethyl heneicosanoate, ethyl docosanoate, ethyl tricosanoate, and others. These also include unsaturated fatty acid esters, including methyl 10-undecenoate, methyl 11-dodecenoate, methyl 12-tridecenoate, methyl 9(E)-tetradecenoate, methyl 10(Z)-pentadecenoate, methyl 10(E)-pentadecenoate, methyl 14-pentadecenoate, methyl 9(Z)-hexadecenoate, methyl 9(E)- hexadecenoate, methyl 6(Z)-hexadecenoate, methyl 7(Z))-hexadecenoate, methyl 11(Z)-hexadecenoate, and so on for various unsaturated methyl and ethyl esters, including but not limited to various methyl tricosenoate molecule entities.

Incorporation of the corticosteroid drug into an extended release drug delivery system may achieve sustained, high, and efficacious tissue drug levels of drug. In their unmodified form, corticosteroid drugs typically have a short half-life, which limits the duration of PK to a maximum of 2-3 months for more insoluble drugs such as triamcinolone acetonide (Triesence). Further, injection of unmodified corticosteroid drugs results in very high, supratherapeutic drug levels following injection, such that very large quantity of drug is injected primarily for achieving the goal of durability of approximately 2-3 months PK release.

The methods and compositions described herein utilizes a strategy with specific examples disclosed herein in which corticosteroid drugs are incorporated into a novel extended release drug delivery system based on the chemistry of complexation systems, which may provide durable extended release at a target release rate for a desired period of time (e.g., typically at least 3 months or greater), following a single IVT or periocular administration.

In examples described herein, incorporation of corticosteroid drugs into an extended release drug delivery system facilitates durable extended release of the corticosteroid drug at a desired target daily release rate, with drug payload then selected to sustain this release rate for a desired duration of release. In such examples, the corticosteroid drug forms noncovalent complexes with selected complexation agent(s), which serves to regulate drug release, since drug-complex particulates of the system hinder release of the drug and drug is released at the implant-tissue interface via diffusion and as the components of the drug delivery system biodegrade over time. This approach overcomes limitations of small molecule size and in some cases, high water solubility of the corticosteroid drugs to produce an extended release pharmacokinetic profile, providing continuous drug levels within the retina and ocular tissues and facilitating dosing with only periodic (e.g., every month, every two months, every three months, every four months, every five months, every six months, etc.) ocular administration.

In examples described herein, corticosteroid drugs may be used with an extended release drug delivery system that may include devices, formulations, or other systems for the administration and formulation of these compositions. These compositions may be configured to have release kinetics that are optimized for intravitreal or periocular injection and may have a pre-determined pharmacokinetic profile for desired tissue drug level and release duration.

The desired extended release profile may be achieved by noncovalent complexation of the corticosteroid drug with one or more complexation agents of an extended release drug delivery system to form particulates that may be dispersed in a dispersal medium. The drug-complexation agent ("drug-complex") particulate has release kinetics determined by the relative avidity of interaction between molecules and which is reflected by $K_d$ (unbound-bound ratio), a value that can be measured in a drug release assay.

In some examples, different sets or pairs of "drug-complex" particulates (i.e., drug with differing complexation agent) are then combined, admixed, and incorporated into a specific dispersal media in specific ratios and quantities, and in different implant modalities, as described herein. The complexation agent(s), their incorporation into a specific dispersal medium, and their specific ratios in combination may be configured for the physicochemical properties of the API (e.g., corticosteroid) and target drug release profile and may be selected (as described herein) to optimize for desired drug release kinetics and duration of release for the treatment indication (e.g., DME).

In some examples, the corticosteroid drug and the drug delivery system (e.g., with one or more complexation agent(s)) are incorporated together to form an extended release formulation suitable for use within the eye or around the eye and having release kinetics providing release over at least one month or longer (e.g., at least 2 months, at least 3 months, at least 4 months, at least 5 months, at least 6 months, etc.) within the vitreous or ocular tissues.

In the presently described extended release drug delivery system, specific formulations achieving a desired target release profile for a given release duration and total payload can be custom designed by mathematical formula and subsequently constructed by iterative refinement.

In examples of custom design by mathematical formula, development of extended release drug delivery system formulations begins with design of a theoretical pharmacokinetic (PK) release curve (i.e., target release profile) representing the desired release profile. In some examples, the desired release profile is a two-phase release profile with initial burst of high daily drug release rate for a finite time period (e.g., 1 month) followed by a subsequent steady-state (e.g., linear release) for a defined period of time (e.g., 1-11 months). This theoretical curve is then used to determine desired daily release rate over time, total duration of delivery, and drug payload in the final extended-release implant. An iterative process is them performed to identify specific potential "member compounds" from 2 or 3 different classes of complexation agents described herein (e.g., fatty acids, keto-enol tautomers, etc.), expected to form noncovalent interaction with the corticosteroid. Each drug-complex pair is admixed to form particulates and added to proposed dispersal medium. The drug-complex-medium system is put into in vitro sink conditions and two properties of the drug-complex particulate are measured: the $K_d$ (unbound-bound ratio) at day 1, 3, 7, 14 and 21 (a good indicator of burst and general binding avidity); and the release kinetics (% of initial payload of drug released over time). Curve fitting analysis (i.e., using appropriate software) is applied to the release curve for each drug-complex particulate pair, and the linearized curves are solved to determine the optimal combination (of 2 or 3 specific drug-complexes) that give release kinetics that meet the pre-determined target product profile. This "theoretically-designed" formulation containing the combination of 2 or 3 drug-complexes are combined and incorporated into the proposed dispersal medium to generate the desired formulation and subsequently test for actual release kinetics in in vitro sink conditions. If necessary, the ratios of the 2-3 selected drug-complexes can be re-adjusted iteratively until the final release kinetics meet the predetermined designed target product profile.

In some examples, the extended release drug delivery system may be formulated to have single-phase release kinetics providing a prolonged period of steady-state drug release (e.g., for 1-11 or more months). Such design may be desirable for prevention of disease or for maintenance of a quiescent disease state via steady-state drug release to prevent the onset of disease manifestations.

In some examples, the extended release drug delivery system may be formulated to have two-phase release kinetics providing an initial 2-6 week (e.g., 4 week) period during which a higher level of corticosteroid drug is released (e.g., "burst" phase), followed by a prolonged period of steady-state, lower level drug release (e.g., for 1-11 or more months). Such design may be desirable for an "loading dose" phase of drug release to reverse pre-existing disease manifestations and a subsequent "maintenance" phase of drug release to prevent the recurrence of disease manifestations.

In some examples, the extended release drug delivery system may be formulated to have three-phase release kinetics, providing an initial 2-6 week (e.g., 4 week) period during which a higher level of corticosteroid drug is released (e.g. "burst" phase), followed by a prolonged period of steady-state, lower level drug release (e.g., for 1-11 or more months), followed by a late period during which a higher level of drug is released (e.g. late "burst" phase). Such design with a third phase of late "burst" may be desirable for settings in which there is loss of potency of drug due to tachyphylaxis, increased triggers or drivers of inflammation or vascular leakage, or a desire for prolonged pharmacodynamic effect that exceeds the pharmacokinetics of the drug.

In some examples, the extended release drug delivery system may include two (or more) complexation agents that each complex with the corticosteroid drug, custom designed by the methods as described herein. A release rate from the formulation may be initially measured by in vitro in sink assay using appropriate analytical methods, e.g., high-performance liquid chromatography (HPLC). For example, in a formulation including two drug-complex pairs, different ratios and amounts of the two drug-complexation pairs will provide different PK release profiles, and the ratios and amounts can be adjusted to optimize a final multi-phase release profile.

EXAMPLES

Figure 2B:
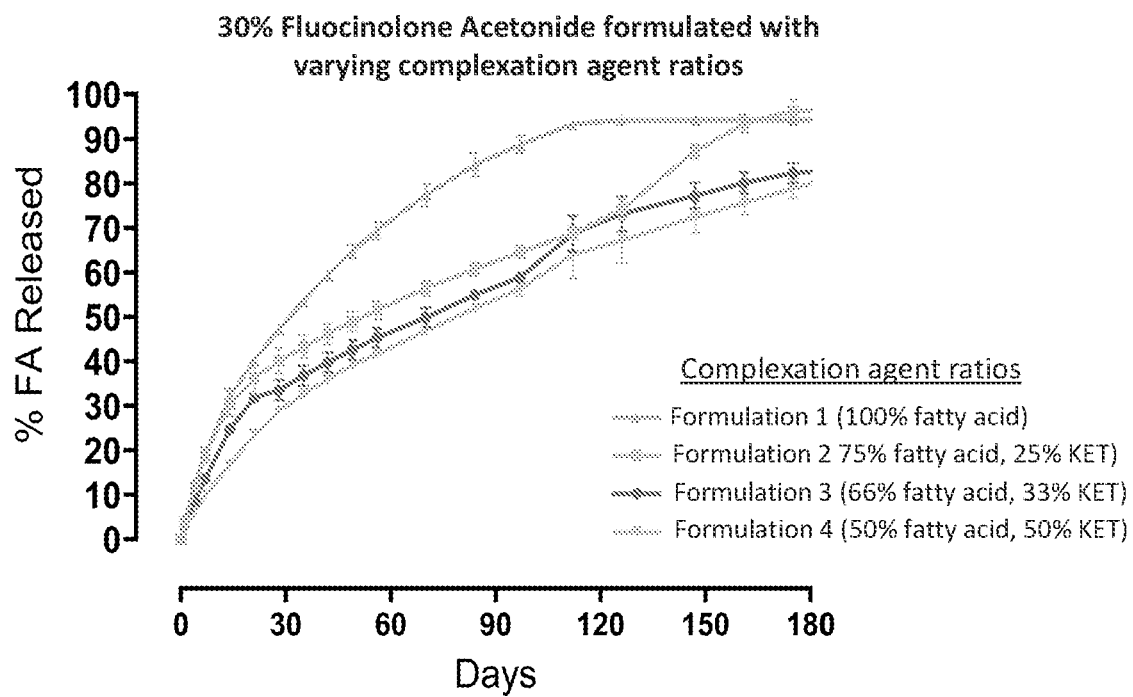
FIG. 2B illustrates that varying the ratio and proportions of complexation agents in the formulations of a given drug payload can be utilized to tune release kinetics in a predictable fashion.

As described above, the release kinetics for any of the extended release corticosteroid composition described herein may be adjusted by inclusion of one or more complexation agents. When two or more complexation agents are used, the percentage of each complexation agent in the final composition may be varied. In some cases (e.g., when "biphasic" release profile is desired), it may be beneficial to use two complexation agents in the extended release corticosteroid composition that is implanted. For example, FIG. 2A shows a comparison between a monophasic extended release corticosteroid composition (having a single complexation agent) and a biphasic extended release corticosteroid composition (having two different complexation agents). In this example, formulation 1, which has monophasic release, is composed entirely of fluocinolone acetonide complexed with a fatty acid (e.g., magnesium stearate) forming particulates that are dispersed in methyl laurate oil. In contrast, formulation 2, which has biphasic release profiles, corticosteroid composition includes a first complex pair of fluocinolone acetonide complexed with a fatty acid (e.g., magnesium stearate) and a second complex pair of fluocinolone acetonide complexed with a keto-enol tautomer (KET), both forming particulates that are dispersed in methyl laurate oil. In FIG. 2B, formulation 1 is compared with formulations of varying ratios of fluocinolone acetonide complexed with magnesium stearate and fluocinolone acetonide complexed with a keto-enol tautomer: formulation 2-75%/25%; formulation 3-66%/33%; formulation 4-50%/50%. As FIG. 2B illustrates, varying the ratio and proportions of complexation agents in the formulations of a given drug payload can be utilized to tune release kinetics in a predictable fashion.

Figure 3A:
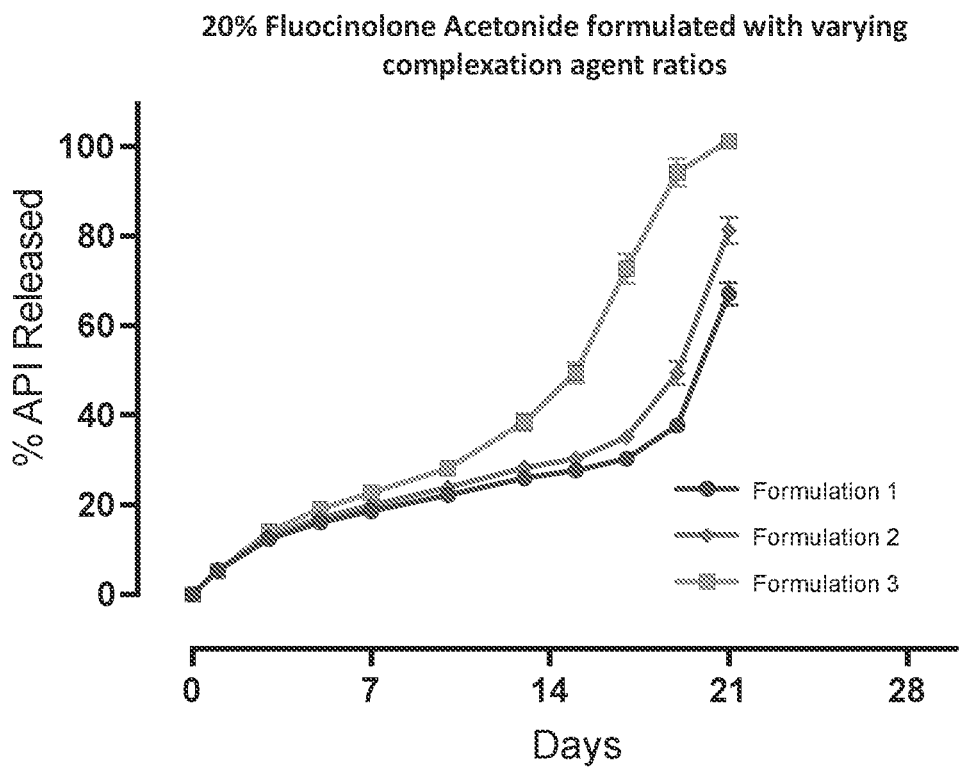
FIG. 3A is a graph of different formulations of fluocinolone acetonide containing various ratios of the complexation agents magnesium stearate and alpha-tocopherol in an accelerated dissolution assay, showing how these different ratios may provide extended release of fluocinolone acetonide with various release profiles and durations which may have utility for treatment of various retinal diseases. Formulation 1 contains 20% fluocinolone acetonide, 40% magnesium stearate, 11% alpha-tocopherol and 29% methyl laurate; Formulation 2 contains 20% fluocinolone acetonide, 25% magnesium stearate, 25% alpha-tocopherol and 30% methyl laurate; Formulation 3 contains 20% fluocinolone acetonide, 11% magnesium stearate, 40% alpha-tocopherol and 29% methyl laurate.

FIG. 3A shows examples of various formulations of fluocinolone acetonide formulated in the XRDDS containing varied ratios of magnesium stearate and alpha-tocopherol in a methyl laurate dispersal medium. These formulations are evaluated in an accelerated dissolution assay as described above, showing how these different ratios may provide extended release of fluocinolone acetonide with various release profiles and durations which may have utility for treatment of various retinal diseases. Formulation 1 contains 20% fluocinolone acetonide, 40% magnesium stearate, 11% alpha-tocopherol and 29% methyl laurate; Formulation 2 contains 20% fluocinolone acetonide, 25% magnesium stearate, 25% alpha-tocopherol and 30% methyl laurate; Formulation 3 contains 20% fluocinolone acetonide, 11% magnesium stearate, 40% alpha-tocopherol and 29% methyl laurate. FIG. 3A shows the percent release of the API (fluocinolone acetonide in this example) over the first 21 days, which simulates standard condition in vitro release over the course of 180 days or longer. In FIG. 3A the API (fluocinolone acetonide) is approximately 20% by weight; in general, the API may be between 10% and 60% by weight, as described above, and the percentages of complexation agent (e.g., magnesium stearate and alpha-tocopherol in this example) and dispersal medium (e.g., methyl laurate) may be adjusted accordingly.

Figure 3B:
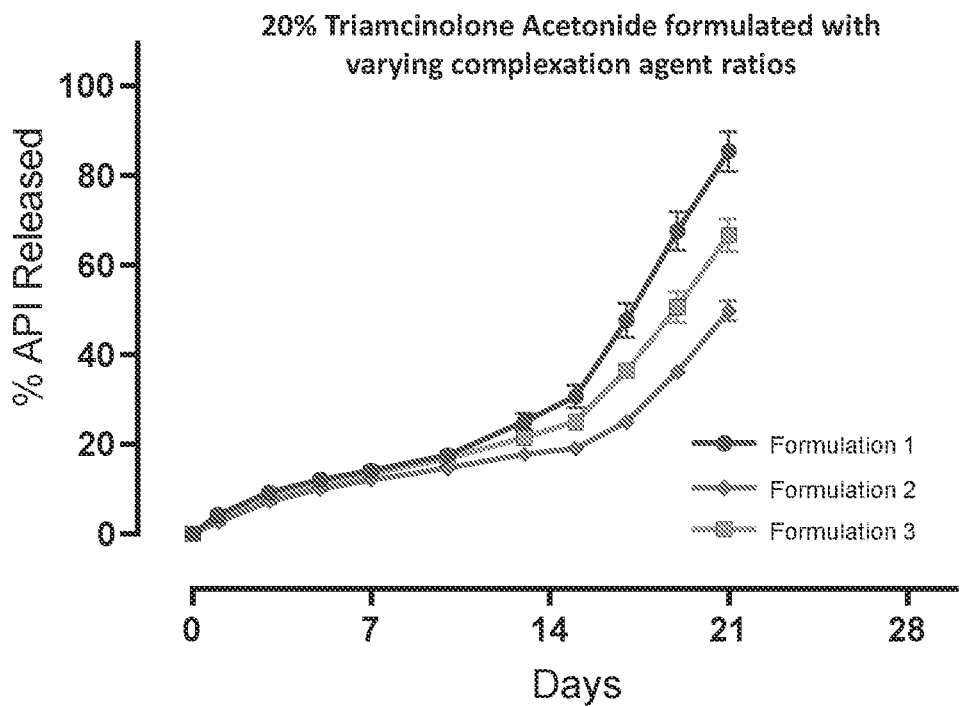
FIG. 3B is a graph of different formulations of triamcinolone acetonide containing various ratios of the complexation agents magnesium stearate and alpha-tocopherol in an accelerated dissolution assay, showing how these different ratios may provide extended release of triamcinolone acetonide with various release profiles and durations which may have utility for treatment of various retinal diseases. Formulation 1 contains 20% triamcinolone acetonide, 40% magnesium stearate, 11% alpha-tocopherol and 29% methyl laurate; Formulation 2 contains 20% triamcinolone acetonide, 25% magnesium stearate, 25% alpha-tocopherol and 30% methyl laurate; Formulation 3 contains 20% triamcinolone acetonide, 11% magnesium stearate, 40% alpha-tocopherol and 29% methyl laurate.

FIG. 3B shows examples of various formulations of triamcinolone acetonide formulated in the XRDDS containing varied ratios of magnesium stearate and alpha-tocopherol in a methyl laurate dispersal medium. These formulations are evaluated in an accelerated dissolution assay, showing how these different ratios may provide extended release of triamcinolone acetonide with various release profiles and durations which may have utility for treatment of various retinal diseases. Formulation 1 contains 20% triamcinolone acetonide, 40% magnesium stearate, 11% alpha-tocopherol and 29% methyl laurate; Formulation 2 contains 20% triamcinolone acetonide, 25% magnesium stearate, 25% alpha-tocopherol and 30% methyl laurate; Formulation 3 contains 20% triamcinolone acetonide, 11% magnesium stearate, 40% alpha-tocopherol and 29% methyl laurate. FIG. 3B shows the percent release of the API (triamcinolone acetonide in this example) over the first 21 days, which simulates standard condition in vitro release over the course of 180 days or longer. In FIG. 3B the API (triamcinolone acetonide) is approximately 20% by weight; in general, the API may be between 10% and 60% by weight, as described above, and the percentages of complexation agent (e.g., magnesium stearate and alpha-tocopherol in this example) and dispersal medium (e.g., methyl laurate) may be adjusted accordingly.

Figure 3C:
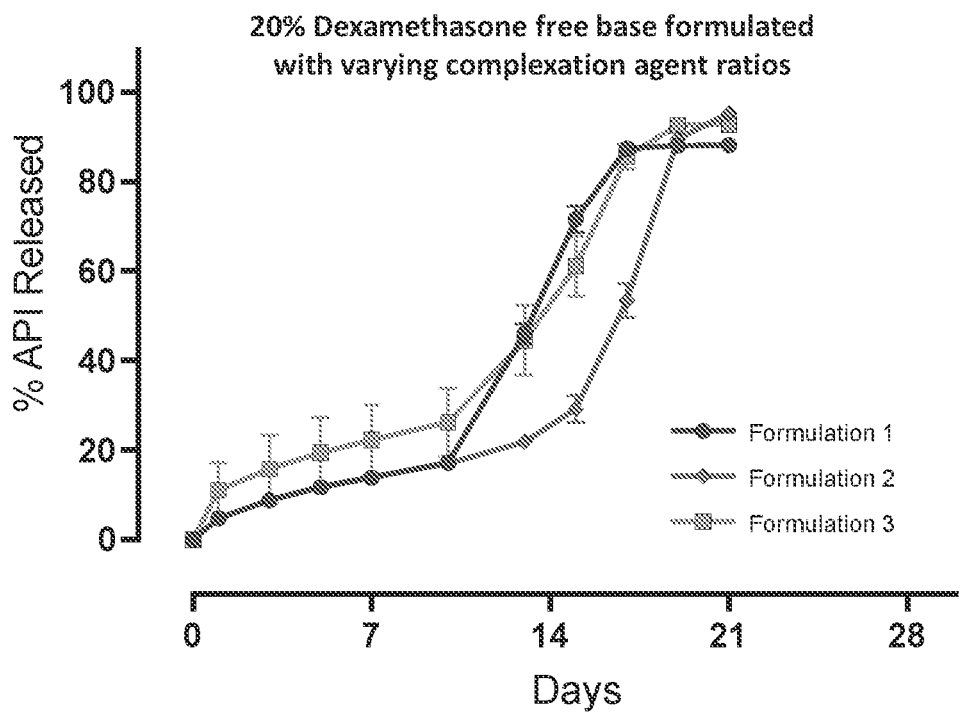
FIG. 3C is a graph of different formulations of dexamethasone free base containing various ratios of the complexation agents magnesium stearate and alpha-tocopherol in an accelerated dissolution assay, showing how these different ratios may provide extended release of dexamethasone free base with various release profiles and durations which may have utility for treatment of various retinal diseases. Formulation 1 contains 20% dexamethasone free base, 40% magnesium stearate, 11% alpha-tocopherol and 29% methyl laurate; Formulation 2 contains 20% dexamethasone free base, 25% magnesium stearate, 25% alpha-tocopherol and 30% methyl laurate; Formulation 3 contains 20% dexamethasone free base, 11% magnesium stearate, 40% alpha-tocopherol and 29% methyl laurate.

FIG. 3C shows examples of various formulations of dexamethasone free base formulated in the XRDDS containing varied ratios of magnesium stearate and alpha-tocopherol in a methyl laurate dispersal medium. These formulations are evaluated in an accelerated dissolution assay, showing how these different ratios may provide extended release of dexamethasone free base with various release profiles and durations which may have utility for treatment of various retinal diseases. Formulation 1 contains 20% dexamethasone free base, 40% magnesium stearate, 11% alpha-tocopherol and 29% methyl laurate; Formulation 2 contains 20% dexamethasone free base, 25% magnesium stearate, 25% alpha-tocopherol and 30% methyl laurate; Formulation 3 contains 20% dexamethasone free base, 11% magnesium stearate, 40% alpha-tocopherol and 29% methyl laurate. FIG. 3C shows the percent release of the API (dexamethasone free base in this example) over the first 21 days, which simulates standard condition in vitro release over the course of 180 days or longer. In FIG. 3C the API (dexamethasone free base) is approximately 20% by weight; in general, the API may be between 10% and 60% by weight, as described above, and the percentages of complexation agent (e.g., magnesium stearate and alpha-tocopherol in this example) and dispersal medium (e.g., methyl laurate) may be adjusted accordingly.

Figure 3D:
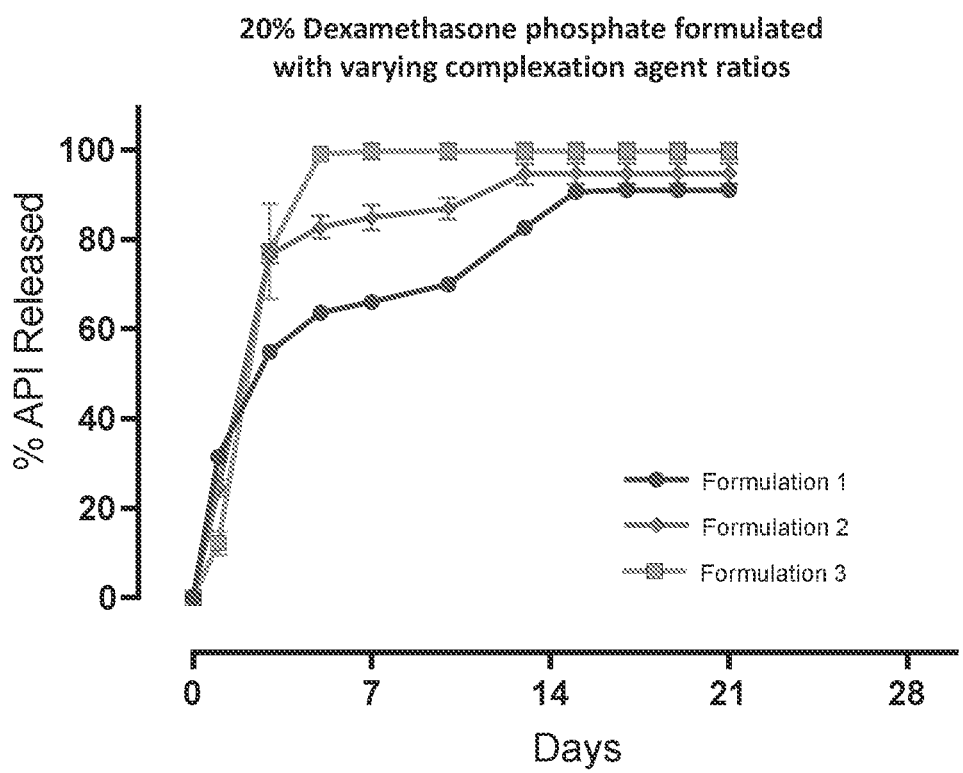
FIG. 3D is a graph of different formulations of dexamethasone phosphate containing various ratios of the complexation agents magnesium stearate and alpha-tocopherol in an accelerated dissolution assay, showing how these different ratios may provide extended release of dexamethasone phosphate with various release profiles and durations which may have utility for treatment of various retinal diseases. Formulation 1 contains 20% dexamethasone phosphate, 40% magnesium stearate, 11% alpha-tocopherol and 29% methyl laurate; Formulation 2 contains 20% dexamethasone phosphate, 25% magnesium stearate, 25% alpha-tocopherol and 30% methyl laurate; Formulation 3 contains 20% dexamethasone phosphate, 11% magnesium stearate, 40% alpha-tocopherol and 29% methyl laurate.

FIG. 3D shows examples of various formulations of dexamethasone phosphate formulated in the XRDDS containing varied ratios of magnesium stearate and alpha-tocopherol in a methyl laurate dispersal medium. These formulations are evaluated in an accelerated dissolution assay, showing how these different ratios may provide extended release of dexamethasone phosphate with various release profiles and durations which may have utility for treatment of various retinal diseases. Formulation 1 contains 20% dexamethasone phosphate, 40% magnesium stearate, 11% alpha-tocopherol and 29% methyl laurate; Formulation 2 contains 20% dexamethasone phosphate, 25% magnesium stearate, 25% alpha-tocopherol and 30% methyl laurate; Formulation 3 contains 20% dexamethasone phosphate, 11% magnesium stearate, 40% alpha-tocopherol and 29% methyl laurate. FIG. 3D shows the percent release of the API (dexamethasone phosphate in this example) over the first 21 days, which simulates standard condition in vitro release over the course of 180 days or longer. In FIG. 3D the API (dexamethasone phosphate) is approximately 20% by weight; in general, the API may be between 10% and 60% by weight, as described above, and the percentages of complexation agent (e.g., magnesium stearate and alpha-tocopherol in this example) and dispersal medium (e.g., methyl laurate) may be adjusted accordingly.

Figure 4A:
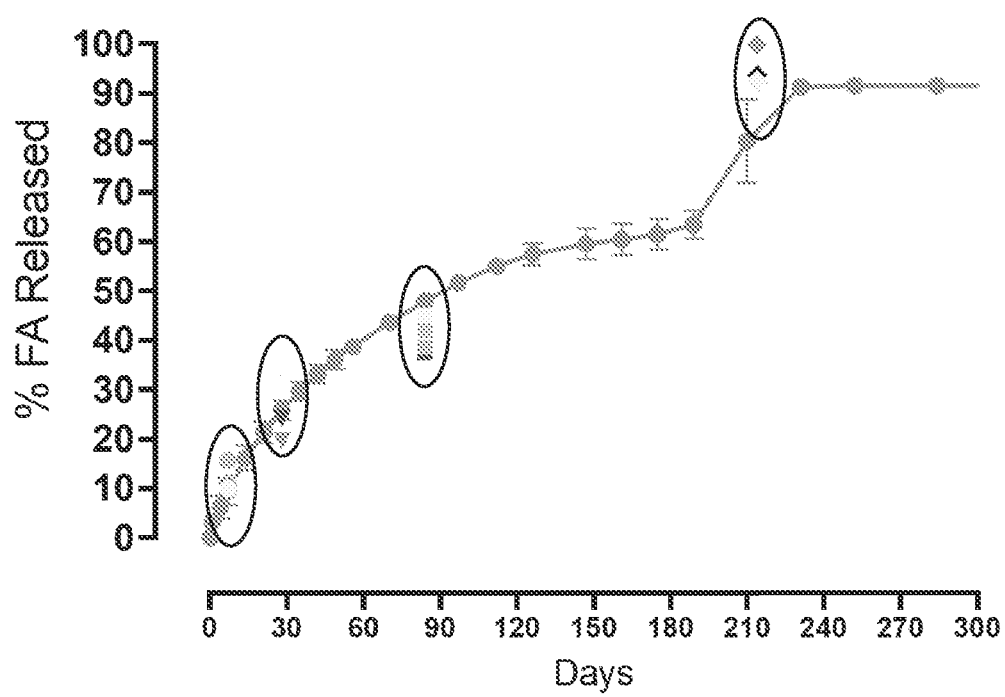
FIGS. 4A and 4B illustrate good in vitro to in vivo correlation for two different formulations of fluocinolone acetonide in the novel XRDDS. The depicted curves reflect in vitro release profiles, while the individual colored points, circled, represent in vivo release data from rabbit eyes.
Figure 4B:
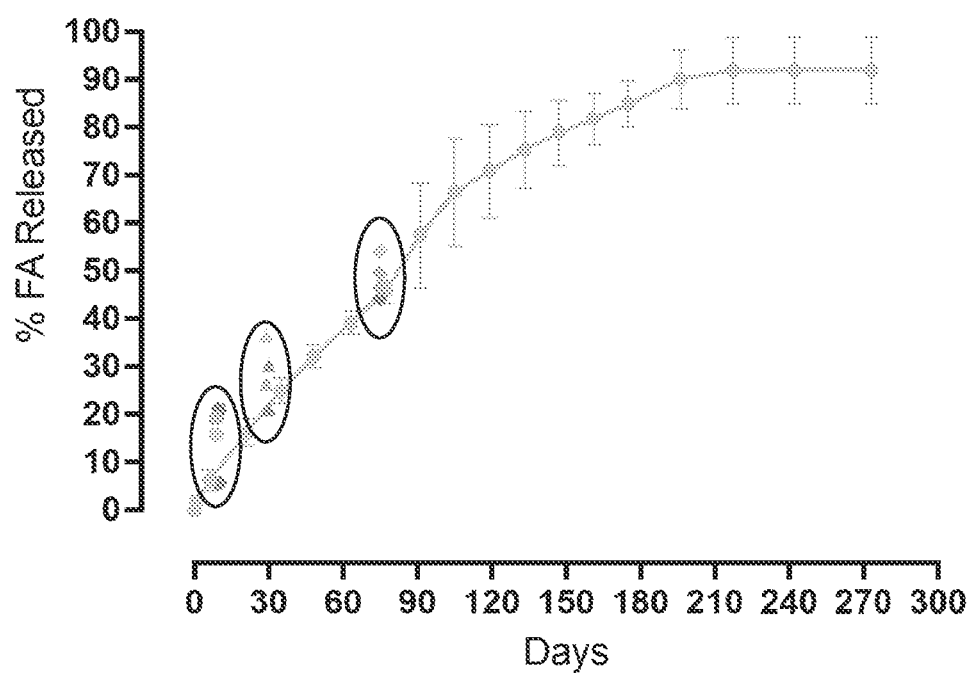

The predicted release kinetics for the extended release corticosteroid composition described herein have been confirmed in vivo. For example, animal (e.g., rabbit) eyes injected with an extended release corticosteroid composition show excellent agreement with predicted release kinetics. FIGS. 4A and 4B illustrates good in vitro to in vivo correlation for two different formulations of fluocinolone acetonide in the novel XRDDS. Rabbit vitreous levels of fluocinolone acetonide (data points, circled) are shown for individual rabbit eye data points; curves depicting percent release reflect in vitro release data.

Figure 5A:
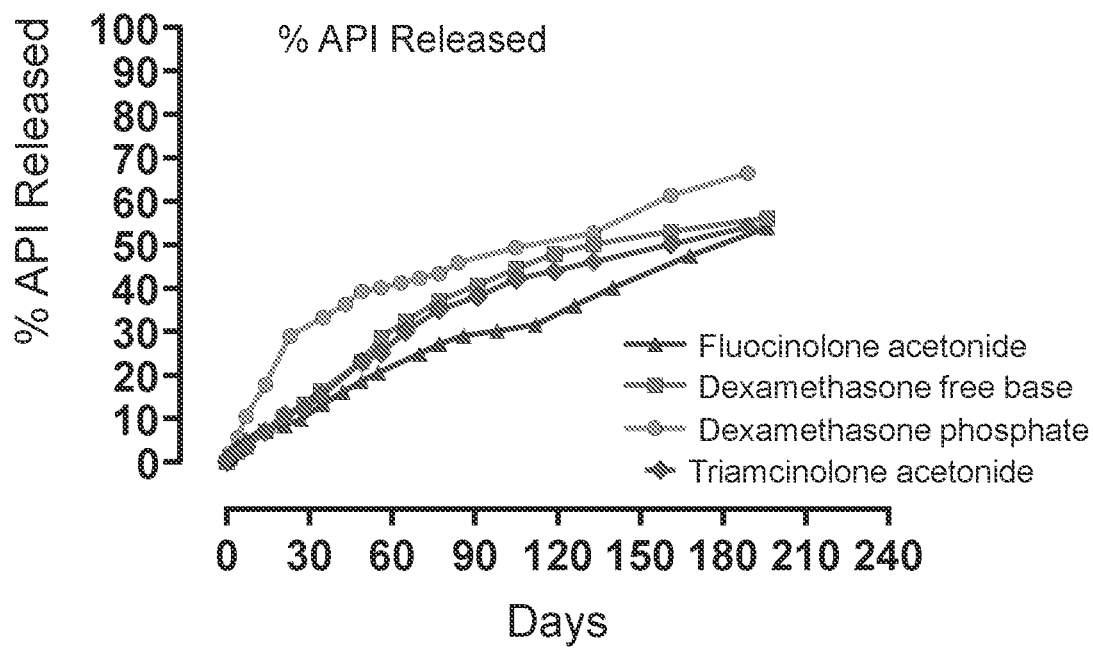
FIG. 5A illustrates an example of release profiles for different examples of extended-release corticosteroid formulations as % of active pharmaceutical ingredient (API) released.
Figure 5B:
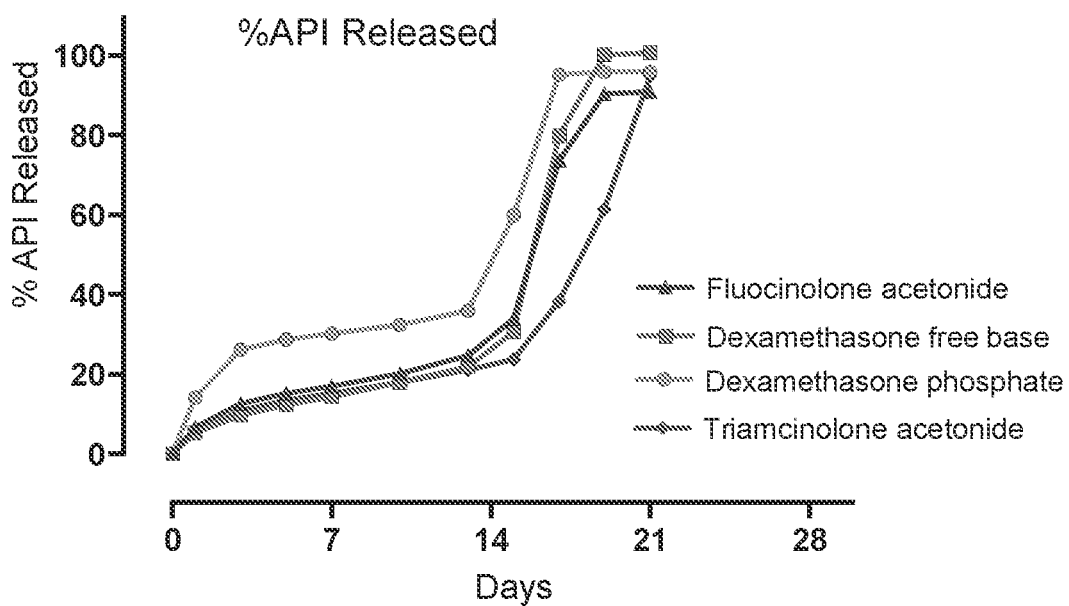
FIG. 5B shows release profiles of identical implants as displayed in FIG. 5A assayed under accelerated dissolution conditions with data displayed as % API released. The accelerated release assay data correlates with and replicates the long-term release data.
Figure 5C:
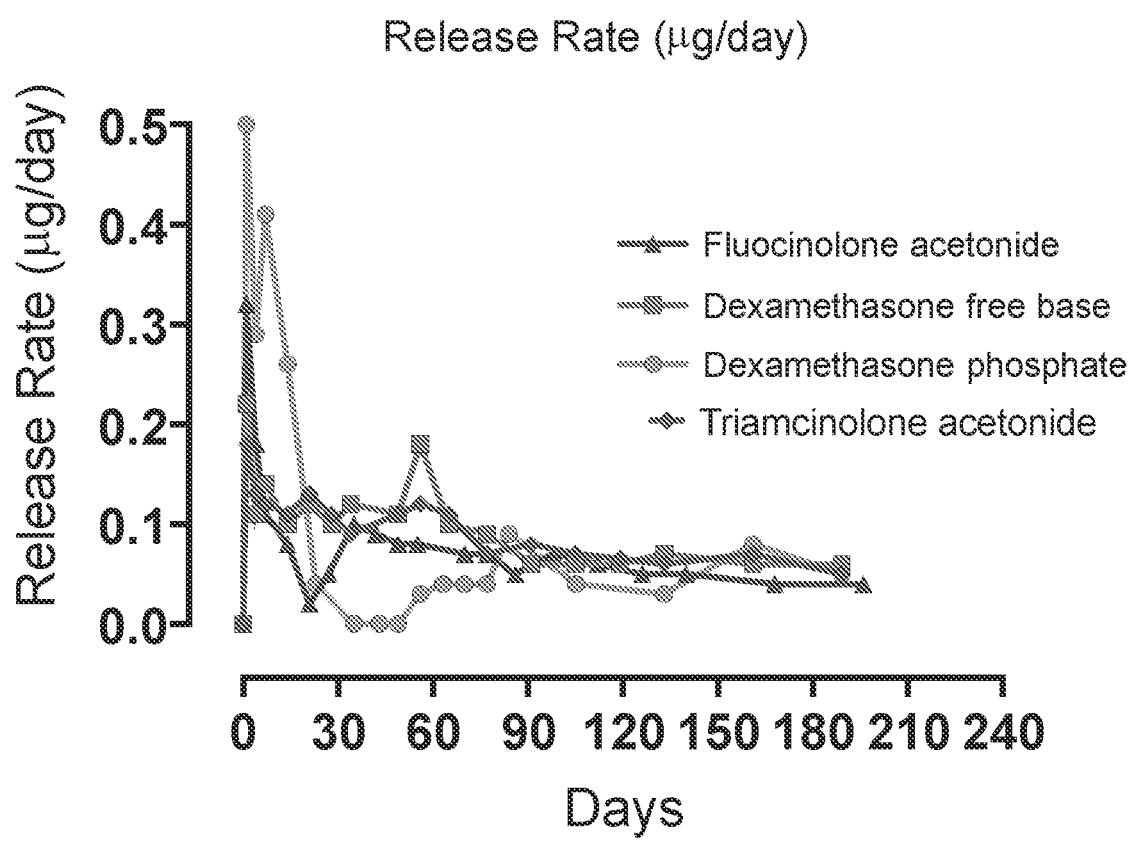
FIG. 5C illustrates release rate data for examples of extended-release corticosteroid formulations, configured as implants, providing a biphasic release curve with an initial burst release phase (with between 10 and 30% of payload released by day 30) followed by a second, maintenance phase. These formulations contain 10% total corticosteroid API, complexed with 50.4% magnesium stearate and 21.6% alpha-tocopherol and formulated into methyl laurate dispersal medium.

FIGS. 5A-5C illustrates in vitro release pharmacokinetic data comparing release kinetics of four different formulations each containing a different corticosteroid API. These data demonstrate that the novel XRDDS can be configured to enable sustained release of different corticosteroid drugs.

APIs with similar OSI and TPSA will function similarly within a given formulation of the XRDDS due to the fact that their interactions with the selected complexation agents and dispersal medium will be substantially similar. This is demonstrated by the fact that four corticosteroid APIs with similar OSI and TPSA such as fluocinolone acetonide (OSI 3.48, TPSA 93.1 Å), dexamethasone free base (OSI 3.85, TPSA 94.8 Å), dexamethasone phosphate (OSI 3.71, TPSA 141 Å) and triamcinolone acetonide (OSI 3.82, TPSA 93.1 Å) can all be formulated for extended release in our XRDDS in which magnesium stearate and alpha-tocopherol act as complexation agents and in which methyl laurate is the dispersal medium. Thus, the XRDDS is compatible with numerous corticosteroid drugs and is capable of supporting sustained release of corticosteroid API for 180 days or longer.

The XRDDS formulation establishes well defined drug release profiles that cannot be achieved by implant of free drug alone. As depicted in FIG. 11A, fluocinolone acetonide crystals without XRDDS in a tube is nearly completely released in vitro in sink conditions within 30 minutes. By contrast, as depicted in FIG. 11B the fluocinolone acetonide incorporated within XRDDS remains stable in vitro. As shown in FIGS. 4A-6C, fluocinolone in formulations of XRDDS demonstrate slowed release with complete release in vitro occurring by approximately 180 days or longer (e.g., >210 days). Similar sustained release is achieved for other APIs.

FIG. 5A illustrates an example of release profiles obtained under standard conditions for examples of different extended-release corticosteroid formulations as % API released. In FIG. 5A, the extended-release corticosteroid formulations are configured as implants providing a biphasic release curve with an initial burst release phase (with between 10% and 30% of payload released by day 30) followed by a second, maintenance phase. In FIGS. 5A-5C, the extended-release corticosteroid formulations are configured as implants providing a biphasic release curve with an initial burst release phase followed by a second, maintenance phase. These formulations contain 10% total corticosteroid API, complexed with 50.4% magnesium stearate and 21.6% alpha-tocopherol and formulated into methyl laurate dispersal medium. This example illustrates the principle that the XRDDS utilizing magnesium stearate and alpha-tocopherol as complexation agents can be utilized to achieve sustained release of several corticosteroid drugs including fluocinolone acetonide, triamcinolone acetonide, dexamethasone free base and dexamethasone phosphate.

FIG. 5B illustrates an example of release profiles obtained under accelerated dissolution conditions for examples of different extended-release corticosteroid formulations as % API released. In FIG. 5B, the extended-release corticosteroid formulations are configured as implants providing a biphasic release curve with an initial burst release phase followed by a second, maintenance phase. Of note, the profile and relative release profiles of formulations containing various corticosteroid APIs are similar in the accelerated dissolution assay as compared to release assays obtained under standard conditions. This illustrates that accelerated dissolution assays can be utilized to characterize release properties of corticosteroid API formulated in the XRDDS. As in FIG. 5A, these formulations contain 10% total corticosteroid API, complexed with 50.4% magnesium stearate and 21.6% alpha-tocopherol and formulated into methyl laurate dispersal medium. This example illustrates the principle that the XRDDS utilizing magnesium stearate and alpha-tocopherol as complexation agents can be utilized to achieve sustained release of several corticosteroid drugs including fluocinolone acetonide, triamcinolone acetonide, dexamethasone free base and dexamethasone phosphate.

In all cases, there was a biphasic release rate, including a higher rate of release during initial burst phase and a stable release rate during the maintenance phase of release, as shown in FIG. 5C.

As discussed above, FIG. 6A shows the percent of formulated corticosteroid drug released over time for another set of four unique formulations of fluocinolone acetonide, triamcinolone acetonide, dexamethasone free base and dexamethasone phosphate in the novel XRDDS, each of which used similar complexation agent pairs. FIG. 6B shows the release rate over time for the same formulations as in FIG. 6C. In all cases, there was a biphasic release rate, including an initial burst rate and a linear mid to late rate.

Distinct formulations of drug incorporated into extended release drug delivery system may each have different release kinetics. However, in general, the different formulations may have two-phase kinetics, with an early burst phase followed by a maintenance phase with a more linear release profile. Some formulations may have a longer initial early burst, e.g., resulting in 120-day durability (e.g., see FIG. 13B), while others may have a shorter early burst and a longer steady-state release phase, e.g., resulting in 210 days of release (e.g., see FIG. 13D).

As an example, a payload of approximately 100 μg of drug may achieve 6-8 months of efficacy and durability. A 2-phase release kinetic may include an early burst (to load the retina with drug) for 1 month with a release rate of ~600-700 ng per day, followed by 5-7 months of steady-state release, with a release rate of ~350-500 ng per day. Complexation agents that are expected to interact favorably with the selected corticosteroid drug to limit diffusion of the corticosteroid drug to the implant surface would then be selected and incorporated into a tube implant modality of the extended release drug delivery system.

In some examples, the corticosteroid drug may be formulated within the extended release drug delivery system and administered into eyes via intravitreal injection, and daily release rate may have two-phase release kinetics, exceeding the levels necessary for amelioration of active inflammation or vascular leakage (during early burst release for ~1 month) followed by a second phase in which drug release rates mediate tissue levels sufficient for prevention of recurrent inflammation or vascular leakage (during steady-state release for ~5-7 months).

In some examples, the corticosteroid drug may be formulated within the extended release drug delivery system and administered into the eyes of rabbits via intravitreal injection in preclinical studies, and daily release may have single-phase release kinetics, exceeding the tissue levels necessary for reversal of active inflammation or vascular leakage for 6-8 months. In some examples, the corticosteroid drug may be formulated within the extended release drug delivery system deployed into the eyes of rabbits via intravitreal injection, and daily release may have single-phase release kinetics, with tissue levels sufficient for prevention of inflammation or vascular leakage for 6-8 months.

In some examples, the corticosteroid drug may be formulated within the extended release drug delivery system and administered into the eye via intravitreal injection, and daily release rate may have three-phase release kinetics, exceeding the tissue levels required for reversal of inflammation or vascular leakage (during early burst release for ~1 month), exceeding the tissue levels for prevention of recurrent inflammation or vascular leakage (during steady-state release for ~4-6 months), and exceeding the tissue levels for reversal of inflammation or vascular leakage (during late burst release for ~1 month).

In some examples, the corticosteroid drug formulated within the extended release drug delivery system can be delivered by one of several appropriate modalities as illustrated in FIGS. 7A-7D, 8, 9A-9C and 10A-10D.

Figure 9A:
FIGS. 9A-9C illustrate an extended-release corticosteroid formulation formulated as a fluid or paste (FIG. 9A) that can be injected (i.e., intravitreal injection, IVT) by bolus injection (FIG. 9B) into the vitreous (FIG. 9C) of an eye.
Figure 9B:
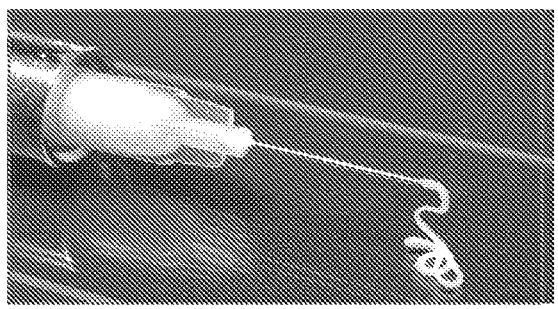
Figure 9C:
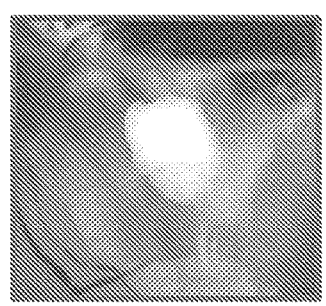

FIGS. 9A-9C illustrate examples of delivery forms for the extended release corticosteroid drug delivery system as described herein. For example, the extended release drug delivery system containing corticosteroid drugs may be formed as a flowable paste (FIG. 9A) that may be injected (e.g., by bolus injection) into the vitreous, as illustrated in FIGS. 9B-9C.

Figure 10A:
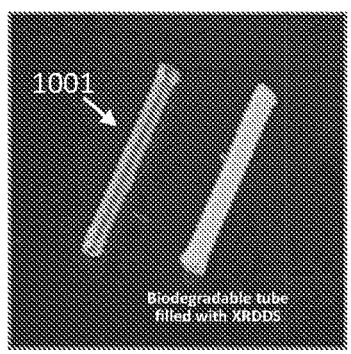
FIGS. 10A-10D illustrate the use of an extended-release corticosteroid formulation with an erodible/biodegradable depot (e.g., tube) implant for release, and implantation into the vitreous of the eye by intravitreal injection.
Figure 10B:
Figure 10C:
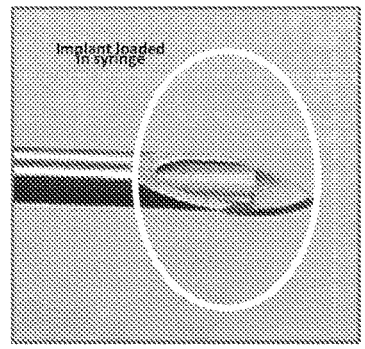
Figure 10D:
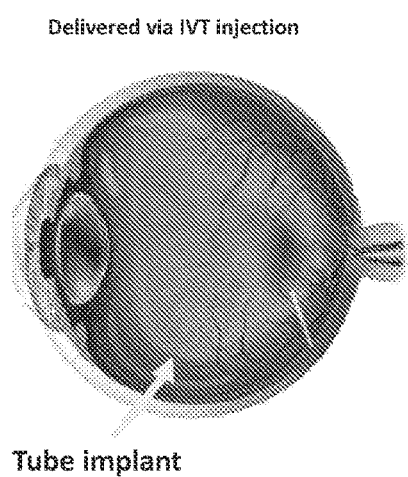

FIGS. 10A-10D shows an example in which the extended release drug delivery system containing corticosteroid drug is formulated within a biodegradable tube (FIG. 10A, showing both an empty tube (1001), left, and a filled tube, right). In some examples, the tube may itself be formed of the extended release drug delivery system. In some examples, the tube may have one or both ends open for release of the corticosteroid drug. The tube may be injected via needle or cannula into the vitreous, as shown in FIG. 10C and FIG. 10D. or into periocular tissues. In some examples, the extended release drug delivery system and corticosteroid drug may be molded into shapes (FIG. 7C) or milled into particles (FIG. 7D).

Figure 11A:
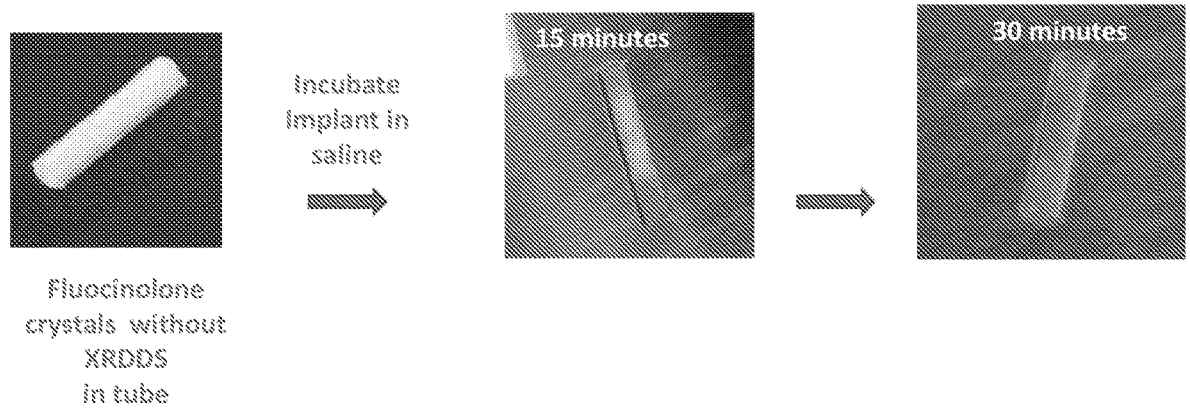
FIGS. 11A and 11B compare the retention of a corticosteroid drug in vitro. Whereas drug packed as crystals into a tube (without formulation in extended release drug delivery system (XRDDS)) rapidly release into media (FIG. 11A), drug that is formulated within an extended-release corticosteroid formulation and filled into the tube is retained for (in this example) 4 months.
Figure 11B:
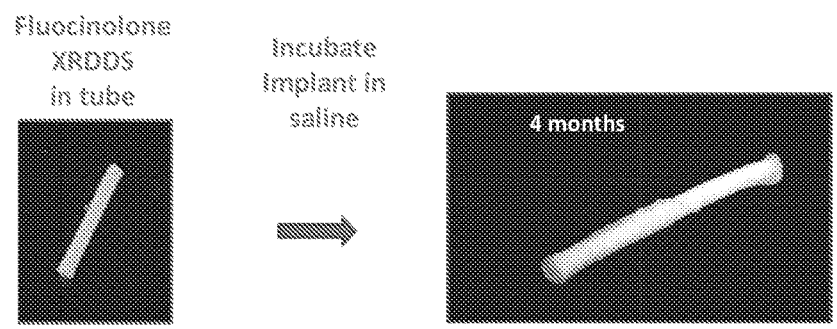

In general, the extended release corticosteroid compositions described herein may greatly enhance the timed release of the material. For example, FIG. 11A shows the rapid dissolution of fluocinolone crystals formulated as a drug depot (tube) when the fluocinolone is not complexed as part of an extended release corticosteroid as described herein. In this example, when incubated in saline solution, the fluocinolone is dissolved and released in minutes (within 15-30 minutes). In contrast, when the fluocinolone is complexed to a first and second complexation agent, incorporated into a dispersal medium, and included as part of an extended release corticosteroid formulation as described herein, the fluocinolone (within the extended release formulation) remains in the tube formulation in vitro in sink conditions for over 4 months, as shown in FIG. 11B.

Figure 12A:
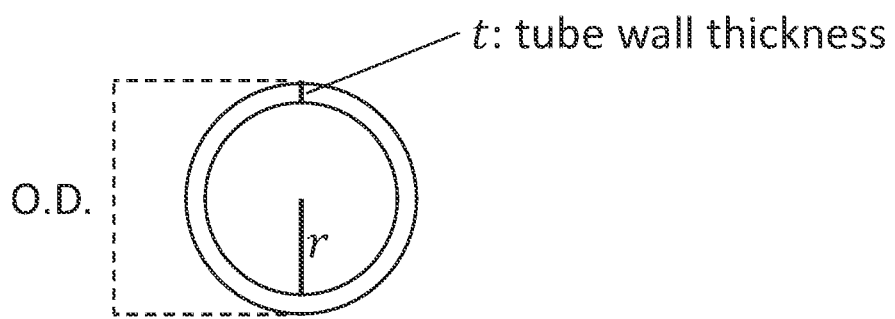
FIGS. 12A-12B illustrates the effect of varying the inner diameter/radius of the open ends of the injectable tube implant modality of the XRDDS. Release rate is decreased predictably in proportion to the radius/diameter of the tube end.
Figure 12B:
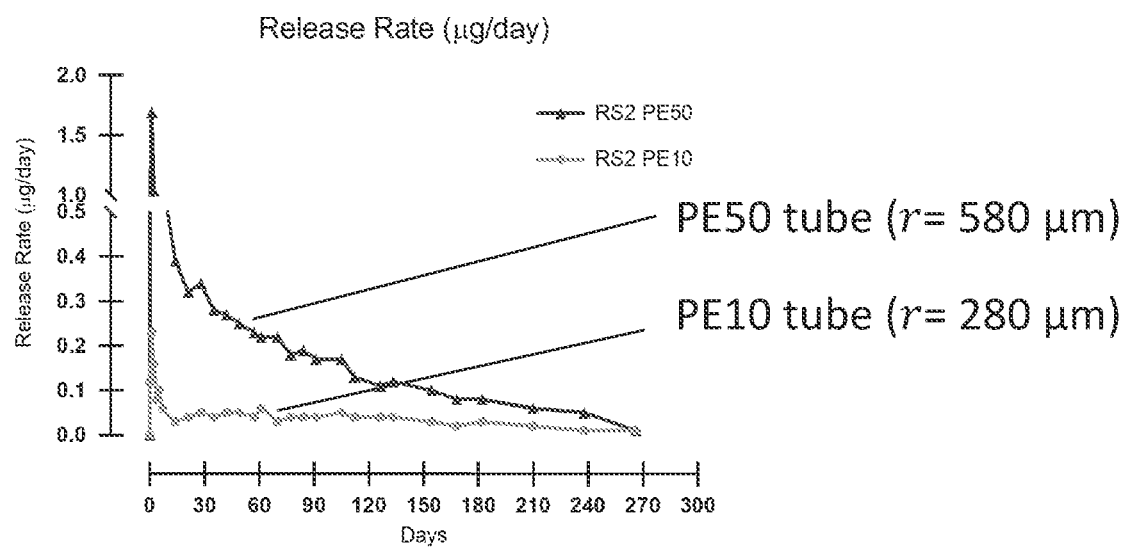
Figure 12C:
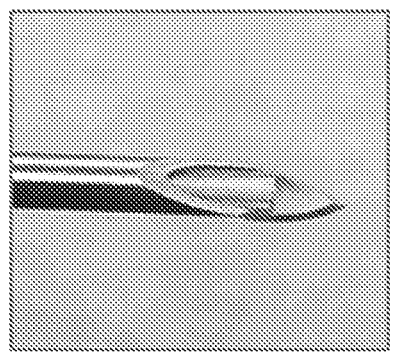
FIG. 12C illustrates the use of an ultra-thin wall 25 gauge needle appropriate for intravitreal injection, with bioerodible or non-bioerodible tubes (depots) for release of extended-release corticosteroid formulations, emerging from the lumen of the 25 gauge needle.

In examples in which the extended release corticosteroid is released over time from a tube acting as a depot, the properties (e.g., dimensions, composition, etc.) of the tube can be altered to achieve desired release kinetics. For example, FIG. 12 illustrates exemplary dimensions of a tube (showing the radius, r, tube wall thickness, t, and outer diameter, OD). In some examples, the tube inner diameter (ID, which is twice the radius r in this example) can be modified to obtain desired drug release kinetics. A smaller ID results in reduced exposure to the at the implant-tissue interface and a slower rate of release from a given formulation of CS XR while tubes with larger ID will provide increased surface area exposure at the implant-tissue interface with a more rapid release of drug. For example, FIG. 12B shows a comparison of release rate over time for tubes having an inner diameter of 580 μm compared to an inner diameter of 280 μm. Thus, the physical dimensions of the tube may modulate the release characteristics for a given formulation or composition of CS XR. The relationship of the exposed surface of the CS XR, which for a tube with both ends open may be defined by $2\pi r^2$ where r is the radius (i.e., one-half of the inner diameter (ID)). The physical dimensions of the tube may be selected to be compatible with intravitreal administration; in general, the tube may be inserted (injected) using a needle, such as the needle shown in FIG. 12C. In this example, a 25 g ultra-thin wall (UTW) needle permits optimal API payload and implant release characteristics while maintaining safe and well tolerated intravitreal administration. In FIG. 12C, the tube ID and OD have appropriate tolerance (Inner Diameter 0.011"+/−0.001, Outer Diameter: 0.014"+/−0.001) in relation to the 25 gauge (25 g) UTW injector needle. The OD may be close enough to needle ID to secure the implant, while the OD may allow implant to be easily injected without becoming lodged in needle. Other needles (e.g., between 18 g and 32 g) may be used, selected based on the OD and ID dimensions of the tube implant.

In other examples, the tube may be designed with specific outer diameter (OD) such that it is capable of being delivered via a specific gauge needle suited to a particular clinical application. The OD must be large enough retained within the bore of a desired gauge needle without falling out during the injection procedure, but the OD must be small enough to permit injection of the implant out of the needle without undue resistance.

In some examples, the properties of a bioerodible tube can be selected such that the tube degrades and breaks apart prior to complete release of all contained CS XR resulting in a 3-phase release profile, including a late burst of drug. Alternatively, the bioerodible tube properties may be such that all drug is released prior to degradation of the tube resulting in a 2-phase release profile.

Figure 13A:
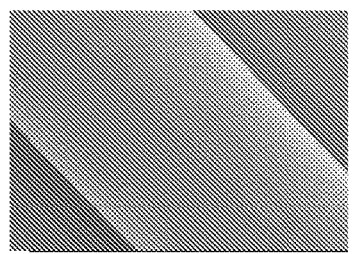
FIGS. 13A-13D illustrates that the composition of a bioerodible tube that can permit 2-phase drug release profile (FIG. 13B) or a composition of a bioerodible tube that can permit a 3-phase drug release profile, enabling accelerated release at later time points.
Figure 13B:
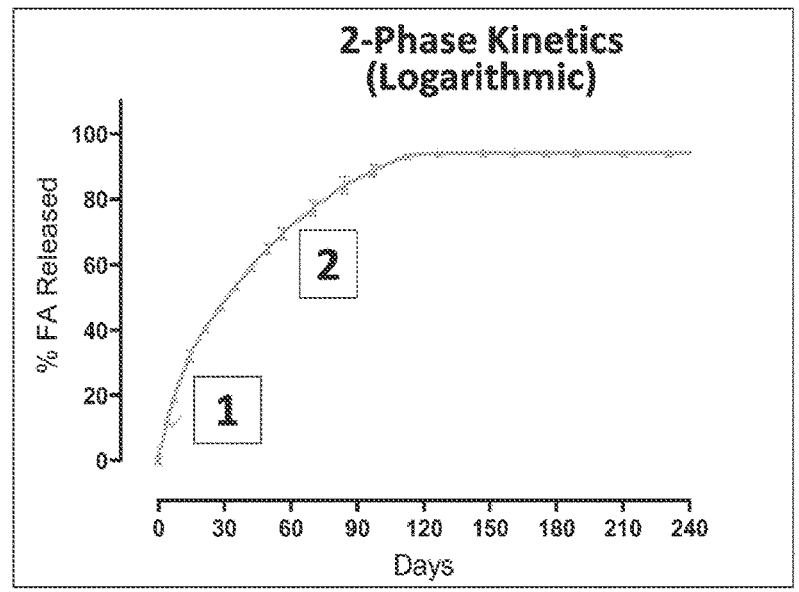
Figure 13C:
Figure 13D:
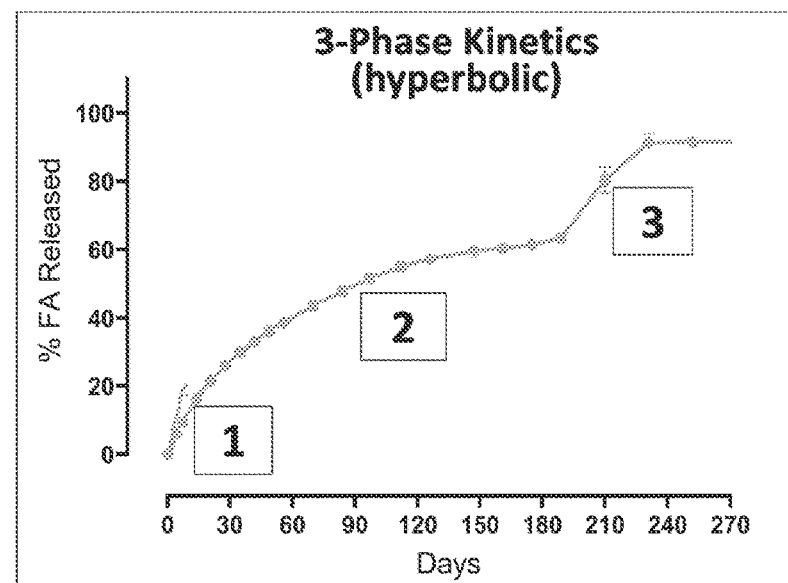

One potential method of formulating implants with two-phase or three-phase release kinetics is altering the properties of the bioerodible tube into which the XRDDS is placed. For example, FIGS. 13A-13D show a comparison between an extended-release corticosteroid system having two-phase release kinetics (FIGS. 13A-13B) in which the tube does not degrade during the use, and an extended-release corticosteroid system in which a three-phase release profile is achieved by selecting the material of the tube so that degradation occurs, at least partially, to trigger the third phase of release, by increasing the exposed surface area of the contained extended-release corticosteroid composition, as shown. Thus, the tube polymer selection may determine a two-phase vs. a three-phase release kinetics. The wall thickness and composition of the tube may be considered as a modifiable characteristic to adjust durability and desired phase of release. If the tube is thicker or composed of a material (e.g., PLGA blend) that is more durable and remains intact (as in FIG. 13A) until the XRDDS has release all drug, this may result in two-phase release as shown in FIG. 13B (labeling one and two phases). If the tube thickness is less or is composed of a material (e.g., different PLGA blend) that is less durable and begins to degrade or fracture prior to full release of drug from XRDDS, as shown in FIG. 13C, this may result in a three-phase release profile, as shown in FIG. 13D.

Figure 14A:
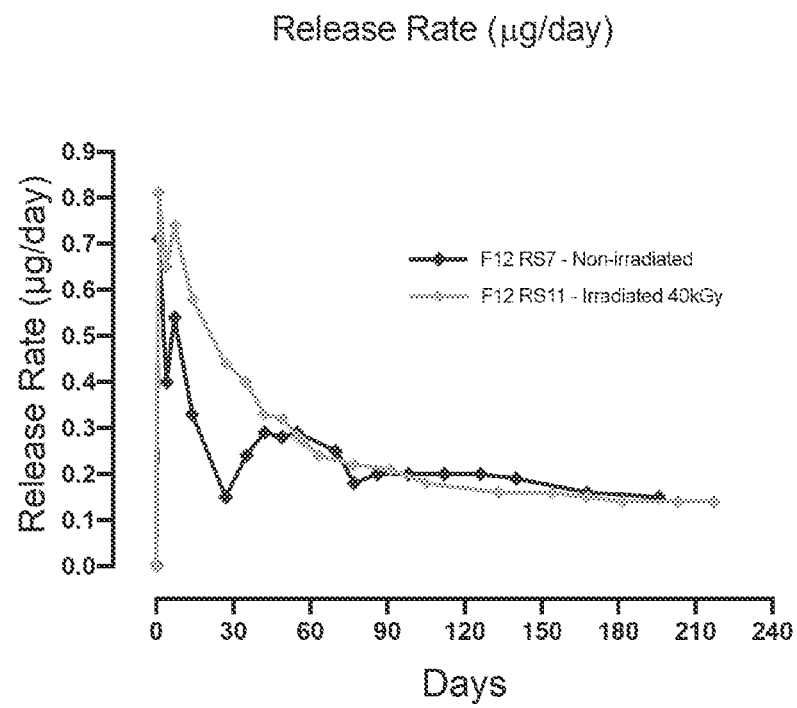
FIGS. 14A and 14B illustrates that irradiation of the corticosteroid drug in XRDDS matrix can be used to adjust release rate, particularly for initial burst phase of release and the early period of subsequent steady-state release, with higher drug release from implants irradiated at higher doses.
Figure 14B:
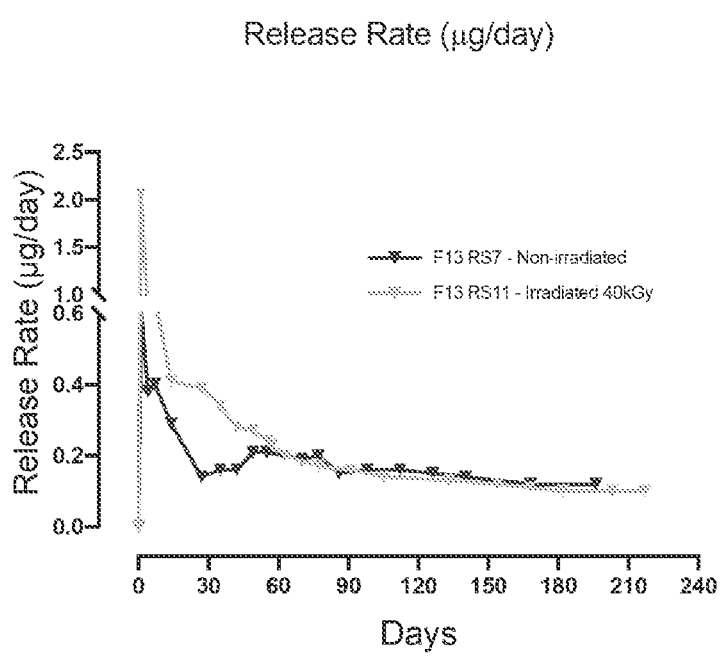

FIGS. 14A and 14B compare the release rates over time of two examples of an extended-release corticosteroid formulation (fluocinolone acetonide) which have not been irradiated ("non-irradiated") compared to identical formulations which have been irradiated ("irradiated 40 kGy"). In both formulations (show individually in FIGS. 14A and 14B), irradiated implants show a higher release rate during initial burst in the first month as well as a higher release rate in the first month of the maintenance phase, as compared to nonirradiated implants.

In general, the XRDDS implant may be configured either as a bio-erodible or a non-erodible reservoir, including bio-erodible or non-erodible tubes, inserts, coated stents, etc.

Figure 15A:
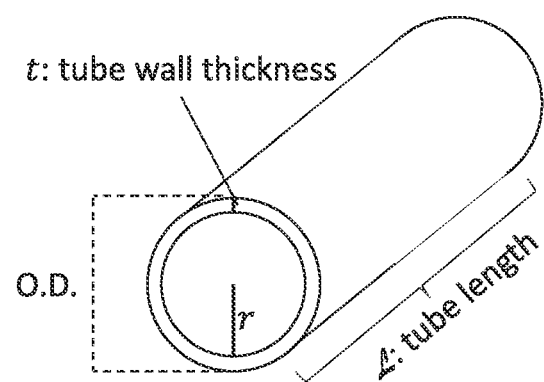
FIGS. 15A and 15B illustrates adjusting the duration of drug release by controlling the length of the implant, e.g., using a longer or shorter bioerodible or non-bioerodible tubes with shorter tubes having relatively shorter duration of release and longer tubes result in longer duration of drug release.
Figure 15B:
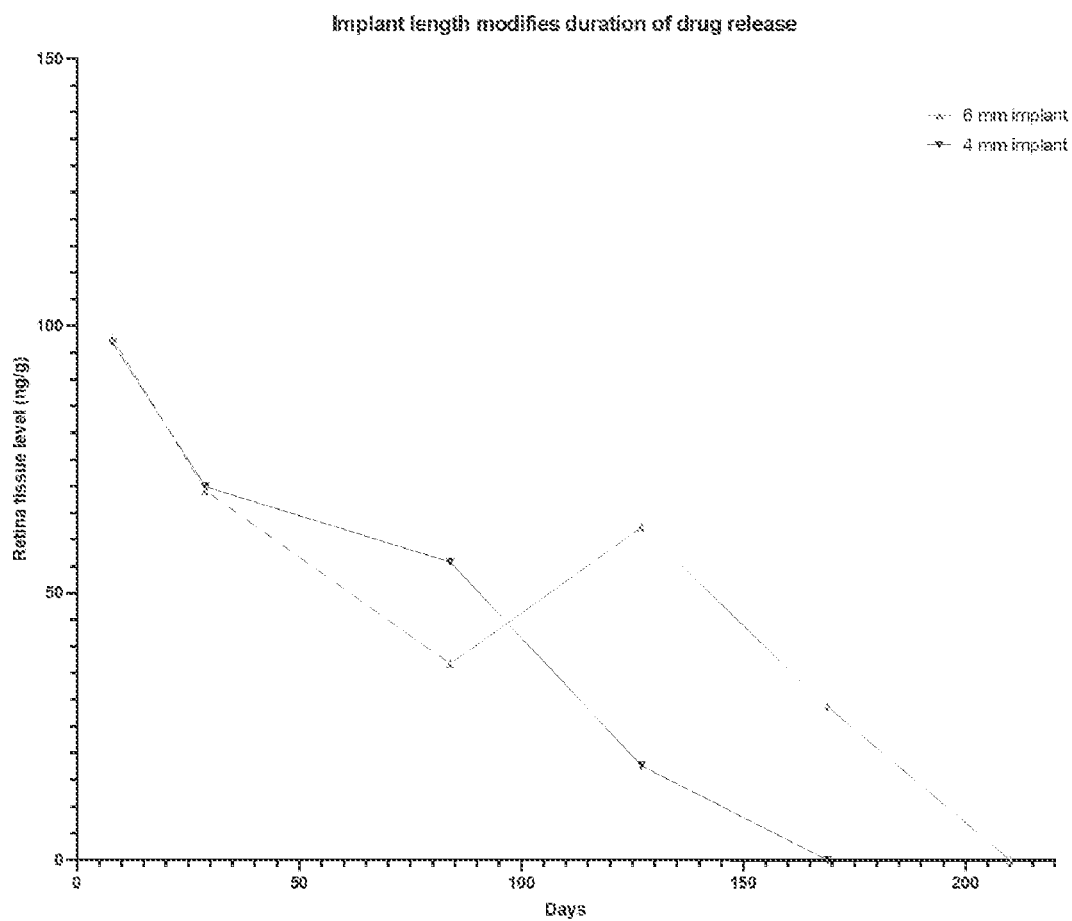

Tube length may also modify the duration of drug released. One example of this is illustrated in FIGS. 15A-15B. FIG. 15A shows example dimensions of a tube that may be used. FIG. 15B shows in vivo release experiments performed with tubes cut to 4 mm and 6 mm lengths and demonstrates that drug release duration can be modified by altering the tube length. Duration can be shortened by using a shorter tube while duration can be lengthened using a longer tube.

Figure 16:
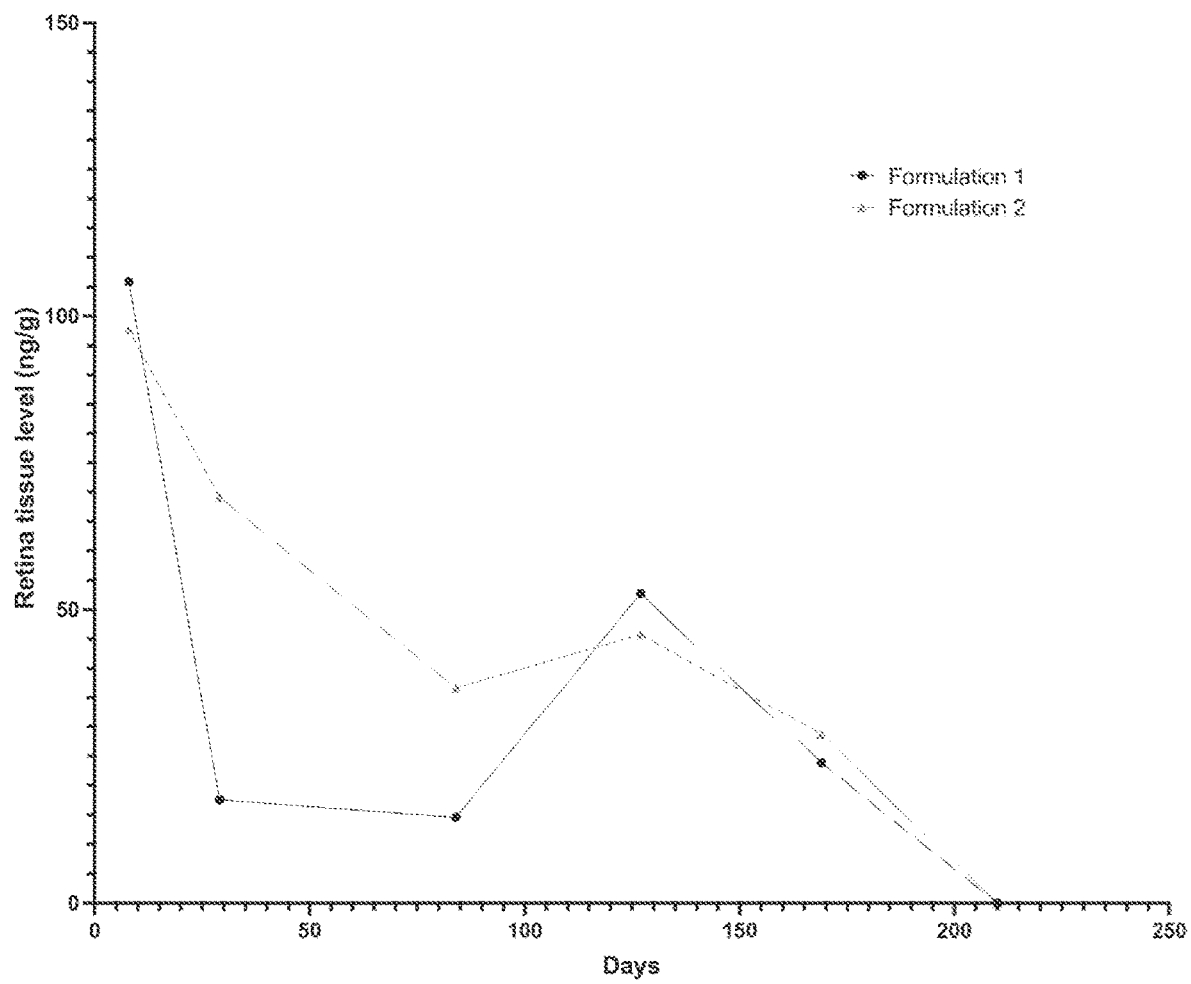
FIG. 16 is a comparison of the in vivo release profiles for two different extended-release corticosteroid (fluocinolone acetonide) formulations injected into rabbit eyes with retinal API concentrations determined over time (days). While both tested formulations provided sustained release of FA lasting over 180 days and demonstrated an early burst followed by sustained lower rates of release, each had a unique release profile with different early burst tissue drug levels, and intermediate drug levels. Specifically, Formulation 1 was designed to provide a short (approximately 3 weeks) initial burst release with a lower steady state intermediate release prior to a final burst release at approximately 5 months. By contrast, Formulation 2 provides a more prolonged initial burst release (approximately 6 weeks) followed by a relatively higher and consistent steady state release without a final burst release.

FIG. 16 shows in vivo release data (retinal tissue fluocinolone acetonide (FA) levels) for two unique formulations of fluocinolone acetonide in the novel XRDDS following intravitreal injection into rabbit eyes. Formulation 1 is composed of 36.9% FA, 27.1% magnesium stearate, 11.6% alpha-tocopherol, 24.4% methyl laurate formulated into a 6 mm tube implant. Formulation 2 is composed of 40.2% FA, 9.9% magnesium stearate, 3.2% alpha-tocopherol, 46.7% methyl laurate formulated into a 6 mm tube implant. While both tested formulations provided sustained release of FA lasting over 180 days and demonstrated an early burst followed by sustained lower rates of release, each had a unique release profile with different early burst tissue drug levels, and intermediate drug levels. Specifically, Formulation 1 was designed to provide a short (approximately 3 weeks) initial burst release with a lower steady state intermediate release prior to a final burst release at approximately 5 months. By contrast, Formulation 2 provides a more prolonged initial burst release (approximately 6 weeks) followed by a relatively higher and consistent steady state release without a final burst release. By varying proportions of individual complexation agents, specific desired release rates at various time points of release can be achieved in vivo.

The formulations in FIG. 16 were formally evaluated by good laboratory practice (GLP) toxicology studies in rabbits at ITR, a commercial contract research organization, in support of IND application for an extended release corticosteroid drug for ophthalmic use. The following were evaluated: body weight, fundus examination, McDonald-Shadduck ophthalmic exam, ocular histology, electroretinogram, and necropsy. Results are summarized in table 2, below. These studies demonstrate that formulations of steroid in the XRDDS are well tolerated and suitable for further development through in-human studies.

TABLE 2 results of in-vivo GLP toxicology studies with fluocinolone formulated in extended release drug delivery system.

| | Control implant (no API) | Low dose implant | High dose implant |
|---|---|---|---|
| Body weight | No change | No change | No change |
| Fundus examination | Rare vitreous opacity | Rare vitreous opacity | Rare vitreous opacity |
| McDonald-Shadduck examination | Normal by day 7 following IVT injection | Normal by day 7 following IVT injection | Normal by day 7 following IVT injection |
| Ocular histology | No retinal degeneration, no retinal detachment, rare macrophage | No retinal degeneration, no retinal detachment, rare macrophage | No retinal degeneration, no retinal detachment, rare macrophage |
| Electroretinogram | Normal/ No change | Normal/ No change | Normal/ No change |
| Necropsy | No visible lesions | No visible lesions | No visible lesions |

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits described herein.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A multiphasic colloidal suspension composition, the composition comprising: a corticosteroid drug substance and one or more complexation agents, admixed in a dispersal medium so that the corticosteroid drug substance has a release profile having one or more phases of release of the corticosteroid drug substance into the extracellular environment, wherein the one or more complexation agents is formulated as an irregular-shaped particulate having a Braunauer-Emmett-Teller (BET) surface area greater than about $2.0 \text{ m}^2 \text{ g}^{-1}$ that forms corticosteroid drug substance-complex particulates by noncovalent, reversible binding to the corticosteroid drug substance, and wherein the one or more complexation agents comprises magnesium stearate and a tocopherol compound or calcium stearate and a tocopherol compound; wherein the corticosteroid drug substance is any of: fluocinolone, fluocinolone acetonide, dexamethasone, dexamethasone phosphate, dexamethasone sodium phosphate, triamcinolone, and triamcinolone acetonide, or a salt thereof; further wherein the dispersal medium is a fatty acid methyl esters.

2. The composition of claim 1, wherein the one or more complexation agents comprises magnesium stearate and the tocopherol compound.

3. The composition of claim 1, wherein the dispersal medium comprises methyl dodecanoate (methyl laurate).

4. The composition of claim 1, wherein the multiphasic colloidal suspension composition is formulated as a flowable paste and/or a bolus implant configured for direct injection in and around an eye.

5. The composition of claim 1, wherein the multiphasic colloidal suspension composition is formulated as a tube implant of 2 millimeters or longer, for injection in and around an eye via an injector needle of between 18 gauge and 32 gauge.

6. The composition of claim 1, wherein the multiphasic colloidal suspension composition is configured as a hollow tube and the hollow tube comprises one or more open ends that restricts surface erosion of the multiphasic colloidal suspension composition to an exposed surface area at the open ends of the hollow tube.

7. The composition of claim 5, wherein the tube is comprised of biodegradable or bioresorbable polymers: polylactide (PLA), poly-L-lactide (PLLA), poly-D-lactide (PDLA), poly-DL lactide (PDLLA), polyglycolide (PGA), poly (lactic co-glycolic acid) (PLGA), other copolymers of PLA and PGA, or a combination thereof.

8. The composition of claim 7, wherein the biodegradable hollow tube is comprised of PLGA polymers with molecular weight of between 150,000 and 300,000 Daltons and is formed of approximately 70-95% L (lactic acid/lactide) and 5-30% G (glycolic acid/glycolide).

9. The composition of claim 1, wherein the multiphasic colloidal suspension composition comprises the corticosteroid drug substance between about 10% and 60% by weight of the multiphasic colloidal suspension composition, wherein the one or more complexation agents comprises between about 1% and 50% by weight of the multiphasic colloidal suspension composition, and wherein the dispersal medium comprises methyl dodecanoate between 1% and 90% by weigh of the multiphasic colloidal suspension composition.

10. The composition of claim 1, wherein the corticosteroid drug substance is fluocinolone acetonide or a salt thereof.

11. A multiphasic colloidal suspension composition, the composition comprising:
a corticosteroid drug substance or a salt thereof and one or more complexation agents, admixed in a dispersal medium so that the corticosteroid drug substance has a release profile having one or more phases of drug release, wherein the one or more complexation agents is formulated as an irregular-shaped particulate having a Braunauer-Emmett-Teller (BET) surface area greater than about 2.0 m$^2$ g$^{-1}$ that forms corticosteroid drug substance-complex particulates by noncovalent, reversible binding to the corticosteroid drug substance, and wherein the one or more complexation agents comprises magnesium stearate and alpha-tocopherol;
wherein the corticosteroid drug substance is any of: fluocinolone, fluocinolone acetonide, dexamethasone, dexamethasone phosphate, dexamethasone sodium phosphate, triamcinolone, and triamcinolone acetonide, or a salt thereof; further wherein the dispersal medium is a methyl laurate.

12. A multiphasic colloidal suspension composition, the composition comprising:
a corticosteroid drug substance and one or more complexation agents, admixed in a dispersal medium so that the corticosteroid drug substance has a release profile having one or more phases of release of the drug corticosteroid drug substance into the extracellular environment,
wherein the corticosteroid drug substance is fluocinolone, fluocinolone acetonide or a salt thereof, between about 10% and 60% by weight of the multiphasic colloidal suspension composition,
wherein the one or more complexation agents is formulated as an irregular-shaped particulate having a Braunauer-Emmett-Teller (BET) surface area greater than about 2.0 m$^2$ g$^{-1}$ and is between about 1% and 50% by weight of the multiphasic colloidal suspension composition and forms drug corticosteroid drug substance-complex particulates by noncovalent, reversible binding to the corticosteroid drug substance, and wherein the one or more complexation agents is magnesium stearate and a tocopherol or calcium stearate and a tocopherol,
further wherein the dispersal medium is a hydrophobic liquid oil comprising methyl dodecanoate (methyl laurate) between 1% and 90% by weight of the multiphasic colloidal suspension composition.

13. The composition of claim 12, wherein the multiphasic colloidal suspension composition is formulated as a flowable paste or bolus implant configured for direct injection in and around an eye.

14. The composition of claim 12, wherein the multiphasic colloidal suspension composition is formulated as a tube implant of 2 millimeters or longer, for injection in and around an eye via an injector needle of between 18 gauge and 32 gauge.

15. The composition of claim 12, wherein the multiphasic colloidal suspension composition is within a hollow tube and the hollow tube comprises one or more open ends that restricts surface erosion of the multiphasic colloidal suspension composition to an exposed surface area at the open ends of the hollow tube.

16. The composition of claim 15, wherein the hollow tube is erodible and is comprised of biodegradable or bioresorbable polymers: polylactide (PLA), poly-L-lactide (PLLA), poly-D-lactide (PDLA), poly-DL lactide (PDLLA), polyglycolide (PGA), poly (lactic co-glycolic acid) (PLGA), other copolymers of PLA and PGA, or a combination thereof.

17. The composition of claim 15, wherein the hollow tube is comprised of PLGA polymers with molecular weight of between 150,000 and 300,000 Daltons and is formed of approximately 70-95% L (lactic acid/lactide) and 5-30% G (glycolic acid/glycolide).

* * * * *